United States Patent
Gordon-Blake et al.

(10) Patent No.: US 12,552,760 B2
(45) Date of Patent: Feb. 17, 2026

(54) COMPOUNDS FOR INCREASING THE NICOTINAMIDE ADENINE DINUCLEOTIDE IN A SUBJECT AND METHODS OF USE THEREOF

(71) Applicant: The Board of Trustees of the University of Illinois, Urbana, IL (US)

(72) Inventors: Jesse Gordon-Blake, Chicago, IL (US); Tom G. Driver, Chicago, IL (US); Kiira Ratia, Chicago, IL (US); Gregory R. Thatcher, Tucson, AZ (US); Victoria Weidig, Chicago, IL (US); Leon Tai, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 70 days.

(21) Appl. No.: 18/304,977

(22) Filed: Apr. 21, 2023

(65) Prior Publication Data
US 2023/0365521 A1    Nov. 16, 2023

Related U.S. Application Data

(60) Provisional application No. 63/333,629, filed on Apr. 22, 2022.

(51) Int. Cl.
| | |
|---|---|
| *C07D 309/06* | (2006.01) |
| *A61P 25/28* | (2006.01) |
| *C07D 405/12* | (2006.01) |
| *C07D 405/14* | (2006.01) |
| *C07D 407/12* | (2006.01) |
| *C07D 409/12* | (2006.01) |
| *C07D 413/12* | (2006.01) |

(52) U.S. Cl.
CPC ............ *C07D 309/06* (2013.01); *A61P 25/28* (2018.01); *C07D 405/12* (2013.01); *C07D 405/14* (2013.01); *C07D 407/12* (2013.01); *C07D 409/12* (2013.01); *C07D 413/12* (2013.01)

(58) Field of Classification Search
CPC .............................. A61P 25/28; C07D 309/06
USPC ......................................................... 514/256
See application file for complete search history.

(56) References Cited

U.S. PATENT DOCUMENTS

| | | | |
|---|---|---|---|
| 10,709,724 B2 | 7/2020 | Alvarez et al. | |
| 2010/0022637 A1* | 1/2010 | Stockwell | C07D 309/04 514/459 |
| 2020/0405736 A1 | 12/2020 | Wu et al. | |

FOREIGN PATENT DOCUMENTS

| | | | | |
|---|---|---|---|---|
| WO | WO-2010107115 A1 * | 9/2010 | ............. | A61P 43/00 |
| WO | WO-2012036278 A1 * | 3/2012 | ............. | A61P 25/04 |
| WO | 2012150952 A1 | 11/2012 | | |
| WO | 2017062311 A1 | 4/2017 | | |
| WO | WO-2019075367 A1 * | 4/2019 | ............. | A61P 35/00 |
| WO | WO-2021163344 A1 * | 8/2021 | ........... | C07D 401/12 |
| WO | WO-2022115377 A1 * | 6/2022 | ............. | A61P 35/00 |

OTHER PUBLICATIONS

WO 2010107115 A1 English translation, Google Patents, Sep. 23, 2010. (Year: 2010).*
WO 2012036278 A1 English translation, Google Patents, Mar. 22, 2012. (Year: 2012).*
P1-083: Novel NAMPT Activators Attenuate Neurotoxicity and Neuroinflammation Associated With Neurodegeneration https://doi.org/10.1016/j.jalz.2019.06.108.
Targeting Nicotinamide Phosphoribosyltransferase as a Potential Therapeutic Strategy to Restore Adult Neurogenesis https://doi.org/10.1111/cns.12539.
P7C3 Neuroprotective Chemicals Function by Activating the Rate-Limiting Enzyme in NAD Salvage https://doi.org/10.1016/j.cell.2014.07.040.
Involvement of nicotinamide phosphoribosyltransferase in both amyloidogenic and non-amyloidogenic pathways in hippocampus https://ir.ymlib.yonsei.ac.kr/handle/22282913/148967.
Jesse Gordon-Blake, MIKIW 2021, Apr. 22, 2021.

* cited by examiner

*Primary Examiner* — Jeffrey H Murray
*Assistant Examiner* — Rilla Marie Samsell
(74) *Attorney, Agent, or Firm* — Thomas | Horstemeyer, LLP

(57) ABSTRACT

In accordance with the purpose(s) of the present disclosure, as embodied and broadly described herein, the disclosure, in one aspect, relates to compounds that increase the amount of nicotinamide adenine dinucleotide (NAD⁺) in a subject. By raising the amount of nicotinamide adenine dinucleotide in a subject, diseases associated with reduced levels of nicotinamide adenine dinucleotide can be treated or prevented. In one aspect, raising the amount of NAD⁺ in a subject can reduce or ameliorate one or more symptoms of Parkinson's disease, Alzheimer's disease, Huntington's disease, Multiple sclerosis, amylotrophic lateral sclerosis, AIDS-induced dementia, or epilepsy.

17 Claims, 5 Drawing Sheets

| Compound | R¹ | R² | R³ | EC₅₀ NAMPT (µM) | A_max NAMPT (Fold) | Cell NAD⁺ THP-1 (Fold at 30 µM) |
|---|---|---|---|---|---|---|
| NP-A3-B2 | MeO-C₆H₄-CH₂- | furan-2-yl | | 4.05 | 1.85 | 1.18 |
| JGB-1-122 | MeO-C₆H₄-CH₂- | 2-Br-thiophene | | 5.69 | 1.10 | — |
| JGB-1-127 | MeO-C₆H₄-CH₂- | thiophene-2-yl | | 8.28 | 1.40 | 1.44 |
| JGB-1-128 | MeO-C₆H₄-CH₂- | furan-3-yl | | 8.71 | 1.65 | — |
| JGB-1-129 | MeO-C₆H₄-CH₂- | oxazole | Me₂C(CH₂CH₂)-tetrahydropyran | 16.6 | 1.15 | — |
| JGB-1-130 | MeO-C₆H₄-CH₂- | pyrrole (NH) | | 4.85 | 1.30 | — |
| JGB-1-135 | MeO-C₆H₄-CH₂- | 5-Cl-furan | | 9.70 | 1.17 | — |
| JGB-1-137 | MeO-C₆H₄-CH₂- | thiophene-3-yl | | 4.28 | 1.74 | 1.66 |
| JGB-1-145 | MeO-C₆H₄-CH₂- | pyrimidine | | 13.5 | 1.30 | — |
| JGB-1-146 | MeO-C₆H₄-CH₂- | pyrazine | | nd | nd | — |
| JGB-1-147 | MeO-C₆H₄-CH₂- | imidazole (HN) | | 5.32 (IC₅₀) | 0.25 | — |
| JGB-1-148 | MeO-C₆H₄-CH₂- | furfuryl (CH₂-furan) | | nd | 1.00 | — |

FIG. 4

| Compound | R¹ | R² | R³ | EC₅₀ NAMPT (μM) | A_max NAMPT (Fold) | Cell NAD⁺ THP-1 (Fold at 30 μM) |
|---|---|---|---|---|---|---|
| JGB-1-131 | 4-(OCF₃)-phenyl | furanyl | | nd | nd | — |
| JGB-1-133 | 4-OMe, 3-CF₃-phenyl | furanyl | 2,2-dimethyl-tetrahydropyran w/ Me | nd | nd | — |
| JGB-1-134 | indolyl | furanyl | | 4.50 | 1.27 | 1.13 |
| JGB-1-155 | 4-NMe₂-phenyl | furanyl | | 3.41 | 1.40 | 1.88 |
| JGB-1-151 | 4-OMe-phenyl | furanyl | H | nd | nd | — |
| JGB-1-152 | 4-OMe-phenyl | H | tetrahydropyranyl-ethyl | nd | nd | — |
| JGB-1-153 | 4-OMe-phenyl | furanyl | tetrahydropyranyl-ethyl | nd | nd | — |
| JGB-1-158 | 4-OMe-phenyl | furanyl | 2,2-dimethyl-tetrahydropyranyl-ethyl | nd | nd | — |

FIG. 5

COMPOUNDS FOR INCREASING THE NICOTINAMIDE ADENINE DINUCLEOTIDE IN A SUBJECT AND METHODS OF USE THEREOF

CROSS-REFERENCE TO RELATED APPLICATIONS

This application claims the benefit of and priority to U.S. Provisional Patent Application No. 63/333,629, filed on Apr. 22, 2022, the contents of which are incorporated by reference herein in their entireties.

STATEMENT REGARDING FEDERALLY SPONSORED RESEARCH OR DEVELOPMENT

This invention was made with government support under T32 AG057468 awarded by the National Institutes of Health. The government has certain rights in the invention.

BACKGROUND

Neurodegenerative disease (ND) and aging pose a massive burden on human wellbeing and lack effective treatments. Both are complicated and multifactorial, involving overlapping dysfunction in multiple cellular processes. One of the most prominent risk factors for developing ND is age[1]. In fact, brain aging and ND largely mirror each other on the cellular level. Brain aging affects mitochondrial function, oxidative stress response, glial cell activation and neuroinflammation, N-methyl-D-aspartate receptor (NMDAR) function, stem cell function, DNA repair, autophagy, aberrant protein accumulation, $Ca^{2+}$ homeostasis, neuronal network activity, neuroplasticity, neurogenesis, and energy metabolism[2]. This depiction heavily conforms to the dysfunction present in ND.

The widespread mutually exacerbating pathways of central nervous system (CNS) dysfunction in aging and ND all have a crucial feature in common, the mitochondrion[3-5]. The cellular bioenergetic epicenter in mitochondria is vital to cellular health and mediates much ND and aging dysfunction. Reactive oxygen species (ROS) are produced as a normal part of human physiology, primarily in the mitochondria where they serve as important signaling molecules[6]. ROS, however, can cause widespread damage to lipids, proteins, and nucleic acids, and their levels are regulated by the innate cellular antioxidant system[7]. Oxidative stress (OS) occurs when an imbalance between production and neutralization results in chronically elevated ROS levels. In this way, ROS, and more specifically OS, serves as a mediator between mitochondrial dysfunction and broader cellular dysfunction[8]. Further, most aspects of ND contribute to and are aggravated by OS, especially mitochondrial dysfunction, which itself is the major source of ROS. For example, OS is known to be an early event in the dysfunction leading to Alzheimer's disease (AD)[9]. Because ROS are molecularly fundamental to the aberrant physiology in aging and ND, there is an urgent need for therapies that address pervasive OS in the brain.

SUMMARY

In accordance with the purpose(s) of the present disclosure, as embodied and broadly described herein, the disclosure, in one aspect, relates to compounds that increase the amount of nicotinamide adenine dinucleotide ($NAD^+$) in a subject. By raising the amount of nicotinamide adenine dinucleotide in a subject, diseases associated with reduced levels of nicotinamide adenine dinucleotide can be treated or prevented. In one aspect, raising the amount of $NAD^+$ in a subject can reduce or ameliorate one or more symptoms of Parkinson's disease, Alzheimer's disease, Huntington's disease, multiple sclerosis, amyotrophic lateral sclerosis, AIDS-induced dementia, or epilepsy. In one aspect, the compounds have the structure I or the pharmaceutically acceptable salt thereof

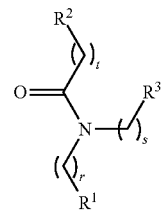

wherein
$R^1$ is a substituted or unsubstituted aryl group or a substituted or unsubstituted heteroaryl group;
$R^2$ is a substituted or unsubstituted aryl group, a substituted or unsubstituted heteroaryl group, a substituted or unsubstituted cycloalkyl group, a substituted or unsubstituted heterocycloalkyl group, or a substituted or unsubstituted alkyl group;
$R^3$ is a substituted or unsubstituted cycloalkyl group or a substituted or unsubstituted heterocycloalkyl group;
r is 1, 2, 3, 4, or 5;
s is 1, 2, 3, 4, or 5; and
t is 0, 1, 2, 3, 4, or 5.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2D shows JGB-1-155 treatments of 20 µM and 40 µM decreased ROS levels below that of the vehicle treated control.

FIGS. 4 and 5 provide enzyme, THP-1, and HT-22 data of several compounds described herein.

Figures 1A, 1B:
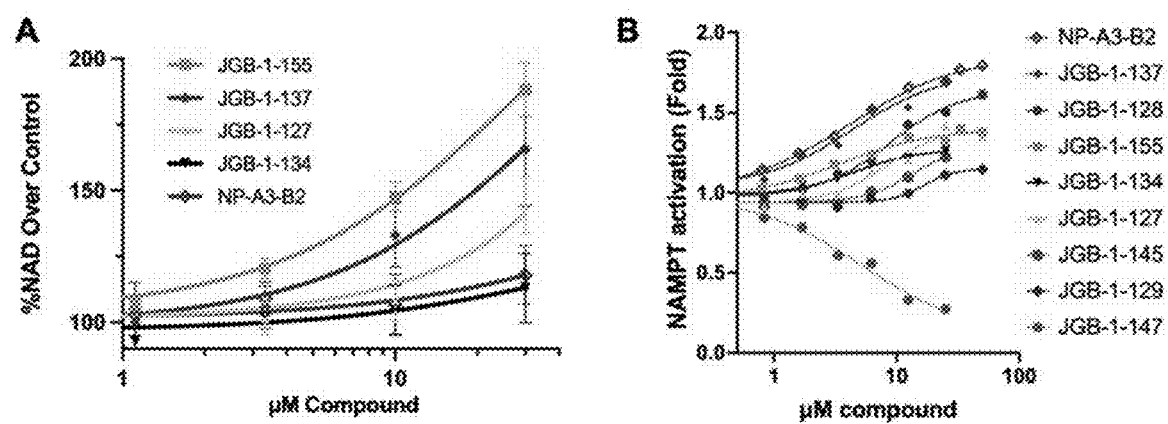
FIGS. 1A and 1B show the ability of compounds described herein to increase NAD+ levels and NAMPT activity.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order.

Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application.

Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "an excipient" include, but are not limited to, mixtures or combinations of two or more such excipients, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than 'y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range. Thus, for example, if a component is in an amount of about 1%, 2%, 3%, 4%, or 5%, where any value can be a lower and upper endpoint of a range, then any range is contemplated between 1% and 5% (e.g., 1% to 3%, 2% to 4%, etc.).

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, "$IC_{50}$," is intended to refer to the concentration of a substance (e.g., a compound or a drug) that is required for 50% inhibition of a biological process, or component of a process. For example, $IC_{50}$ refers to the half maximal (50%) inhibitory concentration (IC) of a substance as determined in a suitable assay.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

The position of a substituent can be defined relative to the positions of other substituents in an aromatic ring. For example, as shown below in relationship to the "R" group, a second substituent can be "ortho," "para," or "meta" to the R group, meaning that the second substituent is bonded to a carbon labeled ortho, para, or meta as indicated below. Combinations of ortho, para, and meta substituents relative to a given group or substituent are also envisioned and should be considered to be disclosed.

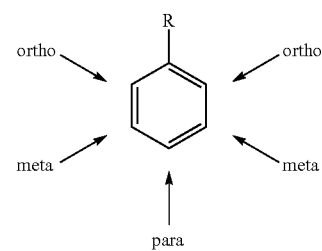

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" or "aliphatic group," as used herein, denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-20 carbon atoms. Aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, cycloalkyl, alkoxy, amino, ether, halide, hydroxy, nitro, silyl, sulfo-oxo, or thiol as described herein.

The term "alkanediyl" as used herein, refers to a divalent saturated aliphatic group, with one or two saturated carbon atom(s) as the point(s) of attachment, a linear or branched, cyclo, cyclic or acyclic structure, no carbon-carbon double or triple bonds, and no atoms other than carbon and hydrogen. The groups, —$CH_2$— (methylene), —$CH_2CH_2$—, —$CH_2C(CH_3)_2CH_2$—, and —$CH_2CH_2CH_2$— are non-limiting examples of alkanediyl groups.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or -$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cyclooctynyl, cyclononynyl, and the like. The term "heterocycloalkynyl" is a type of cycloalkenyl group as defined above and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aromatic group" as used herein refers to a ring structure having cyclic clouds of delocalized π electrons above and below the plane of the molecule, where the π clouds contain (4n+2) π electrons. A further discussion of aromaticity is found in Morrison and Boyd, Organic Chemistry, (5th Ed., 1987), Chapter 13, entitled "Aromaticity," pages 477-497, incorporated herein by reference. The term "aromatic group" is inclusive of both aryl and heteroaryl groups.

The term "aryl" as used herein is a group that contains any carbon-based aromatic group including, but not limited to, benzene, naphthalene, phenyl, biphenyl, anthracene, and the like. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, —NH$_2$, carboxylic acid, ester, ether, halide, hydroxy, ketone, azide, nitro, silyl, sulfo-oxo, or thiol as described herein. The term "biaryl" is a specific type of aryl group and is included in the definition of "aryl." In addition, the aryl group can be a single ring structure or comprise multiple ring structures that are either fused ring structures or attached via one or more bridging groups such as a carbon-carbon bond. For example, biaryl to two aryl groups that are bound together via a fused ring structure, as in naphthalene, or are attached via one or more carbon-carbon bonds, as in biphenyl. Fused aryl groups including, but not limited to, indene and naphthalene groups are also contemplated. The aryl group can be substituted with one or more groups including, but not limited to, alkyl, cycloalkyl, alkoxy, amino, ether, halide, hydroxy, nitro, silyl, sulfo-oxo, or thiol as described herein.

The term "aldehyde" as used herein is represented by the formula —C(O)H. Throughout this specification "C(O)" is a short hand notation for a carbonyl group, i.e., C═O.

The terms "amine" or "amino" as used herein are represented by the formula —NA$^1$A$^2$, where A$^1$ and A$^2$ can be, independently, hydrogen or alkyl, cycloalkyl, alkenyl, cycloalkenyl, alkynyl, cycloalkynyl, aryl, or heteroaryl group as described herein. A specific example of amino is —NH$_2$.

The term "alkylamino" as used herein is represented by the formula —NH(-alkyl) and —N(-alkyl)$_2$, where alkyl is a described herein. Representative examples include, but are not limited to, methylamino group, ethylamino group, propylamino group, isopropylamino group, butylamino group, isobutylamino group, (sec-butyl)amino group, (tert-butyl) amino group, pentylamino group, isopentylamino group, (tert-pentyl)amino group, hexylamino group, dimethylamino group, diethylamino group, dipropylamino group, diisopropylamino group, dibutylamino group, diisobutylamino group, di(sec-butyl)amino group, di(tert-butyl) amino group, dipentylamino group, diisopentylamino group, di(tert-pentyl)amino group, dihexylamino group, N-ethyl-N-methylamino group, N-methyl-N-propylamino group, N-ethyl-N-propylamino group and the like.

The term "carboxylic acid" as used herein is represented by the formula —C(O)OH.

The term "ester" as used herein is represented by the formula —OC(O)A$^1$ or —C(O)OA$^1$, where A$^1$ can be alkyl, cycloalkyl, alkenyl, cycloalkenyl, alkynyl, cycloalkynyl, aryl, or heteroaryl group as described herein.

The term "ether" as used herein is represented by the formula A$^1$OA$^2$, where A$^1$ and A$^2$ can be, independently, an alkyl, cycloalkyl, alkenyl, cycloalkenyl, alkynyl, cycloalkynyl, aryl, or heteroaryl group described herein.

The terms "halo," "halogen" or "halide," as used herein can be used interchangeably and refer to F, Cl, Br, or I.

The terms "pseudohalide," "pseudohalogen" or "pseudohalo," as used herein can be used interchangeably and refer to functional groups that behave substantially similar to halides. Such functional groups include, by way of example, cyano, thiocyanato, azido, trifluoromethyl, trifluoromethoxy, perfluoroalkyl, and perfluoroalkoxy groups.

The term "heteroalkyl" as used herein refers to an alkyl group containing at least one heteroatom.

Suitable heteroatoms include, but are not limited to, O, N, Si, P and S, wherein the nitrogen, phosphorous and sulfur atoms are optionally oxidized, and the nitrogen heteroatom is optionally quaternized. Heteroalkyls can be substituted as defined above for alkyl groups.

The term "heteroaryl" as used herein refers to an aromatic group that has at least one heteroatom incorporated within the ring of the aromatic group. Examples of heteroatoms include, but are not limited to, nitrogen, oxygen, sulfur, and phosphorus, where N-oxides, sulfur oxides, and dioxides are permissible heteroatom substitutions. The heteroaryl group can be substituted or unsubstituted. The heteroaryl group can be substituted with one or more groups including, but not limited to, alkyl, cycloalkyl, alkoxy, amino, ether, halide, hydroxy, nitro, silyl, sulfo-oxo, or thiol as described herein. Heteroaryl groups can be monocyclic, or alternatively fused ring systems. Heteroaryl groups include, but are not limited to, furyl, imidazolyl, pyrimidinyl, tetrazolyl, thienyl, pyridinyl, pyrrolyl, N-methylpyrrolyl, quinolinyl, isoquinolinyl, pyrazolyl, triazolyl, thiazolyl, oxazolyl, isoxazolyl, oxadiazolyl, thiadiazolyl, isothiazolyl, pyridazinyl, pyrazinyl, benzofuranyl, benzodioxolyl, benzothiophenyl, indolyl, indazolyl, benzimidazolyl, imidazopyridinyl, pyrazolopyridinyl, and pyrazolopyrimidinyl. Further not limiting examples of heteroaryl groups include, but are not limited to, pyridinyl, pyridazinyl, pyrimidinyl, pyrazinyl, thiophenyl, pyrazolyl, imidazolyl, benzo[d]oxazolyl, benzo[d]thiazolyl, quinolinyl, quinazolinyl, indazolyl, imidazo[1,2-b] pyridazinyl, imidazo[1,2-a]pyrazinyl, benzo[c][1,2,5] thiadiazolyl, benzo[c][1,2,5]oxadiazolyl, and pyrido[2,3-b] pyrazinyl. The heteroaryl group can be substituted with one or more groups including, but not limited to, alkyl, cycloalkyl, alkoxy, amino, ether, halide, hydroxy, nitro, silyl, sulfo-oxo, or thiol as described herein.

The terms "heterocycle" or "heterocyclyl," as used herein can be used interchangeably and refer to single and multi-cyclic aromatic or non-aromatic ring systems in which at least one of the ring members is other than carbon. Thus, the term is inclusive of, but not limited to, "heterocycloalkyl," "heteroaryl," "bicyclic heterocycle," and "polycyclic heterocycle." Heterocycle includes pyridine, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridazine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like. The term heterocyclyl group can also be a C2 heterocyclyl, C2-C3 heterocyclyl, C2-C4 heterocyclyl, C2-C5 heterocyclyl, C2-C6 heterocyclyl, C2-C7 heterocyclyl, C2-C8 heterocyclyl, C2-C9 heterocyclyl, C2-C10 heterocyclyl, C2-C11 heterocyclyl, and the like up to and including a C2-C18 heterocyclyl. For example, a C2 heterocyclyl comprises a group which has two carbon atoms and at least one heteroatom, including, but not limited to, aziridinyl, diazetidinyl, dihydrodiazetyl, oxiranyl, thiiranyl, and the like. Alternatively, for example, a C5 heterocyclyl comprises a group which has five carbon atoms and at least one heteroatom, including, but not limited to, piperidinyl, tetrahydropyranyl, tetrahydrothiopyranyl, diazepanyl, pyridinyl, and the like. It is understood that a heterocyclyl group may be bound either through a heteroatom in the ring, where chemically possible, or one of carbons comprising the heterocyclyl ring.

The term "bicyclic heterocycle" or "bicyclic heterocyclyl" as used herein refers to a ring system in which at least one of the ring members is other than carbon. Bicyclic heterocyclyl encompasses ring systems wherein an aromatic ring is fused with another aromatic ring, or wherein an aromatic ring is fused with a non-aromatic ring. Bicyclic heterocyclyl encompasses ring systems wherein a benzene ring is fused to a 5- or a 6-membered ring containing 1, 2 or 3 ring heteroatoms or wherein a pyridine ring is fused to a 5- or a 6-membered ring containing 1, 2 or 3 ring heteroatoms. Bicyclic heterocyclic groups include, but are not limited to, indolyl, indazolyl, pyrazolo[1,5-a]pyridinyl, benzofuranyl, quinolinyl, quinoxalinyl, 1,3-benzodioxolyl, 2,3-dihydro-1,4-benzodioxinyl, 3,4-dihydro-2H-chromenyl, 1H-pyrazolo[4,3-c]pyridin-3-yl; 1H-pyrrolo[3,2-b]pyridin-3-yl; and 1H-pyrazolo[3,2-b]pyridin-3-yl.

The term "heterocycloalkyl" as used herein refers to an aliphatic, partially unsaturated or fully saturated, 3- to 14-membered ring system, including single rings of 3 to 8 atoms and bi- and tricyclic ring systems. The heterocycloalkyl ring-systems include one to four heteroatoms independently selected from oxygen, nitrogen, and sulfur, wherein a nitrogen and sulfur heteroatom optionally can be oxidized and a nitrogen heteroatom optionally can be substituted. Representative heterocycloalkyl groups include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

The term "hydroxyl" or "hydroxy" as used herein is represented by the formula —OH.

The term "ketone" as used herein is represented by the formula $A^1C(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "azide" or "azido" as used herein is represented by the formula —$N_3$.

The term "nitro" as used herein is represented by the formula —$NO_2$.

The term "nitrile" or "cyano" as used herein is represented by the formula —CN.

The term "silyl" as used herein is represented by the formula —$SiA^1A^2A^3$, where $A^1$, $A^2$, and $A^3$ can be, independently, hydrogen or an alkyl, cycloalkyl, alkoxy, alkenyl, cycloalkenyl, alkynyl, cycloalkynyl, aryl, or heteroaryl group as described herein.

The term "sulfo-oxo" as used herein is represented by the formulas —$S(O)A^1$, —$S(O)_2A^1$, —$OS(O)_2A^1$, or —$OS(O)_2OA^1$, where $A^1$ can be hydrogen or an alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —$S(O)_2A^1$, where $A^1$ can be hydrogen or an alkyl, cycloalkyl, alkenyl, cycloalkenyl, alkynyl, cycloalkynyl, aryl, or heteroaryl group as described herein. The term "sulfone" as used herein is represented by the formula $A^1S(O)_2A^2$, where $A^1$ and $A^2$ can be, independently, an alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "thiol" as used herein is represented by the formula —SH.

"$R^1$," "$R^2$," "$R^3$," ... "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. In is also contemplated that, in certain aspects, unless expressly indicated to the contrary, individual substituents can be further optionally substituted (i.e., further substituted or unsubstituted).

The term "stable," as used herein, refers to compounds that are not substantially altered when subjected to conditions to allow for their production, detection, and, in certain aspects, their recovery, purification, and use for one or more of the purposes disclosed herein.

Suitable monovalent substituents on a substitutable carbon atom of an "optionally substituted" group are independently halogen; —(CH$_2$)$_{0-4}$R°; —(CH$_2$)$_{0-4}$OR°; —O(CH$_2$)$_{0-4}$R°—O—(CH$_2$)$_{0-4}$C(O)OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH═CHPh, which may be substituted with R°; —(CH$_2$)$_{0-4}$O(CH$_2$)$_{0-1}$-pyridyl which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched alkylene)O—N(R°)$_2$; or —(C$_{1-4}$ straight or branched alkylene)C(O)O—N(R°)$_2$, wherein each R° may be substituted as defined below and is independently hydrogen, C$_{1-6}$ aliphatic, —CH$_2$Ph, —O(CH$_2$)$_{0-1}$Ph, —CH$_2$-(5-6-membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R$^\bullet$ include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "leaving group" refers to an atom (or a group of atoms) with electron withdrawing ability that can be displaced as a stable species, taking with it the bonding electrons. Examples of suitable leaving groups include halides and sulfonate esters, including, but not limited to, triflate, mesylate, tosylate, and brosylate.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture.

A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-Ingold-Prelog system can be used to assign the (R) or (S) configuration to a chiral carbon.

Compounds described herein comprise atoms in both their natural isotopic abundance and in non-natural abundance. The disclosed compounds can be isotopically-labeled or isotopically-substituted compounds identical to those described, but for the fact that one or more atoms are replaced by an atom having an atomic mass or mass number different from the atomic mass or mass number typically found in nature. Examples of isotopes that can be incorporated into compounds of the invention include isotopes of hydrogen, carbon, nitrogen, oxygen, sulfur, fluorine and chlorine, such as $^{2}H$, $^{3}H$, $^{13}C$, $^{14}C$, $^{15}N$, $^{18}O$, $^{17}O$, $^{35}S$, $^{18}F$, and $^{36}Cl$, respectively. Compounds further comprise prodrugs thereof and pharmaceutically acceptable salts of said compounds or of said prodrugs which contain the aforementioned isotopes and/or other isotopes of other atoms are within the scope of this invention.

Certain isotopically-labeled compounds of the present invention, for example those into which radioactive isotopes such as $^{3}H$ and $^{14}C$ are incorporated, are useful in drug and/or substrate tissue distribution assays. Tritiated, i.e., $^{3}H$, and carbon-14, i.e., $^{14}C$, isotopes are particularly preferred for their ease of preparation and detectability. Further, substitution with heavier isotopes such as deuterium, i.e., $^{2}H$, can afford certain therapeutic advantages resulting from greater metabolic stability, for example increased in vivo half-life or reduced dosage requirements and, hence, may be preferred in some circumstances. Isotopically labeled compounds of the present invention and prodrugs thereof can generally be prepared by carrying out the procedures below, by substituting a readily available isotopically labeled reagent for a non-isotopically labeled reagent.

The compounds described in the invention can be present as a solvate. In some cases, the solvent used to prepare the solvate is an aqueous solution, and the solvate is then often referred to as a hydrate. The compounds can be present as a hydrate, which can be obtained, for example, by crystallization from a solvent or from aqueous solution. In this connection, one, two, three or any arbitrary number of solvent or water molecules can combine with the compounds according to the invention to form solvates and hydrates. Unless stated to the contrary, the invention includes all such possible solvates.

It is also appreciated that certain compounds described herein can be present as an equilibrium of tautomers. For example, ketones with an α-hydrogen can exist in an equilibrium of the keto form and the enol form.

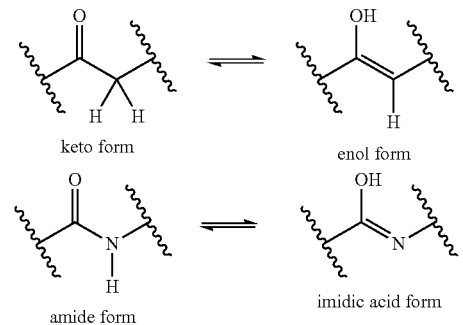

keto form     enol form amide form    imidic acid form

Likewise, amides with an N-hydrogen can exist in an equilibrium of the amide form and the imidic acid form. Unless stated to the contrary, the invention includes all such possible tautomers.

It is known that chemical substances form solids which are present in different states of order which are termed polymorphic forms or modifications. The different modifications of a polymorphic substance can differ greatly in their physical properties. The compounds according to the invention can be present in different polymorphic forms, with it being possible for particular modifications to be metastable. Unless stated to the contrary, the invention includes all such possible polymorphic forms.

In some aspects, a structure of a compound can be represented by a formula:

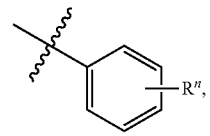

which is understood to be equivalent to a formula:

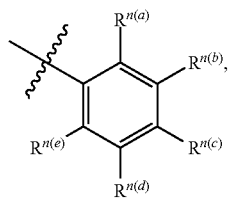

wherein n is typically an integer. That is, $R^n$ is understood to represent five independent substituents, $R^{n(a)}$, $R^{n(b)}$, $R^{n(c)}$, $R^{n(d)}$ and $R^{n(e)}$. By "independent substituents," it is meant that each R substituent can be independently defined. For example, if in one instance $R^{n(a)}$ is halogen, then $R^{n(b)}$ is not necessarily halogen in that instance.

As used herein, "administering" can refer to an administration that is oral, topical, intravenous, subcutaneous, transcutaneous, transdermal, intramuscular, intra-joint, parenteral, intra-arteriole, intradermal, intraventricular, intraosseous, intraocular, intracranial, intraperitoneal, intralesional, intranasal, intracardiac, intraarticular, intracavernous, intrathecal, intravireal, intracerebral, and intracerebroventricular, intratympanic, intracochlear, rectal, vaginal, by inhalation, by catheters, stents or via an implanted reservoir or other device that administers, either actively or passively (e.g. by diffusion) a composition the perivascular space and adventitia. For example a medical device such as a stent can contain a composition or formulation disposed on its surface, which can then dissolve or be otherwise distributed to the surrounding tissue and cells. The term "parenteral" can include subcutaneous, intravenous, intramuscular, intra-articular, intra-synovial, intrasternal, intrathecal, intrahepatic, intralesional, and intracranial injections or infusion techniques. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

As used interchangeably herein, "subject," "individual," or "patient" can refer to a vertebrate organism, such as a mammal (e.g. human). "Subject" can also refer to a cell, a population of cells, a tissue, an organ, or an organism, preferably to human and constituents thereof.

As used herein, the terms "treating" and "treatment" can refer generally to obtaining a desired pharmacological and/or physiological effect. The effect can be, but does not necessarily have to be, prophylactic in terms of preventing or partially preventing a disease, symptom or condition thereof. The effect can be therapeutic in terms of a partial or complete cure of a disease, condition, symptom or adverse effect attributed to the disease, disorder, or condition. The term "treatment" as used herein can include any one or more of the following: (a) preventing the disease from occurring in a subject which may be predisposed to the disease but has not yet been diagnosed as having it; (b) inhibiting the disease, i.e., arresting its development; and (c) relieving the disease, i.e., mitigating or ameliorating the disease and/or its symptoms or conditions. The term "treatment" as used herein can refer to both therapeutic treatment alone, prophylactic treatment alone, or both therapeutic and prophylactic treatment. Those in need of treatment (subjects in need thereof) can include those already with the disorder and/or those in which the disorder is to be prevented. As used herein, the term "treating", can include inhibiting the disease, disorder or condition, e.g., impeding its progress; and relieving the disease, disorder, or condition, e.g., causing regression of the disease, disorder and/or condition. Treating the disease, disorder, or condition can include ameliorating at least one symptom of the particular disease, disorder, or condition, even if the underlying pathophysiology is not affected, e.g., such as treating the pain of a subject by administration of an analgesic agent even though such agent does not treat the cause of the pain.

As used herein, "therapeutic" can refer to treating, healing, and/or ameliorating a disease, disorder, condition, or side effect, or to decreasing in the rate of advancement of a disease, disorder, condition, or side effect.

As used herein, "effective amount" can refer to the amount of a disclosed compound or pharmaceutical composition provided herein that is sufficient to effect beneficial or desired biological, emotional, medical, or clinical response of a cell, tissue, system, animal, or human. An effective amount can be administered in one or more administrations, applications, or dosages. The term can also include within its scope amounts effective to enhance or restore to substantially normal physiological function.

For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. It is generally preferred that a maximum dose of the pharmacological agents of the invention (alone or in combination with other therapeutic agents) be used, that is, the highest safe dose according to sound medical judgment. It will be understood by those of ordinary skill in the art however, that a patient may insist upon a lower dose or tolerable dose for medical reasons, psychological reasons or for virtually any other reasons.

A response to a therapeutically effective dose of a disclosed compound and/or pharmaceutical composition, for example, can be measured by determining the physiological effects of the treatment or medication, such as the decrease or lack of disease symptoms following administration of the treatment or pharmacological agent. Other assays will be known to one of ordinary skill in the art and can be employed for measuring the level of the response. The amount of a treatment may be varied for example by increasing or decreasing the amount of a disclosed compound and/or pharmaceutical composition, by changing the disclosed compound and/or pharmaceutical composition administered, by changing the route of administration, by changing the dosage timing and so on. Dosage can vary, and can be administered in one or more dose administrations daily, for one or several days. Guidance can be found in the literature for appropriate dosages for given classes of pharmaceutical products.

As used herein, the term "prophylactically effective amount" refers to an amount effective for preventing onset or initiation of a disease or condition.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

The term "pharmaceutically acceptable" describes a material that is not biologically or otherwise undesirable, i.e., without causing an unacceptable level of undesirable biological effects or interacting in a deleterious manner.

The term "pharmaceutically acceptable salts", as used herein, means salts of the active principal agents which are prepared with acids or bases that are tolerated by a biological system or tolerated by a subject or tolerated by a biological system and tolerated by a subject when administered in a therapeutically effective amount. When compounds of the present disclosure contain relatively acidic functionalities, base addition salts can be obtained by contacting the neutral form of such compounds with a sufficient amount of the desired base, either neat or in a suitable inert solvent. Examples of pharmaceutically acceptable base addition salts include, but are not limited to; sodium, potassium, calcium, ammonium, organic amino, magnesium salt, lithium salt, strontium salt or a similar salt. When compounds of the present disclosure contain relatively basic functionalities, acid addition salts can be obtained by contacting the neutral form of such compounds with a sufficient amount of the desired acid, either neat or in a suitable inert solvent. Examples of pharmaceutically acceptable acid addition salts include, but are not limited to; those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like.

The term "pharmaceutically acceptable prodrug" or "prodrug" represents those prodrugs of the compounds of the present disclosure which are, within the scope of sound medical judgment, suitable for use in contact with the tissues of humans and lower animals without undue toxicity, irritation, allergic response, and the like, commensurate with a reasonable benefit/risk ratio, and effective for their intended use. Prodrugs of the present disclosure can be rapidly transformed in vivo to a parent compound having a structure of a disclosed compound, for example, by hydrolysis in blood. A thorough discussion is provided in T. Higuchi and V. Stella, Pro-drugs as Novel Delivery Systems, V. 14 of the A.C.S. Symposium Series, and in Edward B. Roche, ed., Bioreversible Carriers in Drug Design, American Pharmaceutical Association and Pergamon Press (1987).

As used herein, "dose," "unit dose," or "dosage" can refer to physically discrete units suitable for use in a subject, each unit containing a predetermined quantity of a disclosed compound and/or a pharmaceutical composition thereof calculated to produce the desired response or responses in association with its administration.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Compounds and Methods of Making and Using the Compounds

In one aspect, disclosed herein is a compound having a structure according to structure I or the pharmaceutically acceptable salt thereof

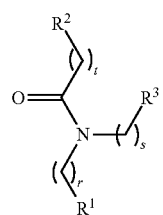

I wherein

R¹ is a substituted or unsubstituted aryl group or a substituted or unsubstituted heteroaryl group;

R² is a substituted or unsubstituted aryl group, a substituted or unsubstituted heteroaryl group, a substituted or unsubstituted cycloalkyl group, a substituted or unsubstituted heterocycloalkyl group, or a substituted or unsubstituted alkyl group;

R³ is a substituted or unsubstituted cycloalkyl group or a substituted or unsubstituted heterocycloalkyl group;

r is 1, 2, 3, 4, or 5;

s is 1, 2, 3, 4, or 5; and t is 0, 1, 2, 3, 4, or 5.

In one aspect, R¹ in structure I is a substituted or unsubstituted aryl group. In another aspect, R¹ in structure I is a substituted aryl group. In another aspect, R¹ in structure I is a substituted phenyl group. In another aspect, R¹ in structure I is a phenyl group substituted with at least one alkoxy group, haloalkoxy group, hydroxyl group, alkyl group, haloalkyl group, or an amino group. In another aspect, R¹ in structure I has the structure II

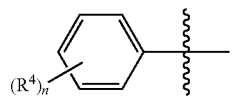

II wherein each R⁴ is independently hydrogen, an alkoxy group, a haloalkoxy group, a hydroxyl group, an alkyl group, a haloalkyl group, or an amino group; and n is 1, 2, 3, 4, or 5.

In one aspect, R⁴ in structure II is alkoxy or a dialkylamino group and n is 1. In another aspect, R⁴ in structure II is methoxy and n is 1.

In one aspect, R² in structure I is a substituted or unsubstituted furyl group, a substituted or unsubstituted imidazolyl group, a substituted or unsubstituted pyrimidinyl group, a substituted or unsubstituted tetrazolyl group, a substituted or unsubstituted thienyl group, a substituted or unsubstituted pyridinyl group, a substituted or unsubstituted pyrrolyl group, a substituted or unsubstituted N-methylpyrrolyl group, a substituted or unsubstituted quinolinyl group, a substituted or unsubstituted isoquinolinyl group, a substituted or unsubstituted pyrazolyl group, a substituted or unsubstituted triazolyl group, a substituted or unsubstituted thiazolyl group, a substituted or unsubstituted oxazolyl group, a substituted or unsubstituted isoxazolyl group, a substituted or unsubstituted oxadiazolyl group, a substituted or unsubstituted thiadiazolyl group, a substituted or unsubstituted isothiazolyl group, a substituted or unsubstituted pyridazinyl group, a substituted or unsubstituted pyrazinyl group, a substituted or unsubstituted benzofuranyl group, a substituted or unsubstituted benzodioxolyl group, a substituted or unsubstituted benzothiophenyl group, a substituted or unsubstituted indolyl group, a substituted or unsubstituted indazolyl group, a substituted or unsubstituted benzimidazolyl group, a substituted or unsubstituted imidazopyridinyl group, a substituted or unsubstituted pyrazolopyridinyl group, or a substituted or unsubstituted pyrazolopyrimidinyl group.

In another aspect, R² in structure I is a substituted or unsubstituted furyl group. In another aspect, R² in structure I is a substituted or unsubstituted thienyl group. In another aspect, R² in structure I is a C1 to C10 alkyl group. In another aspect, R² in structure I is a methyl or ethyl group. In another aspect, R² in structure I is

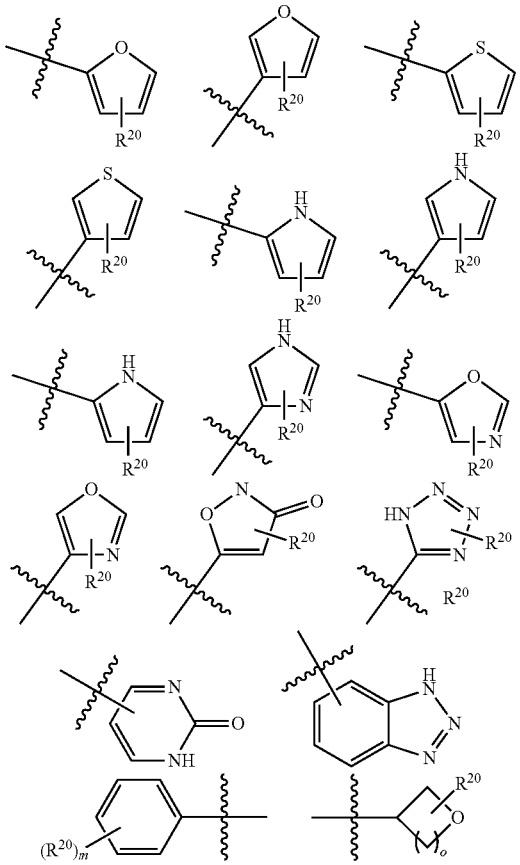

wherein

R²⁰ is an alkoxy group, a haloalkoxy group, a hydroxyl group, a halide, an alkyl group, a haloalkyl group, or an amino group;

m is 1, 2, 3, 4, or 5; and o is 1, 2, 3, or 4.

In one aspect, R³ in structure I is a substituted or unsubstituted heterocycloalkyl group. In another aspect, wherein R³ in structure I is a substituted or unsubstituted heterocycloalkyl group having from 3 to 7 carbon atoms. In another aspect, wherein R³ in structure I is a substituted or unsubstituted heterocycloalkyl group having from 3 to 7 carbon atoms and an oxygen atom. In another aspect, wherein R³ in structure I is a substituted or unsubstituted tetrahydropyran group. In another aspect, wherein R³ in structure I has the structure III

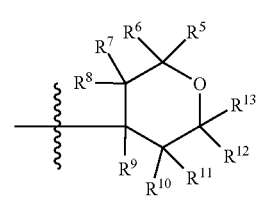

III wherein R⁵ to R¹³ are independently hydrogen, a C1 to C10 alkyl group, or cycloalkyl group.

In one aspect, wherein R⁵ and R⁶ in structure III are each methyl. In another aspect, R⁵ and R⁶ are each methyl and R⁹ is an isopropyl group in structure III.

In another aspect, $R^3$ in structure I is

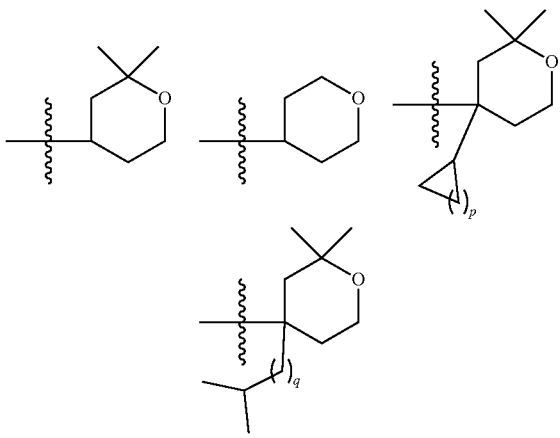

wherein p is 1, 2, 3, or 4, and
q is 0, 1, 2, 3, 4, or 5.

In one aspect, r in structure I is 1. In another aspect, s in structure I is 2. In another aspect, t in structure I is 0 or 1. In another aspect, r is 1, s is 2, and t is 0 in structure I.

In another aspect, the compound has the structure I, wherein
$R^1$ is a phenyl group substituted with at least one alkoxy group, haloalkoxy group, hydroxyl group, alkyl group, haloalkyl group, or an amino group;
$R^2$ is a substituted or unsubstituted furyl group or a substituted or unsubstituted thienyl group; and
$R^3$ has the structure III

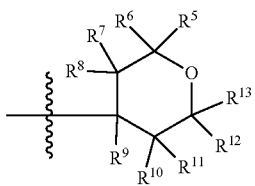

III wherein $R^5$ to $R^{13}$ are independently hydrogen, a C1 to C10 alkyl group, or cycloalkyl group.

In another aspect, the compound has the structure IV or the pharmaceutically acceptable salt thereof

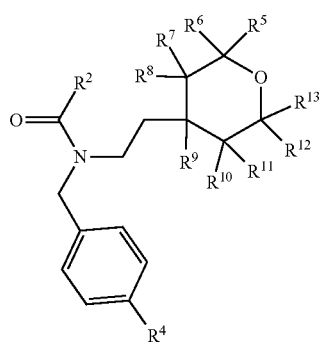

IV wherein $R^2$ is a substituted or unsubstituted furyl group or a substituted or unsubstituted thienyl group;

$R^4$ is an alkoxy group, a haloalkoxy group, a hydroxyl group, an alkyl group, a haloalkyl group, or an amino group; and
$R^5$ to $R^{13}$ are independently hydrogen, a C1 to C10 alkyl group, or cycloalkyl group.

In one aspect, $R^4$ in structure IV is an alkoxy group. In another aspect, $R^4$ in structure IV is a methoxy group. In another aspect, $R^4$ in structure IV is a dialkylamino group. In another aspect, $R^4$ in structure IV is a dimethylamino group. In another aspect, $R^2$ in structure IV is an unsubstituted furyl group. In another aspect, $R^2$ in structure IV is a substituted or unsubstituted thienyl group. In another aspect, $R^5$ and $R^6$ in structure IV are each a methyl group and $R^9$ is an isopropyl group. In another aspect, $R^5$ and $R^6$ are each a methyl group, $R^9$ is an isopropyl group, and $R^7$, $R^8$, and $R^{10}$-$R^{13}$ are each hydrogen in structure IV.

In another aspect, the compound is
(5-bromo-N-(2-(4-isopropyl-2,2-dimethyltetrahydro-2H-pyran-4-yl)ethyl)-N-(4-methoxybenzyl)thiophene-2-carboxamide);
(N-(2-(4-isopropyl-2,2-dimethyltetrahydro-2H-pyran-4-yl)ethyl)-N-(4-methoxybenzyl)thiophene-3-carboxamide);
(N-(2-(4-isopropyl-2,2-dimethyltetrahydro-2H-pyran-4-yl)ethyl)-N-(4-methoxybenzyl)furan-3-carboxamide);
(N-(2-(4-isopropyl-2,2-dimethyltetrahydro-2H-pyran-4-yl)ethyl)-N-(4-methoxybenzyl)oxazole-5-carboxamide);
(N-(2-(4-isopropyl-2,2-dimethyltetrahydro-2H-pyran-4-yl)ethyl)-N-(4-methoxybenzyl)-1H-pyrrole-2-carboxamide);
(N-(2-(4-isopropyl-2,2-dimethyltetrahydro-2H-pyran-4-yl)ethyl)-N-(4-(trifluoromethoxy)benzyl)furan-2-carboxamide);
(N-(2-(4-isopropyl-2,2-dimethyltetrahydro-2H-pyran-4-yl)ethyl)-N-(4-methoxy-2-(trifluoromethyl)benzyl)furan-2-carboxamide);
(N-((1H-indol-5-yl)methyl)-N-(2-(4-isopropyl-2,2-dimethyltetrahydro-2H-pyran-4-yl)ethyl)furan-2-carboxamide);
(5-chloro-N-(2-(4-isopropyl-2,2-dimethyltetrahydro-2H-pyran-4-yl)ethyl)-N-(4-methoxybenzyl)furan-2-carboxamide);
(N-(2-(4-isopropyl-2,2-dimethyltetrahydro-2H-pyran-4-yl)ethyl)-N-(4-methoxybenzyl)thiophene-2-carboxamide);
(N-(2-(4-isopropyl-2,2-dimethyltetrahydro-2H-pyran-4-yl)ethyl)-N-(4-methoxybenzyl)pyrimidine-4-carboxamide);
(N-(2-(4-isopropyl-2,2-dimethyltetrahydro-2H-pyran-4-yl)ethyl)-N-(4-methoxybenzyl)pyrimidine-5-carboxamide);
(N-(2-(4-isopropyl-2,2-dimethyltetrahydro-2H-pyran-4-yl)ethyl)-N-(4-methoxybenzyl)-1H-imidazole-5-carboxamide);
(2-(furan-2-yl)-N-(2-(4-isopropyl-2,2-dimethyltetrahydro-2H-pyran-4-yl)ethyl)-N-(4-methoxybenzyl)acetamide);
(N-(4-methoxybenzyl)-N-(2-(tetrahydro-2H-pyran-4-yl)ethyl)furan-2-carboxamide);
(N-(4-(dimethylamino)benzyl)-N-(2-(4-isopropyl-2,2-dimethyltetrahydro-2H-pyran-4-yl)ethyl)furan-2-carboxamide); and
(N-(2-(2,2-dimethyltetrahydro-2H-pyran-4-yl)ethyl)-N-(4-methoxybenzyl)furan-2-carboxamide).

Exemplary methods for producing compounds described herein, as well as characterization information, are provided in the Examples. For example, Schemes 1 and 2 provide synthetic procedures for making a variety of different compounds described herein. Solvents, temperatures, presence or absence of protecting groups, and other reaction conditions may vary according to the specific substituents in the compound being synthesized.

Pharmaceutical Compositions

In various aspects, the present disclosure relates to pharmaceutical compositions comprising a therapeutically effective amount of at least one disclosed compound, at least one product of a disclosed method, or a pharmaceutically acceptable salt thereof. As used herein, "pharmaceutically-acceptable carriers" means one or more of a pharmaceutically acceptable diluents, preservatives, antioxidants, solubilizers, emulsifiers, coloring agents, releasing agents, coating agents, sweetening, flavoring and perfuming agents, and adjuvants. The disclosed pharmaceutical compositions can be conveniently presented in unit dosage form and prepared by any of the methods well known in the art of pharmacy and pharmaceutical sciences.

In a further aspect, the disclosed pharmaceutical compositions comprise a therapeutically effective amount of at least one disclosed compound, at least one product of a disclosed method, or a pharmaceutically acceptable salt thereof as an active ingredient, a pharmaceutically acceptable carrier, optionally one or more other therapeutic agent, and optionally one or more adjuvant. The disclosed pharmaceutical compositions include those suitable for oral, rectal, topical, pulmonary, nasal, and parenteral administration, although the most suitable route in any given case will depend on the particular host, and nature and severity of the conditions for which the active ingredient is being administered. In a further aspect, the disclosed pharmaceutical composition can be formulated to allow administration orally, nasally, via inhalation, parenterally, paracancerally, transmucosally, transdermally, intramuscularly, intravenously, intradermally, subcutaneously, intraperitoneally, intraventricularly, intracranially and intratumorally.

As used herein, "parenteral administration" includes administration by bolus injection or infusion, as well as administration by intravenous, intramuscular, intraarterial, intrathecal, intracapsular, intraorbital, intracardiac, intradermal, intraperitoneal, transtracheal, subcutaneous, subcuticular, intraarticular, subcapsular subarachnoid, intraspinal, epidural and intrasternal injection and infusion.

In various aspects, the present disclosure also relates to a pharmaceutical composition comprising a pharmaceutically acceptable carrier or diluent and, as active ingredient, a therapeutically effective amount of a disclosed compound, a product of a disclosed method of making, a pharmaceutically acceptable salt, a hydrate thereof, a solvate thereof, a polymorph thereof, or a stereochemically isomeric form thereof. In a further aspect, a disclosed compound, a product of a disclosed method of making, a pharmaceutically acceptable salt, a hydrate thereof, a solvate thereof, a polymorph thereof, or a stereochemically isomeric form thereof, or any subgroup or combination thereof may be formulated into various pharmaceutical forms for administration purposes.

In practice, the compounds of the present disclosure, or pharmaceutically acceptable salts thereof, of the present disclosure can be combined as the active ingredient in intimate admixture with a pharmaceutical carrier according to conventional pharmaceutical compounding techniques. The carrier can take a wide variety of forms depending on the form of preparation desired for administration, e.g., oral or parenteral (including intravenous). Thus, the pharmaceutical compositions of the present disclosure can be presented as discrete units suitable for oral administration such as capsules, cachets or tablets each containing a predetermined amount of the active ingredient. Further, the compositions can be presented as a powder, as granules, as a solution, as a suspension in an aqueous liquid, as a non-aqueous liquid, as an oil-in-water emulsion or as a water-in-oil liquid emulsion. In addition to the common dosage forms set out above, the compounds of the present disclosure, and/or pharmaceutically acceptable salt(s) thereof, can also be administered by controlled release means and/or delivery devices. The compositions can be prepared by any of the methods of pharmacy. In general, such methods include a step of bringing into association the active ingredient with the carrier that constitutes one or more necessary ingredients. In general, the compositions are prepared by uniformly and intimately admixing the active ingredient with liquid carriers or finely divided solid carriers or both. The product can then be conveniently shaped into the desired presentation.

It is especially advantageous to formulate the aforementioned pharmaceutical compositions in unit dosage form for ease of administration and uniformity of dosage. The term "unit dosage form," as used herein, refers to physically discrete units suitable as unitary dosages, each unit containing a predetermined quantity of active ingredient calculated to produce the desired therapeutic effect in association with the required pharmaceutical carrier. That is, a "unit dosage form" is taken to mean a single dose wherein all active and inactive ingredients are combined in a suitable system, such that the patient or person administering the drug to the patient can open a single container or package with the entire dose contained therein, and does not have to mix any components together from two or more containers or packages. Typical examples of unit dosage forms are tablets (including scored or coated tablets), capsules or pills for oral administration; single dose vials for injectable solutions or suspension; suppositories for rectal administration; powder packets; wafers; and segregated multiples thereof. This list of unit dosage forms is not intended to be limiting in any way, but merely to represent typical examples of unit dosage forms.

The pharmaceutical compositions disclosed herein comprise a compound of the present disclosure (or pharmaceutically acceptable salts thereof) as an active ingredient, a pharmaceutically acceptable carrier, and optionally one or more additional therapeutic agents. In various aspects, the disclosed pharmaceutical compositions can include a pharmaceutically acceptable carrier and a disclosed compound, or a pharmaceutically acceptable salt thereof. In a further aspect, a disclosed compound, or pharmaceutically acceptable salt thereof, can also be included in a pharmaceutical composition in combination with one or more other therapeutically active compounds. The instant compositions include compositions suitable for oral, rectal, topical, and parenteral (including subcutaneous, intramuscular, and intravenous) administration, although the most suitable route in any given case will depend on the particular host, and nature and severity of the conditions for which the active ingredient is being administered. The pharmaceutical compositions can be conveniently presented in unit dosage form and prepared by any of the methods well known in the art of pharmacy.

Techniques and compositions for making dosage forms useful for materials and methods described herein are described, for example, in the following references: Modern Pharmaceutics, Chapters 9 and 10 (Banker & Rhodes, Editors, 1979); Pharmaceutical Dosage Forms: Tablets (Lieberman et al., 1981); Ansel, Introduction to Pharmaceutical Dosage Forms 2nd Edition (1976); Remington's Pharmaceutical Sciences, 17th ed. (Mack Publishing Company, Easton, Pa., 1985); Advances in Pharmaceutical Sciences (David Ganderton, Trevor Jones, Eds., 1992); Advances in Pharmaceutical Sciences Vol 7. (David Ganderton, Trevor Jones, James McGinity, Eds., 1995); Aqueous Polymeric Coatings for Pharmaceutical Dosage Forms (Drugs and the Pharmaceutical Sciences, Series 36 (James McGinity, Ed., 1989); Pharmaceutical Particulate Carriers: Therapeutic Applications: Drugs and the Pharmaceutical Sciences, Vol 61 (Alain Rolland, Ed., 1993); Drug Delivery to the Gastrointestinal Tract (Ellis Horwood Books in the Biological Sciences. Series in Pharmaceutical Technology; J. G. Hardy, S. S. Davis, Clive G. Wilson, Eds.); Modern Pharmaceutics Drugs and the Pharmaceutical Sciences, Vol 40 (Gilbert S. Banker, Christopher T. Rhodes, Eds.).

The compounds described herein are typically to be administered in admixture with suitable pharmaceutical diluents, excipients, extenders, or carriers (termed herein as a pharmaceutically acceptable carrier, or a carrier) suitably selected with respect to the intended form of administration and as consistent with conventional pharmaceutical practices. The deliverable compound will be in a form suitable for oral, rectal, topical, intravenous injection or parenteral administration. Carriers include solids or liquids, and the type of carrier is chosen based on the type of administration being used. The compounds may be administered as a dosage that has a known quantity of the compound.

Because of the ease in administration, oral administration can be a preferred dosage form, and tablets and capsules represent the most advantageous oral dosage unit forms in which case solid pharmaceutical carriers are obviously employed. However, other dosage forms may be suitable depending upon clinical population (e.g., age and severity of clinical condition), solubility properties of the specific disclosed compound used, and the like. Accordingly, the disclosed compounds can be used in oral dosage forms such as pills, powders, granules, elixirs, tinctures, suspensions, syrups, and emulsions. In preparing the compositions for oral dosage form, any convenient pharmaceutical media can be employed. For example, water, glycols, oils, alcohols, flavoring agents, preservatives, coloring agents and the like can be used to form oral liquid preparations such as suspensions, elixirs and solutions; while carriers such as starches, sugars, microcrystalline cellulose, diluents, granulating agents, lubricants, binders, disintegrating agents, and the like can be used to form oral solid preparations such as powders, capsules and tablets. Because of their ease of administration, tablets and capsules are the preferred oral dosage units whereby solid pharmaceutical carriers are employed. Optionally, tablets can be coated by standard aqueous or nonaqueous techniques.

The disclosed pharmaceutical compositions in an oral dosage form can comprise one or more pharmaceutical excipient and/or additive. Non-limiting examples of suitable excipients and additives include gelatin, natural sugars such as raw sugar or lactose, lecithin, pectin, starches (for example corn starch or amylose), dextran, polyvinyl pyrrolidone, polyvinyl acetate, gum arabic, alginic acid, tylose, talcum, lycopodium, silica gel (for example colloidal), cellulose, cellulose derivatives (for example cellulose ethers in which the cellulose hydroxy groups are partially etherified with lower saturated aliphatic alcohols and/or lower saturated, aliphatic oxyalcohols, for example methyl oxypropyl cellulose, methyl cellulose, hydroxypropyl methyl cellulose, hydroxypropyl methyl cellulose phthalate), fatty acids as well as magnesium, calcium or aluminum salts of fatty acids with 12 to 22 carbon atoms, in particular saturated (for example stearates), emulsifiers, oils and fats, in particular vegetable (for example, peanut oil, castor oil, olive oil, sesame oil, cottonseed oil, corn oil, wheat germ oil, sunflower seed oil, cod liver oil, in each case also optionally hydrated); glycerol esters and polyglycerol esters of saturated fatty acids $C_{12}H_{24}O_2$ to $C_{18}H_{36}O_2$ and their mixtures, it being possible for the glycerol hydroxy groups to be totally or also only partly esterified (for example mono-, di- and triglycerides); pharmaceutically acceptable mono- or multivalent alcohols and polyglycols such as polyethylene glycol and derivatives thereof, esters of aliphatic saturated or unsaturated fatty acids (2 to 22 carbon atoms, in particular 10-18 carbon atoms) with monovalent aliphatic alcohols (1 to 20 carbon atoms) or multivalent alcohols such as glycols, glycerol, diethylene glycol, pentacrythritol, sorbitol, mannitol and the like, which may optionally also be etherified, esters of citric acid with primary alcohols, acetic acid, urea, benzyl benzoate, dioxolanes, glyceroformals, tetrahydrofurfuryl alcohol, polyglycol ethers with C1-C12-alcohols, dimethylacetamide, lactamides, lactates, ethyl carbonates, silicones (in particular medium-viscous polydimethyl siloxanes), calcium carbonate, sodium carbonate, calcium phosphate, sodium phosphate, magnesium carbonate and the like.

Other auxiliary substances useful in preparing an oral dosage form are those which cause disintegration (so-called disintegrants), such as: cross-linked polyvinyl pyrrolidone, sodium carboxymethyl starch, sodium carboxymethyl cellulose or microcrystalline cellulose. Conventional coating substances may also be used to produce the oral dosage form. Those that may for example be considered are: polymerizates as well as copolymerizates of acrylic acid and/or methacrylic acid and/or their esters; copolymerizates of acrylic and methacrylic acid esters with a lower ammonium group content (for example EudragitR RS), copolymerizates of acrylic and methacrylic acid esters and trimethyl ammonium methacrylate (for example EudragitR RL); polyvinyl acetate; fats, oils, waxes, fatty alcohols; hydroxypropyl methyl cellulose phthalate or acetate succinate; cellulose acetate phthalate, starch acetate phthalate as well as polyvinyl acetate phthalate, carboxy methyl cellulose; methyl cellulose phthalate, methyl cellulose succinate, -phthalate succinate as well as methyl cellulose phthalic acid half ester; zein; ethyl cellulose as well as ethyl cellulose succinate; shellac, gluten; ethylcarboxyethyl cellulose; ethacrylate-maleic acid anhydride copolymer; maleic acid anhydride-vinyl methyl ether copolymer; styrol-maleic acid copolymerizate; 2-ethyl-hexyl-acrylate maleic acid anhydride; crotonic acid-vinyl acetate copolymer; glutaminic acid/glutamic acid ester copolymer; carboxymethylethylcellulose glycerol monooctanoate; cellulose acetate succinate; polyarginine.

Plasticizing agents that may be considered as coating substances in the disclosed oral dosage forms are: citric and tartaric acid esters (acetyl-triethyl citrate, acetyl tributyl-, tributyl-, triethyl-citrate); glycerol and glycerol esters (glycerol diacetate, -triacetate, acetylated monoglycerides, castor oil); phthalic acid esters (dibutyl-, diamyl-, diethyl-, dimethyl-, dipropyl-phthalate), di-(2-methoxy- or 2-ethoxyethyl)-phthalate, ethylphthalyl glycolate, butylphthalylethyl glycolate and butylglycolate; alcohols (propylene glycol, polyethylene glycol of various chain lengths), adipates (diethyladipate, di-(2-methoxy- or 2-ethoxyethyl)-adipate; benzophenone; diethyl- and diburylsebacate, dibutylsuccinate, dibutyltartrate; diethylene glycol dipropionate; ethyleneglycol diacetate, -dibutyrate, -dipropionate; tributyl phosphate, tributyrin; polyethylene glycol sorbitan monooleate (polysorbates such as Polysorbar 50); sorbitan monooleate.

Moreover, suitable binders, lubricants, disintegrating agents, coloring agents, flavoring agents, flow-inducing agents, and melting agents may be included as carriers. The pharmaceutical carrier employed can be, for example, a solid, liquid, or gas. Examples of solid carriers include, but are not limited to, lactose, terra alba, sucrose, glucose, methylcellulose, dicalcium phosphate, calcium sulfate, mannitol, sorbitol talc, starch, gelatin, agar, pectin, acacia, magnesium stearate, and stearic acid. Examples of liquid carriers are sugar syrup, peanut oil, olive oil, and water. Examples of gaseous carriers include carbon dioxide and nitrogen.

In various aspects, a binder can include, for example, starch, gelatin, natural sugars such as glucose or beta-lactose, corn sweeteners, natural and synthetic gums such as acacia, tragacanth, or sodium alginate, carboxymethylcellulose, polyethylene glycol, waxes, and the like. Lubricants used in these dosage forms include sodium oleate, sodium stearate, magnesium stearate, sodium benzoate, sodium acetate, sodium chloride, and the like. In a further aspect, a disintegrator can include, for example, starch, methyl cellulose, agar, bentonite, xanthan gum, and the like.

In various aspects, an oral dosage form, such as a solid dosage form, can comprise a disclosed compound that is attached to polymers as targetable drug carriers or as a prodrug. Suitable biodegradable polymers useful in achieving controlled release of a drug include, for example, polylactic acid, polyglycolic acid, copolymers of polylactic and polyglycolic acid, caprolactones, polyhydroxy butyric acid, polyorthoesters, polyacetals, polydihydropyrans, polycyanoacylates, and hydrogels, preferably covalently crosslinked hydrogels.

Tablets may contain the active ingredient in admixture with non-toxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, corn starch, or alginic acid; binding agents, for example starch, gelatin or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period.

A tablet containing a disclosed compound can be prepared by compression or molding, optionally with one or more accessory ingredients or adjuvants. Compressed tablets can be prepared by compressing, in a suitable machine, the active ingredient in a free-flowing form such as powder or granules, optionally mixed with a binder, lubricant, inert diluent, surface active or dispersing agent. Molded tablets can be made by molding in a suitable machine, a mixture of the powdered compound moistened with an inert liquid diluent.

In various aspects, a solid oral dosage form, such as a tablet, can be coated with an enteric coating to prevent ready decomposition in the stomach. In various aspects, enteric coating agents include, but are not limited to, hydroxypropylmethylcellulose phthalate, methacrylic acid-methacrylic acid ester copolymer, polyvinyl acetate-phthalate and cellulose acetate phthalate. Akihiko Hasegawa "Application of solid dispersions of Nifedipine with enteric coating agent to prepare a sustained-release dosage form" Chem. Pharm. Bull. 33:1615-1619 (1985). Various enteric coating materials may be selected on the basis of testing to achieve an enteric coated dosage form designed ab initio to have a preferable combination of dissolution time, coating thicknesses and diametral crushing strength (e.g., see S. C. Porter et al. "The Properties of Enteric Tablet Coatings Made From Polyvinyl Acetate-phthalate and Cellulose acetate Phthalate", J. Pharm. Pharmacol. 22:42p (1970)). In a further aspect, the enteric coating may comprise hydroxypropylmethylcellulose phthalate, methacrylic acid-methacrylic acid ester copolymer, polyvinyl acetate-phthalate and cellulose acetate phthalate.

In various aspects, an oral dosage form can be a solid dispersion with a water soluble or a water insoluble carrier. Examples of water soluble or water insoluble carrier include, but are not limited to, polyethylene glycol, polyvinylpyrrolidone, hydroxypropylmethyl-cellulose, phosphatidylcholine, polyoxyethylene hydrogenated castor oil, hydroxypropylmethylcellulose phthalate, carboxymethylethylcellulose, or hydroxypropylmethylcellulose, ethyl cellulose, or stearic acid.

In various aspects, an oral dosage form can be in a liquid dosage form, including those that are ingested, or alternatively, administered as a mouth wash or gargle. For example, a liquid dosage form can include aqueous suspensions, which contain the active materials in admixture with excipients suitable for the manufacture of aqueous suspensions. In addition, oily suspensions may be formulated by suspending the active ingredient in a vegetable oil, for example *arachis* oil, olive oil, sesame oil or coconut oil, or in a mineral oil such as liquid paraffin. Oily suspensions may also contain various excipients. The pharmaceutical compositions of the present disclosure may also be in the form of oil-in-water emulsions, which may also contain excipients such as sweetening and flavoring agents.

For the preparation of solutions or suspensions it is, for example, possible to use water, particularly sterile water, or physiologically acceptable organic solvents, such as alcohols (ethanol, propanol, isopropanol, 1,2-propylene glycol, polyglycols and their derivatives, fatty alcohols, partial esters of glycerol), oils (for example peanut oil, olive oil, sesame oil, almond oil, sunflower oil, soya bean oil, castor oil, bovine hoof oil), paraffins, dimethyl sulfoxide, triglycerides and the like.

In the case of a liquid dosage form such as a drinkable solutions, the following substances may be used as stabilizers or solubilizers: lower aliphatic mono- and multivalent alcohols with 2-4 carbon atoms, such as ethanol, n-propanol, glycerol, polyethylene glycols with molecular weights between 200-600 (for example 1 to 40% aqueous solution), diethylene glycol monoethyl ether, 1,2-propylene glycol, organic amides, for example amides of aliphatic C1-C6-carboxylic acids with ammonia or primary, secondary or tertiary C1-C4-amines or C1-C4-hydroxy amines such as urea, urethane, acetamide, N-methyl acetamide, N,N-diethyl acetamide, N,N-dimethyl acetamide, lower aliphatic amines and diamines with 2-6 carbon atoms, such as ethylene diamine, hydroxyethyl theophylline, tromethamine (for example as 0.1 to 20% aqueous solution), aliphatic amino acids.

In preparing the disclosed liquid dosage form can comprise solubilizers and emulsifiers such as the following non-limiting examples can be used: polyvinyl pyrrolidone, sorbitan fatty acid esters such as sorbitan trioleate, phosphatides such as lecithin, acacia, tragacanth, polyoxyethylated sorbitan monooleate and other ethoxylated fatty acid esters of sorbitan, polyoxyethylated fats, polyoxyethylated oleotriglycerides, linolizated oleotriglycerides, polyethylene oxide condensation products of fatty alcohols, alkylphenols or fatty acids or also 1-methyl-3-(2-hydroxyethyl)imidazolidone-(2). In this context, polyoxyethylated means that the substances in question contain polyoxyethylene chains, the degree of polymerization of which generally lies between 2 and 40 and in particular between 10 and 20. Polyoxyethylated substances of this kind may for example be obtained by reaction of hydroxyl group-containing compounds (for example mono- or diglycerides or unsaturated compounds such as those containing oleic acid radicals) with ethylene oxide (for example 40 Mol ethylene oxide per 1 Mol glyceride). Examples of oleotriglycerides are olive oil, peanut oil, castor oil, sesame oil, cottonseed oil, corn oil. See also Dr. H. P. Fiedler "Lexikon der Hillsstoffe für Pharmazie, Kostnetik und angrenzende Gebiete" 1971, pages 191-195.

In various aspects, a liquid dosage form can further comprise preservatives, stabilizers, buffer substances, flavor correcting agents, sweeteners, colorants, antioxidants and complex formers and the like. Complex formers which may be for example be considered are: chelate formers such as ethylene diamine retrascetic acid, nitrilotriacetic acid, diethylene triamine pentacetic acid and their salts.

It may optionally be necessary to stabilize a liquid dosage form with physiologically acceptable bases or buffers to a pH range of approximately 6 to 9. Preference may be given to as neutral or weakly basic a pH value as possible (up to pH 8).

In order to enhance the solubility and/or the stability of a disclosed compound in a disclosed liquid dosage form, a parenteral injection form, or an intravenous injectable form, it can be advantageous to employ α-, β- or γ-cyclodextrins or their derivatives, in particular hydroxyalkyl substituted cyclodextrins, e.g. 2-hydroxypropyl-β-cyclodextrin or sulfobutyl-β-cyclodextrin. Also co-solvents such as alcohols may improve the solubility and/or the stability of the compounds according to the present disclosure in pharmaceutical compositions.

In various aspects, a disclosed liquid dosage form, a parenteral injection form, or an intravenous injectable form can further comprise liposome delivery systems, such as small unilamellar vesicles, large unilamellar vesicles, and multilamellar vesicles. Liposomes can be formed from a variety of phospholipids, such as cholesterol, stearylamine, or phosphatidylcholines.

Pharmaceutical compositions of the present disclosure suitable injection, such as parenteral administration, such as intravenous, intramuscular, or subcutaneous administration. Pharmaceutical compositions for injection can be prepared as solutions or suspensions of the active compounds in water. A suitable surfactant can be included such as, for example, hydroxypropylcellulose. Dispersions can also be prepared in glycerol, liquid polyethylene glycols, and mixtures thereof in oils. Further, a preservative can be included to prevent the detrimental growth of microorganisms.

Pharmaceutical compositions of the present disclosure suitable for parenteral administration can include sterile aqueous or oleaginous solutions, suspensions, or dispersions. Furthermore, the compositions can be in the form of sterile powders for the extemporaneous preparation of such sterile injectable solutions or dispersions. In some aspects, the final injectable form is sterile and must be effectively fluid for use in a syringe. The pharmaceutical compositions should be stable under the conditions of manufacture and storage; thus, preferably should be preserved against the contaminating action of microorganisms such as bacteria and fungi. The carrier can be a solvent or dispersion medium containing, for example, water, ethanol, polyol (e.g., glycerol, propylene glycol and liquid polyethylene glycol), vegetable oils, and suitable mixtures thereof.

Injectable solutions, for example, can be prepared in which the carrier comprises saline solution, glucose solution or a mixture of saline and glucose solution. Injectable suspensions may also be prepared in which case appropriate liquid carriers, suspending agents and the like may be employed. In some aspects, a disclosed parenteral formulation can comprise about 0.01-0.1 M, e.g. about 0.05 M, phosphate buffer. In a further aspect, a disclosed parenteral formulation can comprise about 0.9% saline.

In various aspects, a disclosed parenteral pharmaceutical composition can comprise pharmaceutically acceptable carriers such as aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include but not limited to water, alcoholic/aqueous solutions, emulsions or suspensions, including saline and buffered media. Parenteral vehicles can include mannitol, normal serum albumin, sodium chloride solution, Ringer's dextrose, dextrose and sodium chloride, lactated Ringer's and fixed oils. Intravenous vehicles include fluid and nutrient replenishers, electrolyte replenishers such as those based on Ringer's dextrose, and the like. Preservatives and other additives may also be present, such as, for example, antimicrobials, antioxidants, collating agents, inert gases and the like. In a further aspect, a disclosed parenteral pharmaceutical composition can comprise may contain minor amounts of additives such as substances that enhance isotonicity and chemical stability, e.g., buffers and preservatives. Also contemplated for injectable pharmaceutical compositions are solid form preparations that are intended to be converted, shortly before use, to liquid form preparations. Furthermore, other adjuvants can be included to render the formulation isotonic with the blood of the subject or patient.

In addition to the pharmaceutical compositions described herein above, the disclosed compounds can also be formulated as a depot preparation. Such long acting formulations can be administered by implantation (e.g., subcutaneously or intramuscularly) or by intramuscular injection. Thus, for example, the compounds can be formulated with suitable polymeric or hydrophobic materials (e.g., as an emulsion in an acceptable oil) or ion exchange resins, or as sparingly soluble derivatives, e.g., as a sparingly soluble salt.

Pharmaceutical compositions of the present disclosure can be in a form suitable for topical administration. As used herein, the phrase "topical application" means administration onto a biological surface, whereby the biological surface includes, for example, a skin area (e.g., hands, forearms, elbows, legs, face, nails, anus and genital areas) or a mucosal membrane. By selecting the appropriate carrier and optionally other ingredients that can be included in the composition, as is detailed herein below, the compositions of the present invention may be formulated into any form typically employed for topical application. A topical pharmaceutical composition can be in a form of a cream, an ointment, a paste, a gel, a lotion, milk, a suspension, an aerosol, a spray, foam, a dusting powder, a pad, and a patch. Further, the compositions can be in a form suitable for use in transdermal devices. These formulations can be prepared, utilizing a compound of the present disclosure, or pharmaceutically acceptable salts thereof, via conventional processing methods. As an example, a cream or ointment is prepared by mixing hydrophilic material and water, together with about 5 wt % to about 10 wt % of the compound, to produce a cream or ointment having a desired consistency.

In the compositions suitable for percutaneous administration, the carrier optionally comprises a penetration enhancing agent and/or a suitable wetting agent, optionally combined with suitable additives of any nature in minor proportions, which additives do not introduce a significant deleterious effect on the skin. Said additives may facilitate the administration to the skin and/or may be helpful for preparing the desired compositions. These compositions may be administered in various ways, e.g., as a transdermal patch, as a spot-on, as an ointment.

Ointments are semisolid preparations, typically based on petrolatum or petroleum derivatives. The specific ointment base to be used is one that provides for optimum delivery for the active agent chosen for a given formulation, and, preferably, provides for other desired characteristics as well (e.g., emollience). As with other carriers or vehicles, an ointment base should be inert, stable, nonirritating and nonsensitizing. As explained in Remington: The Science and Practice of Pharmacy, 19th Ed., Easton, Pa.: Mack Publishing Co. (1995), pp. 1399-1404, ointment bases may be grouped in four classes: oleaginous bases; emulsifiable bases; emulsion bases; and water-soluble bases. Oleaginous ointment bases include, for example, vegetable oils, fats obtained from animals, and semisolid hydrocarbons obtained from petroleum. Emulsifiable ointment bases, also known as absorbent ointment bases, contain little or no water and include, for example, hydroxystearin sulfate, anhydrous lanolin and hydrophilic petrolatum. Emulsion ointment bases are either water-in-oil (W/O) emulsions or oil-in-water (O/W) emulsions, and include, for example, cetyl alcohol, glyceryl monostearate, lanolin and stearic acid. Preferred water-soluble ointment bases are prepared from polyethylene glycols of varying molecular weight.

Lotions are preparations that are to be applied to the skin surface without friction. Lotions are typically liquid or semiliquid preparations in which solid particles, including the active agent, are present in a water or alcohol base. Lotions are typically preferred for treating large body areas, due to the ease of applying a more fluid composition. Lotions are typically suspensions of solids, and oftentimes comprise a liquid oily emulsion of the oil-in-water type. It is generally necessary that the insoluble matter in a lotion be finely divided. Lotions typically contain suspending agents to produce better dispersions as well as compounds useful for localizing and holding the active agent in contact with the skin, such as methylcellulose, sodium carboxymethylcellulose, and the like.

Creams are viscous liquids or semisolid emulsions, either oil-in-water or water-in-oil. Cream bases are typically water-washable, and contain an oil phase, an emulsifier and an aqueous phase. The oil phase, also called the "internal" phase, is generally comprised of petrolatum and/or a fatty alcohol such as cetyl or stearyl alcohol. The aqueous phase typically, although not necessarily, exceeds the oil phase in volume, and generally contains a humectant. The emulsifier in a cream formulation is generally a nonionic, anionic, cationic or amphoteric surfactant. Reference may be made to Remington: The Science and Practice of Pharmacy, supra, for further information.

Pastes are semisolid dosage forms in which the bioactive agent is suspended in a suitable base. Depending on the nature of the base, pastes are divided between fatty pastes or those made from a single-phase aqueous gel. The base in a fatty paste is generally petrolatum, hydrophilic petrolatum and the like. The pastes made from single-phase aqueous gels generally incorporate carboxymethylcellulose or the like as a base. Additional reference may be made to Remington: The Science and Practice of Pharmacy, for further information.

Gel formulations are semisolid, suspension-type systems. Single-phase gels contain organic macromolecules distributed substantially uniformly throughout the carrier liquid, which is typically aqueous, but also, preferably, contain an alcohol and, optionally, an oil. Preferred organic macromolecules, i.e., gelling agents, are crosslinked acrylic acid polymers such as the family of carbomer polymers, e.g., carboxypolyalkylenes that may be obtained commercially under the trademark Carbopol™. Other types of preferred polymers in this context are hydrophilic polymers such as polyethylene oxides, polyoxyethylene-polyoxypropylene copolymers and polyvinylalcohol; modified cellulose, such as hydroxypropyl cellulose, hydroxyethyl cellulose, hydroxypropyl methylcellulose, hydroxypropyl methylcellulose phthalate, and methyl cellulose; gums such as tragacanth and xanthan gum; sodium alginate; and gelatin. In order to prepare a uniform gel, dispersing agents such as alcohol or glycerin can be added, or the gelling agent can be dispersed by trituration, mechanical mixing or stirring, or combinations thereof.

Sprays generally provide the active agent in an aqueous and/or alcoholic solution which can be misted onto the skin for delivery. Such sprays include those formulated to provide for concentration of the active agent solution at the site of administration following delivery, e.g., the spray solution can be primarily composed of alcohol or other like volatile liquid in which the active agent can be dissolved. Upon delivery to the skin, the carrier evaporates, leaving concentrated active agent at the site of administration.

Foam compositions are typically formulated in a single or multiple phase liquid form and housed in a suitable container, optionally together with a propellant which facilitates the expulsion of the composition from the container, thus transforming it into a foam upon application. Other foam forming techniques include, for example the "Bag-in-a-can" formulation technique. Compositions thus formulated typically contain a low-boiling hydrocarbon, e.g., isopropane. Application and agitation of such a composition at the body temperature cause the isopropane to vaporize and generate the foam, in a manner similar to a pressurized aerosol foaming system. Foams can be water-based or aqueous alkanolic, but are typically formulated with high alcohol content which, upon application to the skin of a user, quickly evaporates, driving the active ingredient through the upper skin layers to the site of treatment.

Skin patches typically comprise a backing, to which a reservoir containing the active agent is attached. The reservoir can be, for example, a pad in which the active agent or composition is dispersed or soaked, or a liquid reservoir. Patches typically further include a frontal water permeable adhesive, which adheres and secures the device to the treated region. Silicone rubbers with self-adhesiveness can alternatively be used. In both cases, a protective permeable layer can be used to protect the adhesive side of the patch prior to its use. Skin patches may further comprise a removable cover, which serves for protecting it upon storage.

Examples of patch configuration which can be utilized with the present invention include a single-layer or multi-layer drug-in-adhesive systems which are characterized by the inclusion of the drug directly within the skin-contacting adhesive. In such a transdermal patch design, the adhesive not only serves to affix the patch to the skin, but also serves as the formulation foundation, containing the drug and all the excipients under a single backing film. In the multi-layer drug-in-adhesive patch a membrane is disposed between two distinct drug-in-adhesive layers or multiple drug-in-adhesive layers are incorporated under a single backing film.

Examples of pharmaceutically acceptable carriers that are suitable for pharmaceutical compositions for topical applications include carrier materials that are well-known for use in the cosmetic and medical arts as bases for e.g., emulsions, creams, aqueous solutions, oils, ointments, pastes, gels, lotions, milks, foams, suspensions, aerosols and the like, depending on the final form of the composition. Representative examples of suitable carriers according to the present invention therefore include, without limitation, water, liquid alcohols, liquid glycols, liquid polyalkylene glycols, liquid esters, liquid amides, liquid protein hydrolysates, liquid alkylated protein hydrolysates, liquid lanolin and lanolin derivatives, and like materials commonly employed in cosmetic and medicinal compositions. Other suitable carriers according to the present invention include, without limitation, alcohols, such as, for example, monohydric and polyhydric alcohols, e.g., ethanol, isopropanol, glycerol, sorbitol, 2-methoxyethanol, diethyleneglycol, ethylene glycol, hexyleneglycol, mannitol, and propylene glycol; ethers such as diethyl or dipropyl ether; polyethylene glycols and methoxypolyoxyethylenes (carbowaxes having molecular weight ranging from 200 to 20,000); polyoxyethylene glycerols, polyoxyethylene sorbitols, stearoyl diacetin, and the like.

Topical compositions of the present disclosure can, if desired, be presented in a pack or dispenser device, such as an FDA-approved kit, which may contain one or more unit dosage forms containing the active ingredient. The dispenser device may, for example, comprise a tube. The pack or dispenser device may be accompanied by instructions for administration. The pack or dispenser device may also be accompanied by a notice in a form prescribed by a governmental agency regulating the manufacture, use, or sale of pharmaceuticals, which notice is reflective of approval by the agency of the form of the compositions for human or veterinary administration. Such notice, for example, may include labeling approved by the U.S. Food and Drug Administration for prescription drugs or of an approved product insert. Compositions comprising the topical composition of the invention formulated in a pharmaceutically acceptable carrier may also be prepared, placed in an appropriate container, and labeled for treatment of an indicated condition.

Another patch system configuration which can be used by the present invention is a reservoir transdermal system design which is characterized by the inclusion of a liquid compartment containing a drug solution or suspension separated from the release liner by a semi-permeable membrane and adhesive. The adhesive component of this patch system can either be incorporated as a continuous layer between the membrane and the release liner or in a concentric configuration around the membrane. Yet another patch system configuration which can be utilized by the present invention is a matrix system design which is characterized by the inclusion of a semisolid matrix containing a drug solution or suspension which is in direct contact with the release liner. The component responsible for skin adhesion is incorporated in an overlay and forms a concentric configuration around the semisolid matrix.

Pharmaceutical compositions of the present disclosure can be in a form suitable for rectal administration wherein the carrier is a solid. It is preferable that the mixture forms unit dose suppositories. Suitable carriers include cocoa butter and other materials commonly used in the art. The suppositories can be conveniently formed by first admixing the composition with the softened or melted carrier(s) followed by chilling and shaping in molds.

Pharmaceutical compositions containing a compound of the present disclosure, and/or pharmaceutically acceptable salts thereof, can also be prepared in powder or liquid concentrate form.

The pharmaceutical composition (or formulation) may be packaged in a variety of ways. Generally, an article for distribution includes a container that contains the pharmaceutical composition in an appropriate form. Suitable containers are well known to those skilled in the art and include materials such as bottles (plastic and glass), sachets, foil blister packs, and the like. The container may also include a tamper proof assemblage to prevent indiscreet access to the contents of the package. In addition, the container typically has deposited thereon a label that describes the contents of the container and any appropriate warnings or instructions.

The disclosed pharmaceutical compositions may, if desired, be presented in a pack or dispenser device which may contain one or more unit dosage forms containing the active ingredient. The pack may for example comprise metal or plastic foil, such as a blister pack. The pack or dispenser device may be accompanied by instructions for administration. The pack or dispenser may also be accompanied with a notice associated with the container in form prescribed by a governmental agency regulating the manufacture, use, or sale of pharmaceuticals, which notice is reflective of approval by the agency of the form of the drug for human or veterinary administration. Such notice, for example, may be the labeling approved by the U.S. Food and Drug Administration for prescription drugs, or the approved product insert. Pharmaceutical compositions comprising a disclosed compound formulated in a compatible pharmaceutical carrier may also be prepared, placed in an appropriate container, and labeled for treatment of an indicated condition.

The exact dosage and frequency of administration depends on the particular disclosed compound, a product of a disclosed method of making, a pharmaceutically acceptable salt, solvate, or polymorph thereof, a hydrate thereof, a solvate thereof, a polymorph thereof, or a stereochemically isomeric form thereof; the particular condition being treated and the severity of the condition being treated; various factors specific to the medical history of the subject to whom the dosage is administered such as the age; weight, sex, extent of disorder and general physical condition of the particular subject, as well as other medication the individual may be taking; as is well known to those skilled in the art.

Furthermore, it is evident that said effective daily amount may be lowered or increased depending on the response of the treated subject and/or depending on the evaluation of the physician prescribing the compounds of the present disclosure.

Depending on the mode of administration, the pharmaceutical composition will comprise from 0.05 to 99% by weight, preferably from 0.1 to 70% by weight, more preferably from 0.1 to 50% by weight of the active ingredient, and, from 1 to 99.95% by weight, preferably from 30 to 99.9% by weight, more preferably from 50 to 99.9% by weight of a pharmaceutically acceptable carrier, all percentages being based on the total weight of the composition.

In one aspect, an appropriate dosage level will generally be about 0.01 to 1000 mg of a compound described herein per kg patient body weight per day and can be administered in single or multiple doses.

In various aspects, the dosage level will be about 0.1 to about 500 mg/kg per day, about 0.1 to 250 mg/kg per day, or about 0.5 to 100 mg/kg per day. A suitable dosage level can be about 0.01 to 1000 mg/kg per day, about 0.01 to 500 mg/kg per day, about 0.01 to 250 mg/kg per day, about 0.05 to 100 mg/kg per day, or about 0.1 to 50 mg/kg per day. Within this range the dosage can be 0.05 to 0.5, 0.5 to 5.0 or 5.0 to 50 mg/kg per day. For oral administration, the compositions are preferably provided in the form of tablets containing 1.0 to 1000 mg of the active ingredient, particularly 1.0, 5.0, 10, 15, 20, 25, 50, 75, 100, 150, 200, 250, 300, 400, 500, 600, 750, 800, 900 and 1000 mg of the active ingredient for the symptomatic adjustment of the dosage of the patient to be treated. The compound can be administered on a regimen of 1 to 4 times per day, preferably once or twice per day. This dosing regimen can be adjusted to provide the optimal therapeutic response.

Such unit doses as described hereinabove and hereinafter can be administered more than once a day, for example, 2, 3, 4, 5 or 6 times a day. In various aspects, such unit doses can be administered 1 or 2 times per day, so that the total dosage for a 70 kg adult is in the range of 0.001 to about 15 mg per kg weight of subject per administration. In a further aspect, dosage is 0.01 to about 1.5 mg per kg weight of subject per administration, and such therapy can extend for a number of weeks or months, and in some cases, years. It will be understood, however, that the specific dose level for any particular patient will depend on a variety of factors including the activity of the specific compound employed; the age, body weight, general health, sex and diet of the individual being treated; the time and route of administration; the rate of excretion; other drugs that have previously been administered; and the severity of the particular disease undergoing therapy, as is well understood by those of skill in the area.

A typical dosage can be one 1 mg to about 100 mg tablet or 1 mg to about 300 mg taken once a day, or, multiple times per day, or one time-release capsule or tablet taken once a day and containing a proportionally higher content of active ingredient. The time-release effect can be obtained by capsule materials that dissolve at different pH values, by capsules that release slowly by osmotic pressure, or by any other known means of controlled release.

It can be necessary to use dosages outside these ranges in some cases as will be apparent to those skilled in the art. Further, it is noted that the clinician or treating physician will know how and when to start, interrupt, adjust, or terminate therapy in conjunction with individual patient response.

The disclosed pharmaceutical compositions can further comprise other therapeutically active compounds, which are usually applied in the treatment of the above mentioned pathological or clinical conditions.

It is understood that the disclosed compositions can be prepared from the disclosed compounds. It is also understood that the disclosed compositions can be employed in the disclosed methods of using.

As already mentioned, the present disclosure relates to a pharmaceutical composition comprising a therapeutically effective amount of a disclosed compound, a product of a disclosed method of making, a pharmaceutically acceptable salt, a hydrate thereof, a solvate thereof, a polymorph thereof, and a pharmaceutically acceptable carrier. Additionally, the present disclosure relates to a process for preparing such a pharmaceutical composition, characterized in that a pharmaceutically acceptable carrier is intimately mixed with a therapeutically effective amount of a compound according to the present disclosure.

Methods of Use

Nicotinamide adenine dinucleotide ($NAD^+$) is ubiquitous, existing in every cell in the human body and is used and biosynthesized throughout the cell, in the cytoplasm, mitochondria, and nucleus[11]. $NAD^+$ fulfills numerous physiological roles including being an energy production mediator, a co-enzyme for hundreds of enzymes, and a substrate for NADases. In humans, $NAD^+$ is biosynthesized via three distinct pathways. The Preiss Handler pathway from nicotinic acid (NA), the de novo pathway from tryptophan (Trp), and the salvage pathway from nicotinamide (NAM) produced by $NAD^+$ catabolism as a result of NADase activity[12]. The NAM recycled by the salvage pathway is converted into nicotinamide mononucleotide (NMN) by nicotinamide phosphoribosyltransferase (NAMPT), and NMN is then transformed into $NAD^+$ by nicotinamide mononucleotide adenylyltransferase (NMNAT). The salvage pathway dominates cellular $NAD^+$ synthesis and NAMPT catalyzes its rate-limiting step, therefore controlling cellular $NAD^+$ levels[13].

$NAD^+$ enhancement via supplementation with $NAD^+$ or its biosynthetic precursors (NAM/NR/NMN) can improve mitochondrial function, $Ca^{2+}$ homeostasis, autophagy, and neuronal plasticity while attenuating oxidative stress, DNA damage, neuroinflammation, and Aβ/pTau. Augmenting $NAD^+$ addresses numerous aspects of both aging and neurodegenerative diseases. Table I provides literature evidence for the role of $NAD^+$ in treating neurological and neurodegenerative diseases.

TABLE I $NAD^+$ Precursor Evidence for Neurodegenerative Disease Treatment

| Model (Relevant Disease) | $NAD^+$ Booster | Dose, Duration | Effects | Group, Year |
| --- | --- | --- | --- | --- |
| Glutamate toxicity in HT22 (AD) | NAM | 0.1 mM & 1.0 mM 24 h | Neuroprotection Prevented hippocalcin (crucial neuronal protein) depletion | Koh, P. 2013 |
| MCAO in Sprague-Dawley rats (Stroke) | NAM | 500 mg/kg (i.p.) 2 h after MCAO for 22 hrs | Decreased infarct volume by 60% Prevented hippocalcin depletion | Koh, P. 2013 |
| 3xTgAD mice (AD) | NAM | 40 mg/kg/d (p.o.) 8 months | Ameliorated cognitive decline Decreased Aβ and p-Tau | Liu, D. et al. 2013 |

TABLE I-continued

NAD+ Precursor Evidence for Neurodegenerative Disease Treatment

| Model (Relevant Disease) | NAD+ Booster | Dose, Duration | Effects | Group, Year |
|---|---|---|---|---|
| $H_2O_2/A\beta$ toxicity in cultured primary neurons (AD) | NAM | 2-4 mM 6 h | Neuroprotection and prevented mitochondrial dysfunction from oxidative damage and $A\beta$ | Liu, D. et al. 2013 |
| 3-nitropropionic acid treated Wistar rats (Huntington's) | NAM | 100, 300, 500 mg/kg (i.p.) 8 days | Prevented oxidative stress Improved motor function Neuroprotection | Sidhu, A. et al. 2018 |
| Brown Norway rats and C57BL/6 mice (Glaucoma) | NAM | 200-400 mg/kg/d (p.o., rats) 500 mg/kg/d (p.o., mice) Various treatment times | Retinal ganglion neuroprotection Prevented metabolic disruption Improved mitochondrial function | Tribble J. R. et al. 2021 |
| Acute and sub-acute MPTP-treated C57BL/6 mice (Parkinson's) | NAM | 125, 250, 500 mg/kg (i.p.) 1 day (acute) 5 days (sub-acute) | Neuroprotection of dopaminergic neurons Recovered dopamine concentration in both paradigms | Anderson, D. W. et al. 2008 |
| $A\beta$ overexpressing GMC101 worms (AD) | NR | 1 mM 1-8 days | Reduced proteotoxicity and aggregation of $A\beta$ Increased health- and lifespan of worms | Sorrentino, V. et al. 2017 |
| $APP_{Swe}/PSEN1_{dE9}$ mice (AD) | NR | 400 mg/kg/d (p.o.) 10 weeks | Reduced $A\beta$ aggregation Enhanced impaired memory Improved mitochondrial function | Sorrentino, V. et al. 2017 |
| Tg2576/PGC-1α knockout mice (AD) | NR | 250 mg/kg/d (p.o) 3 months | Improved cognitive (novel object recognition) performance Improved synaptic plasticity Increased NAD+ levels and PGC-1α expression | Gong, B. et al. 2013 |
| 3xTgAD, and 3xTgAD/Polβ+/− mice (AD) | NR | 12 mM in drinking water p.o. 6 months | Improved learning, memory, motor function, and anxiety Increased NAD+/NADH ratio Restored synaptic plasticity Increased neurogenesis Decreased neuroinflammation Decreased p-Tau levels | Hou, Y. et al. 2018 |
| $hSOD1^{G93A}$ mouse derived astrocytes and motor neurons (ALS) | NR or NMN | 5 mM 24-72 h | Neuroprotection of motor neurons Increased Nrf2 mediated Antioxidant Response Element activation | Harlan, B. A. et al. 2019 |
| $Csb^{m/m}$ mice (Cockaynesyndrome & neuronal aging) | NR | 500 mg/kg/d (i.p.) 1 week | Rescued cerebellar NAD+ ATP, mitochondrial function Normalized gene | Scheibye-Knudsen, M. et al. 2014 |

TABLE I-continued

NAD+ Precursor Evidence for Neurodegenerative Disease Treatment

| Model (Relevant Disease) | NAD+ Booster | Dose, Duration | Effects | Group, Year |
|---|---|---|---|---|
| | | | profile associated with oxidative stress, DNA repair, mitochondrial function | |
| Collagenase-induced intracerebral hemorrhage-CD1 mice (Stroke) | NMN | 300 mg/kg 30 minutes post ICH from tail veil for 24 h or 7 days with (300 mg/kg/d) | Protected against acute brain injury Neuroprotective Reduced oxidative stress and neuroinflammation Enhanced motor function recovery over 7 days | Wei, C. C. et al. 2017 |
| $APP_{Swe}/PSEN1_{dE9}$ mice (AD) | NMN | 100 mg/kg (s.c.) Every other day for 28 days | Prevented cognitive impairments · Decreased Aβ aggregation Biased APP to α processing Decreased neuroinflammation Prevented synaptic loss | Yao Z. et al. 2017 |
| Wistar rats intraventricularly injected with $oA\beta_{1-42}$ (AD) | NMN | 500 mg/kg/d (i.p.) 10 days Hippocampal slices treated with 10 μM $oA\beta_{1-42}$ for 6 h +/− 1 mM NMN | Improved spatial learning and memory Neuroprotection Improved LTP · Restored NAD+ and ATP Attenuated oxidative stress | Wang, X. et al. 2016 |
| $APP_{Swe}/PSEN1_{dE9}$ mice (AD) | NMN | 100 mg/kg Every other day for 28 days | Decreased APP levels Reversed mitochondrial deficits | Long, A. N. et al. 2015 |
| $APP_{Swe}/PSEN1_{dE9}$ N2A cells (AD) | NAD+ | 10 mM 72 h | Reversed mitochondrial deficits | Long, A. N. et al. 2015 |
| Aβ overexpressing CL2355 worms (AD) | NMN | 5 mM 2 nematode generations | Ameliorated cognitive decline and memory impairment | Fang, E. F. et al. 2019 |
| STZ-induced diabetic Sprague-Dawley rats (Diabetic neuropathy) | NMN | 100 mg/kg (i.p.) Every other day for 3 months | Normalized brain NAD+, metabolites, and neurotransmitters Preserved hippocampal CA1 volume Neuroprotective Improved memory Improved mitochondrial function | Chandrasekaran, K. et al. 2020 |

In one aspect, described herein is a method for increasing the amount of nicotinamide adenine dinucleotide (NAD+) in a subject, the method comprising administering to the subject a compound as described herein. The amount of nicotinamide adenine dinucleotide in the subject after the administration of the compound when compared to the amount of nicotinamide adenine dinucleotide present in the subject before the administration of the compound. By raising the amount of nicotinamide adenine dinucleotide in a subject, diseases associated with reduced levels of nicotinamide adenine dinucleotide can be treated or prevented. For example, raising the amount of NAD+ in a subject can reduce or ameliorate one or more symptoms of Parkinson's disease, Alzheimer's disease, Huntington's disease, multiple sclerosis, amyotrophic lateral sclerosis, AIDS-induced dementia, or epilepsy as indicated in Table 1.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

ASPECTS

Aspect 1. A compound having the structure I or the pharmaceutically acceptable salt thereof

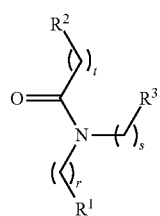

wherein
- $R^1$ is a substituted or unsubstituted aryl group or a substituted or unsubstituted heteroaryl group;
- $R^2$ is a substituted or unsubstituted aryl group, a substituted or unsubstituted heteroaryl group, a substituted or unsubstituted cycloalkyl group, a substituted or unsubstituted heterocycloalkyl group, or a substituted or unsubstituted alkyl group;
- $R^3$ is a substituted or unsubstituted cycloalkyl group or a substituted or unsubstituted heterocycloalkyl group;
- r is 1, 2, 3, 4, or 5;
- s is 1, 2, 3, 4, or 5; and
- t is 0, 1, 2, 3, 4, or 5.

Aspect 2. The compound of Aspect 1, wherein $R^1$ is a substituted or unsubstituted aryl group.

Aspect 3. The compound of Aspect 1, wherein $R^1$ is a substituted aryl group.

Aspect 4. The compound of Aspect 1, wherein $R^1$ is a substituted phenyl group.

Aspect 5. The compound of Aspect 1, wherein $R^1$ is a phenyl group substituted with at least one alkoxy group, haloalkoxy group, hydroxyl group, alkyl group, haloalkyl group, or an amino group.

Aspect 6. The compound of Aspect 1, wherein $R^1$ has the structure II

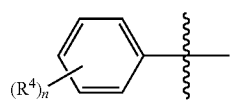

wherein each $R^4$ is independently hydrogen, an alkoxy group, a haloalkoxy group, a hydroxyl group, an alkyl group, a haloalkyl group, or an amino group; and
n is 1, 2, 3, 4, or 5.

Aspect 7. The compound of Aspect 6, wherein $R^4$ is alkoxy or a dialkylamino group and n is 1.

Aspect 8. The compound of Aspect 6, wherein $R^4$ is methoxy and n is 1.

Aspect 9. The compound of any one of Aspects 1-8, wherein $R^2$ is a substituted or unsubstituted furyl group, a substituted or unsubstituted imidazolyl group, a substituted or unsubstituted pyrimidinyl group, a substituted or unsubstituted tetrazolyl group, a substituted or unsubstituted thienyl group, a substituted or unsubstituted pyridinyl group, a substituted or unsubstituted pyrrolyl group, a substituted or unsubstituted N-methylpyrrolyl group, a substituted or unsubstituted quinolinyl group, a substituted or unsubstituted isoquinolinyl group, a substituted or unsubstituted pyrazolyl group, a substituted or unsubstituted triazolyl group, a substituted or unsubstituted thiazolyl group, a substituted or unsubstituted oxazolyl group, a substituted or unsubstituted isoxazolyl group, a substituted or unsubstituted oxadiazolyl group, a substituted or unsubstituted thiadiazolyl group, a substituted or unsubstituted isothiazolyl group, a substituted or unsubstituted pyridazinyl group, a substituted or unsubstituted pyrazinyl group, a substituted or unsubstituted benzofuranyl group, a substituted or unsubstituted benzodioxolyl group, a substituted or unsubstituted benzothiophenyl group, a substituted or unsubstituted indolyl group, a substituted or unsubstituted indazolyl group, a substituted or unsubstituted benzimidazolyl group, a substituted or unsubstituted imidazopyridinyl group, a substituted or unsubstituted pyrazolopyridinyl group, or a substituted or unsubstituted pyrazolopyrimidinyl group.

Aspect 10. The compound of any one of Aspects 1-8, wherein $R^2$ is a substituted or unsubstituted furyl group.

Aspect 11. The compound of any one of Aspects 1-8, wherein $R^2$ is a substituted or unsubstituted thienyl group.

Aspect 12. The compound of any one of Aspects 1-8, wherein $R^2$ is a C1 to C10 alkyl group.

Aspect 13. The compound of any one of Aspects 1-8, wherein $R^2$ is a methyl or ethyl group.

Aspect 14. The compound of any one of Aspects 1-8, wherein $R^2$ is

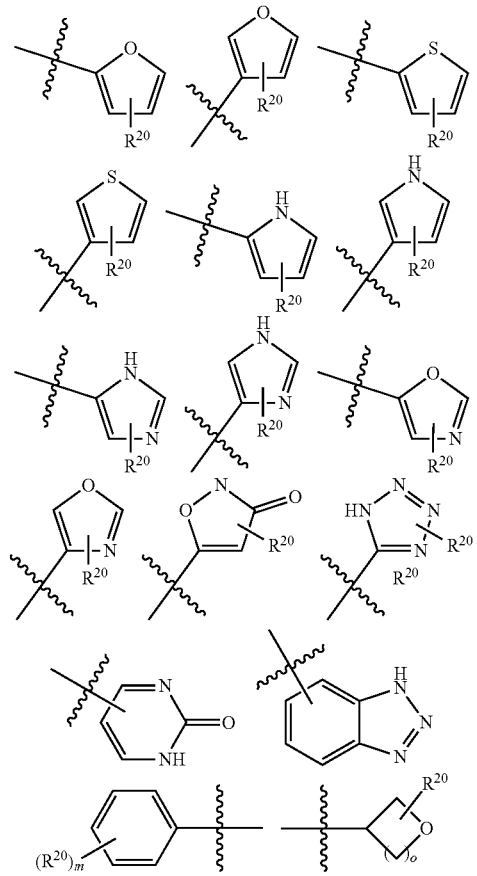

wherein
R$^{20}$ is an alkoxy group, a haloalkoxy group, a hydroxyl group, a halide, an alkyl group, a haloalkyl group, or an amino group;
m is 1, 2, 3, 4, or 5; and
o is 1, 2, 3, or 4.

Aspect 15. The compound of any one of Aspects 1-14, wherein R$^3$ is a substituted or unsubstituted heterocycloalkyl group.

Aspect 16. The compound of any one of Aspects 1-14, wherein R$^3$ is a substituted or unsubstituted heterocycloalkyl group having from 3 to 7 carbon atoms.

Aspect 17. The compound of any one of Aspects 1-14, wherein R$^3$ is a substituted or unsubstituted heterocycloalkyl group having from 3 to 7 carbon atoms and an oxygen atom.

Aspect 18. The compound of any one of Aspects 1-14, wherein R$^3$ is a substituted or unsubstituted tetrahydropyran group.

Aspect 19. The compound of any one of Aspects 1-14, wherein R$^3$ has the structure III

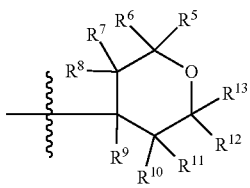

III wherein R$^5$ to R$^{13}$ are independently hydrogen, a C1 to C10 alkyl group, or cycloalkyl group.

Aspect 20. The compound of Aspect 19, wherein R$^5$ and R$^6$ are each methyl.

Aspect 21. The compound of Aspect 19, wherein R$^5$ and R$^6$ are each methyl and R$^9$ is an isopropyl group.

Aspect 22. The compound of any one of Aspects 1-14, wherein R$^3$ is

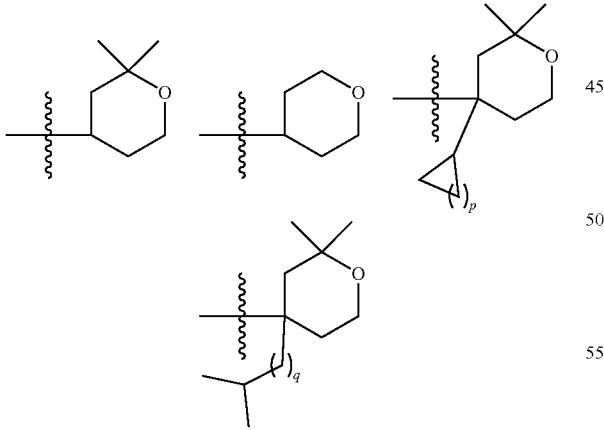

wherein p is 1, 2, 3, or 4, and
q is 0, 1, 2, 3, 4, or 5.

Aspect 23. The compound of any one of Aspects 1-22, wherein r is 1.

Aspect 24. The compound of any one of Aspects 1-22, wherein s is 2.

Aspect 25. The compound of any one of Aspects 1-22, wherein t is 0.

Aspect 26. The compound of any one of Aspects 1-22, wherein r is 1, s is 2, and t is 0.

Aspect 27. The compound of Aspect 1, wherein
R$^1$ is a phenyl group substituted with at least one alkoxy group, haloalkoxy group, hydroxyl group, alkyl group, haloalkyl group, or an amino group;
R$^2$ is a substituted or unsubstituted furyl group or a substituted or unsubstituted thienyl group; and
R$^3$ has the structure III

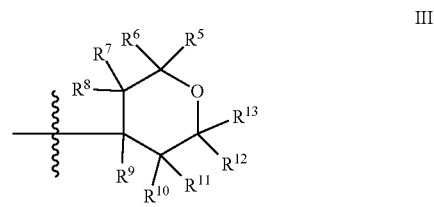

III wherein R$^5$ to R$^{13}$ are independently hydrogen, a C1 to C10 alkyl group, or cycloalkyl group.

Aspect 28. The compound of Aspect 27, wherein r is 1.
Aspect 29. The compound of Aspect 27, wherein s is 2.
Aspect 30. The compound of Aspect 27, wherein r is 1 and s is 2.

Aspect 31. The compound of Aspect 1, wherein the compound has the structure IV

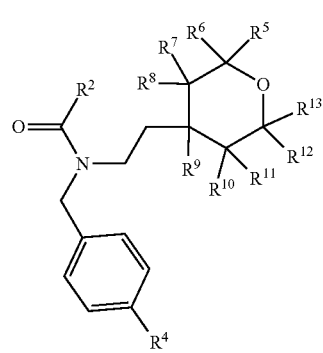

IV wherein R$^2$ is a substituted or unsubstituted furyl group or a substituted or unsubstituted thienyl group;
R$^4$ is an alkoxy group, a haloalkoxy group, a hydroxyl group, an alkyl group, a haloalkyl group, or an amino group; and
R$^5$ to R$^{13}$ are independently hydrogen, a C1 to C10 alkyl group, or cycloalkyl group.

Aspect 32. The compound of Aspect 31, wherein R$^4$ is an alkoxy group.

Aspect 33. The compound of Aspect 31, wherein R$^4$ is a methoxy group.

Aspect 34. The compound of Aspect 31, wherein R$^4$ is a dialkylamino group.

Aspect 35. The compound of Aspect 31, wherein R$^4$ is a dimethylamino group.

Aspect 36. The compound of any one of Aspects 31-35, wherein R$^2$ is an unsubstituted furyl group.

Aspect 37. The compound of any one of Aspects 31-35, wherein R$^2$ is a substituted or unsubstituted thienyl group.

Aspect 38. The compound of any one of Aspects 31-37, wherein R$^5$ and R$^6$ are each a methyl group and R$^9$ is an isopropyl group.

Aspect 39. The compound of any one of Aspects 31-37, wherein $R^5$ and $R^6$ are each a methyl group, $R^9$ is an isopropyl group, and $R^7$, $R^8$, and $R^{10}$-$R^{13}$ are each hydrogen.

Aspect 40. A pharmaceutical composition comprising the compound of any one of Aspects 1-39 and a pharmaceutically acceptable carrier.

Aspect 41. A method for treating or preventing a neurological disease in a subject, the method comprising administering to the subject a compound of any one of Aspects 1-39.

Aspect 42. The method of Aspect 41, wherein the neurological disease comprises a disease associated with reduced levels of nicotinamide adenine dinucleotide ($NAD^+$) in a subject.

Aspect 43. The method of Aspect 41, wherein the neurological disease comprises Parkinson's disease, Alzheimer's disease, Huntington's disease, multiple sclerosis, amylotrophic lateral sclerosis, AIDS-induced dementia, or epilepsy.

Aspect 44. A method for increasing the amount of nicotinamide adenine dinucleotide ($NAD^+$) in a subject, the method comprising administering to the subject a compound of any one of Aspects 1-39.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure.

Materials and Methods

Compounds and chemical reagents. Synthetic reagents were purchased from Ambeed, Matrix Scientific, Enamine, ThermoFisher Scientific, and Sigma-Aldrich. All assay reagents were acquired from Sigma-Aldrich unless otherwise specified.

X-ray diffraction crystallography. Crystals of NAMPT complexed with NAM and N-PAM were grown by hanging drop vapor diffusion at 16° C. Prior to crystallization, 11 mg/mL NAMPT protein was incubated with 10 mM NAM and 1 mM compound for 30 min on ice. Crystals of the complex were grown by mixing 1-2 μL of NAMPT complex with 2 μL of reservoir solution containing 0.1 M Tris-HCl, pH 8, 0.1 M KCl, and 24-28% PEG 2000 MME or 0.1 M Tris-HCl, pH 8.5, 0.2 M NaCl, 20% glycerol and 13-18% PEG 3350. Crystals grew overnight from the PEG 2000 MME conditions and were used to streak seed drops of NAMPT complex equilibrating against the PEG 3350 conditions.

Data collection and structure refinement. The glycerol present in the crystallization solution was sufficient to cryoprotect crystals, which were flash-cooled in liquid nitrogen. Data were collected on a MAR300 detector at 0.979 Å at the Life Sciences Collaborative Access Team beamline 21-ID-F at the Advanced Photon Source, Argonne National Laboratory. Data indexing, integration, and scaling were performed using XDS, and phases were determined by molecular replacement using Molrep and a NAMPT-NAM co-crystal structure (PDB entry: 2E5D) as search model. Rigid body refinement followed by iterative rounds of restrained refinement and model building were performed with Phenix and Coot.

NAMPT coupled enzyme activity assay. The NAMPT enzyme assay is based on conditions from Burgos and Schramm and adapted to include a cycling reaction to quantitate $NAD^+$ production colorimetrically[1]. The assay follows the NAMPT-catalyzed production of NMN from substrates NAM and PRPP by coupling NMN formation to the NMNAT reaction, which produces $NAD^+$ from NMN and ATP. The $NAD^+$ is then cycled by alcohol dehydrogenase (ADH) and diaphorase to continuously produce WST-1 formazan, which can be detected at 450 nm. Assays are performed at 25° C. in clear 384-well plates, with a final assay volume of 30 μL, and contain the following: 50 mM HEPES, pH 7.5, 5 mM $MgCl2$, 50 mM NaCl, 0.01% Triton-X 100, 2.5 mM ATP, 40 μM PRPP, 1-500 μM NAM, 1.5 μL WST-1 (Roche Cell Proliferation Reagent), 1 U/mL ADH, 0.083 U/mL diaphorase, 1.5% ethanol, 1% DMSO, 30 nM NAMPT, and 7.4 nM purified human NMNAT1. N-terminal His6-NMNAT1 and C-terminal His6-NAMPT were overexpressed and purified by metal chelate affinity chromatography. Following assay assembly, well signals were measured continuously at 450 nm on a Tecan Infinite M200 plate reader for 1 h with intermittent shaking. Slopes of the linear portions of the reaction progress curves were recorded and corrected for background by subtracting the average slope of control wells containing NAMPT inhibitor FK866.

A counterassay to confirm NAMPT-specific activation was performed for all compounds using the enzyme assay described above, but lacking NAMPT, NAM and PRPP, and with the addition of 5 μM NMN (NMNAT substrate), and with a reduced NMNAT concentration (typically 1 nM).

NAMPT fluorescence polarization (FP) displacement assay. All FP measurements were performed at room temperature in PBS buffer containing 0.01% Triton-X 100 and 1% DMSO in black 384-well plates. Measurements were performed on a Tecan F200 Pro plate reader fitted with polarized 485(20) nm emission filters and 535(25) nm emission filters. Initial titration of 20 nM FP probe with varying concentrations of NAMPT protein was performed to estimate a $K_d$ value for the probe (~750 nM), which defined the NAMPT concentration for all subsequent experiments. Anisotropy data from equilibrium competition binding experiments were fit to a four-parameter dose response equation in GraphPad prism. All FP experiments included the following control sets: unbound probe (probe alone), bound probe (probe+NAMPT), and background signal (NAMPT alone).

Measurement of cellular $NAD^+$ levels in THP-1 cell cultures. Using FK-866 and NMN as negative and positive controls, respectively, we explored a number of cell lines to select a highly reproducible model system with good dynamic range. We optimized a commercial NAD-glo assay in the THP-1 human leukemic monocyte cell line in 96-well plates, measuring $NAD^+$ after incubation with test compounds for 24 hours. The human monocytic leukemia cell line (THP-1) was obtained from the American Type Culture Collection and were maintained in RPMI 1640 medium (ATCC) supplemented with 100 units of penicillin, 100 μg/ml streptomycin, and 10% heat inactive fetal bovine serum. All cells were grown at 37° C., under 5% CO2 in a humidified incubator. Low passage THP-1 cells (37,500 cells/well) were seeded in 96-well plates and incubated at 37° C. and 5% CO2 for 1½ h prior to a 24 h treatment. All compounds were dissolved in DMSO, and final DMSO concentrations never exceeded 1%. The $NAD^+$ levels in the cells are measured using the $NAD^+$/NADH-Glo™ assay (Promega). The assays were performed in triplicate for each concentration and the IC50 values were determined from non-linear regression analysis of the dose-response curve generated in GraphPad Prism 9.

Cell Culture and Drug Treatments. HT22 mouse hippocampal neuronal cells (a gift from the Salk Institute) were grown in Dulbecco's modified Eagle's medium (DMEM) containing 10% FBS and 1× Antibiotic-Antimycotic (ABAM). Cells were maintained in a humidified 5% CO2 atmosphere incubator at 37° C., and were passaged when 60-80% confluent (1-2 days) by removing media, rinsing with phosphate buffered saline (PBS), and enzymatically detaching with trypsin solution. New culture dishes were seeded with ¼ to ½ the cells from the previous dish.

All assays were performed using cells with passage number 12-50. The inner 60 wells of black-walled (Corning®3603/3604) 96-well plates were treated with poly D-lysine (30 µL/well) making sure to cover the entire well surface for 15-30 seconds and then washed thoroughly with sterile water (3×-200 µL/well). TNFα stock solutions (10 µg/mL, PBS (0.1% BSA)) were made, aliquoted, and stored at −80° C. Glutamate stock solutions were made fresh immediately before assay. All compound stock solutions (10 mM, DMSO) were made and stored at −20° C.

Cells were plated at a seeding density of 3,000-5,000 cells/well and allowed to incubate overnight. The next day (18-24 hours later) cells were pretreated with N-PAMs, carefully ensuring equivalent vehicle (DMSO/PBS) composition in each well. After 18-24 hours, stressors (glutamate or TNFα) were treated. Live cell count, ROS level, and total cell count were then assessed after another 18-24 hours.

Chemicals and Reagents. Calcein-AM, Hoechst, and MitoSOX Red Superoxide Indicator dyes were purchased from ThermoFisher Scientific (Bedford, MA, USA). L-Glutamic Acid (99%, CAS 6106-04-3) was purchased from MP Biomedicals. Dulbecco's modified Eagle's medium (DMEM), trypsin, bovine serum albumin (BSA), and fetal bovine serum (FBS) were purchased from GIBCO Invitrogen (Carlsbad, CA, USA). Recombinant mouse TNFα was purchased from Shenandoah Biotechnology, Inc. (Warminster, PA, USA).

ROS Detection. ROS levels were quantified using MitoSOX Red Mitochondrial Superoxide Indicator (Invitrogen). At treatment endpoint, the cell culture media was removed and replaced with phosphate buffered saline (PBS) containing 1 µM calcein-AM, 5 µM MitoSOX, and 10 µg/mL Hoechst dyes. Cells were incubated for 30-45 minutes and then dye-containing PBS was dumped and replaced with 100 µL/well fresh PBS. The plate was immediately analyzed in the Celigo Imaging Cytometer using the Live-Dead-Total protocol, where MitoSOX was used in place of propidium iodide. The cell counts and fluorescence intensities for living (calcein), MitoSOX-stained, and total (Hoechst) were acquired. MitoSOX average mean fluorescence intensity ("dead" average mean intensity) was used to quantify mitochondrial ROS. All readouts used were transformed into fold-change over vehicle treatment for visualization.

Statistics. All experiments were performed in replicates of two or more, unless otherwise indicated. Data are represented as mean±standard deviation or 95% confidence interval. Statistical significance (p-value<0.05) was determined using one-way ANOVA or t-test analysis in GraphPad Prism.

Synthetic Procedures for NP-A3-B2 Resynthesis and Derivatization (Scheme 1)

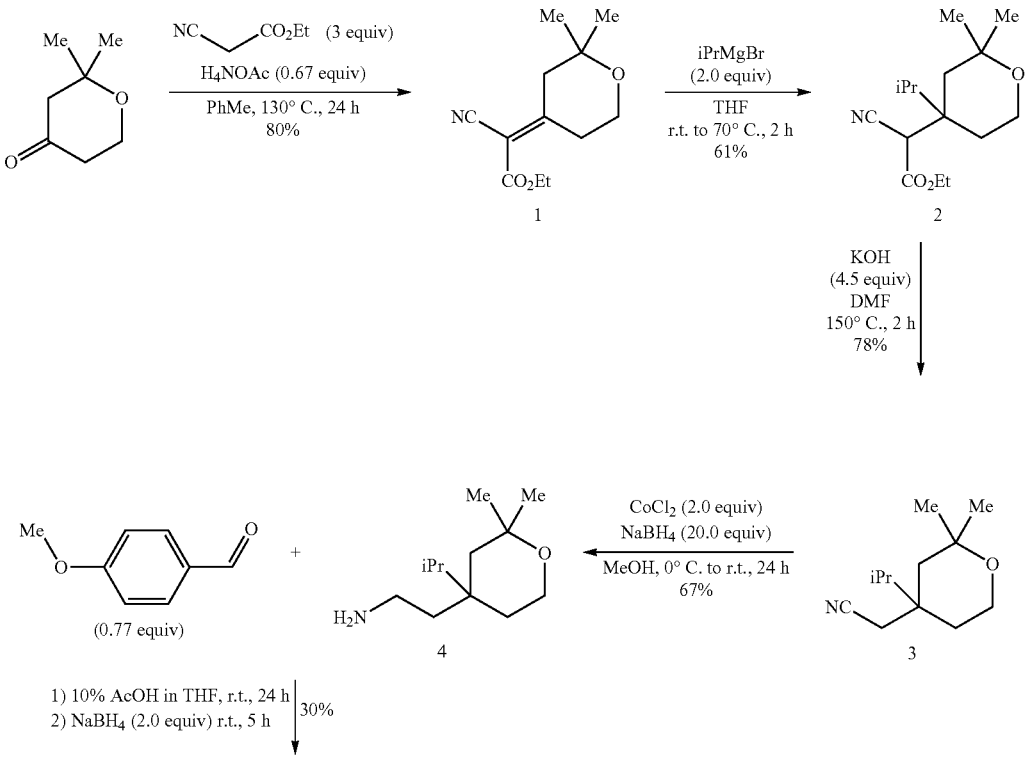

SCHEME 1

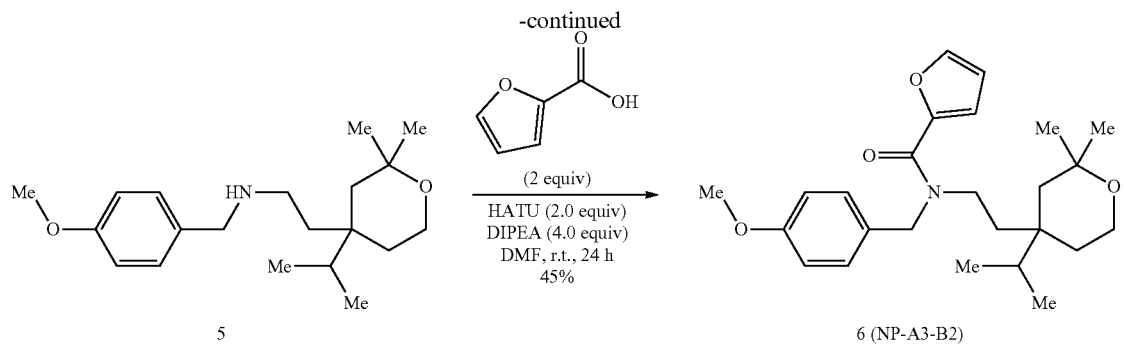

Step 1. Ethyl-2-cyano-2-(2,2-dimethyl-tetrahydropyran-4-ylidene)acetate (S1)

A mixture 25.0 g of 2,2-dimethyltetrahydropyran-4-one (195 mmol, 1.00 equiv), 66.2 g of ethyl cyanoacetate (585 mmol, 3.00 equiv), and 10.1 g of ammonium acetate (131 mmol, 0.67 equiv) in 500 mL of anhydrous toluene (1.82 M) under argon was heated to 130° C. using a Dean-Stark trap. After 24 h, the mixture was cooled to room temperature and concentrated in vacuo to give a dark orange oil. The crude product was resuspended in 500 mL of EtOAc, and the resulting mixture was washed with 3×200 mL of brine. The organic phase was dried over MgSO$_4$, filtered, and the filtrate was concentrated in vacuo. Purification using silica column chromatography (10:90 EtOAc:hexanes) with MPLC afforded the product as a yellow oil (35 g, 80%). 1H NMR (400 MHz, CDCl3) δ 4.30 (ttd, J=7.2, 5.0, 2.5 Hz, 8H), 3.93 (t, J=5.7 Hz, 2H), 3.86 (t, J=5.7 Hz, 2H), 3.47 (s, 4H), 3.14 (t, J=5.7 Hz, 2H), 3.07 (s, 2H), 2.74 (t, J=5.7 Hz, 2H), 2.68 (s, 2H), 1.40-1.32 (m, 12H), 1.29 (s, 6H), 1.26 (s, 6H). HRMS ([M+H]$^+$) 224.1278 m/z

Step 2. Ethyl-2-cyano-2-(4-isopropyl-2,2-dimethyl-tetrahydro-2H-pyran-4-yl)acetate (S2)

To a solution of 17.9 g of (Z)-ethyl-2-cyano-2-(2,2-dimethyl-tetrahydropyran-4-ylidene)acetate (80.2 mmol, 1.0 equiv) in 300 mL of anhydrous THF (0.27 M) at room temperature under argon was added 53.5 mL of isopropylmagnesium bromide solution (3.0 M in 2-Me-THF) (160.3 mmol, 2.0 equiv) dropwise at room temperature. The mixture was then heated to 70° C. for two hours and subsequently cooled by ice bath back to room temperature. The reaction was then quenched by slow addition of 50 mL of a saturated aqueous NH$_4$Cl solution. The mixture was further diluted with 100 mL of the saturated NH$_4$Cl solution and extracted with 3×50 mL EtOAc, dried over MgSO$_4$, filtered, and the filtrate was concentrated in vacuo. Purification using silica column chromatography (10:90 EtOAc:hexanes) with MPLC afforded the product as a dark yellow oil (13.0 g, 61%). 1H NMR (400 MHz, CDCl3) δ 4.36-4.22 (m, 4H), 4.00 (s, 1H), 3.94 (s, 1H), 3.83-3.75 (m, 3H), 3.70 (ddd, J=12.5, 7.0, 4.4 Hz, 1H), 2.11 (p, J=7.0 Hz, 1H), 1.99-1.93 (m, 1H), 1.91 (d, J=1.9 Hz, 1H), 1.88 (dd, J=4.4, 2.5 Hz, 1H), 1.86-1.72 (m, 4H), 1.68 (s, 1H), 1.64 (s, 1H), 1.40-1.26 (m, 20H), 1.06 (dd, J=7.0, 1.5 Hz, 6H), 1.01 (dd, J=6.9, 2.3 Hz, 6H). HRMS ([M+H]$^+$) 268.1901 m/z

Step 3. 2-(4-isopropyl-2,2-dimethyl-tetrahydro-2H-pyran-4-yl)acetonitrile (S3)

A solution of 13.0 g of Ethyl-2-cyano-2-(4-isopropyl-2,2-dimethyl-tetrahydro-2H-pyran-4-yl)acetate (48.6 mmol, 1.0 equiv) and 12.3 g of potassium hydroxide (218 mmol, 4.5 equiv) in 200 mL of anhydrous DMF (1.33 M) under argon was heated to 150° C. for two hours, allowed to cool to room temperature, and quenched by careful addition of 50 mL of water. The mixture was further diluted with 500 mL of a saturated aqueous NH$_4$Cl solution and extracted with 5×50 mL EtOAc. The combined organic phase was washed with 5×200 mL brine, dried over MgSO$_4$, filtered, and the filtrate was concentrated in vacuo. Purification using silica column chromatography (10:90 EtOAc:hexanes) with MPLC afforded the product as a yellow oil (7.43 g, 78%). 1H NMR (400 MHz, CDCl3) δ 3.81-3.66 (m, 4H), 2.60-2.45 (m, 4H), 1.78 (p, J=6.9 Hz, 2H), 1.72 (d, J=1.8 Hz, 1H), 1.68 (d, J=1.8 Hz, 1H), 1.66-1.60 (m, 1H), 1.53 (s, 1H), 1.50 (s, 1H), 1.43 (ddd, J=3.9, 3.1, 1.8 Hz, 1H), 1.42-1.38 (m, 1H), 1.32 (s, 6H), 1.28 (d, J=0.6 Hz, 7H), 0.99 (d, J=6.9 Hz, 6H), 0.94 (d, J=6.8 Hz, 6H). HRMS ([M+H]$^+$) 196.1323 m/z

Step 4. 2-(4-isopropyl-2,2-dimethyl-tetrahydro-2H-pyran-4-yl)ethanamine (S4)

To a 0° C. cooled solution of 7.43 g of 2-(4-isopropyl-2,2-dimethyl-tetrahydro-2H-pyran-4-yl)acetonitrile (38.0 mmol, 1.0 equiv) in 300 mL of anhydrous methanol (0.13 M) under argon was added 9.88 g of anhydrous cobalt(II) chloride (76.1 mmol, 2 equiv). To this mixture, 28.8 g of sodium borohydride (760.86 mmol, 20 equiv) was carefully added in small portions to accommodate considerable gaseous evolution from the mixture. Upon completion of sodium borohydride addition, the ice bath was removed, and the mixture allowed to warm to room temperature and stirred overnight. The reaction mixture was concentrated in vacuo the following day to give a black residue that was resuspended in 200 mL of an aqueous 1 M HCl solution and vigorously stirred until homogenous. This was then extracted with 3×100 mL EtOAc and the aqueous phase was alkalinized to pH 13 with 200 mL of an aqueous 2 M NaOH solution. The alkaline mixture was extracted with 3×100 mL EtOAc and the combined organic phase was washed with 50 mL of 2 M NaOH, dried over MgSO$_4$, filtered, and the filtrate was concentrated in vacuo to give a light a yellow oil (5.11 g, 67%) without the need for further purification. 1H NMR (501 MHz, CDCl3) δ 3.74-3.59 (m, 2H), 2.65 (dd, J=10.3, 6.5 Hz, 2H), 2.02-1.85 (m, 1H), 1.80 (s, 2H), 1.65-1.54 (m, 3H), 1.46 (ddd, J=13.9, 9.8, 4.3 Hz, 1H), 1.41-1.24 (m, 3H), 1.22 (s, 3H), 1.16 (s, 3H), 0.81 (td, J=8.3, 3.8 Hz, 6H). HRMS ([M+H]$^+$) 200.2011 m/z

Step 5. [2-(4-Isopropyl-2,2-dimethyl-tetrahydro-pyran-4-yl)-ethyl]-(4-methoxy-benzyl)-amine (S5)

To a solution of 2.22 mL of 4-methoxybenzaldehyde (18.3 mmol, 0.71 equiv) in 200 mL of 10% glacial AcOH in anhydrous THF (91.5 mM) at room temperature under argon was added 5.11 g of 2-(4-isopropyl-2,2-dimethyl-tetrahydro-2H-pyran-4-yl)ethanamine (25.6 mmol, 1 equiv) and the mixture was stirred overnight. After 24 h, 1.94 g of sodium borohydride (51.3 mmol, 2.0 equiv) was added and the mixture was stirred for 5 h. The mixture was then diluted with 100 mL of EtOAc and quenched with 100 mL of an aqueous 1 M NaOH solution. The resultant mixture was washed with 3×100 mL 1 M NaOH, dried over $MgSO_4$, filtered, and the filtrate was concentrated in vacuo. Purification using high-grade silica column chromatography (0.5: 99.5 MeOH:DCM) with 0.75:99.25 triethylamine:DCM primed silica and MPLC afforded the product as light tan oil (2.42 g, 30%). 1H NMR (501 MHz, CDCl3) δ 7.34 (d, J=8.5 Hz, 2H), 6.90-6.85 (m, 2H), 5.30 (s, 1H), 3.85-3.79 (m, 2H), 3.77 (s, 3H), 3.75-3.61 (m, 2H), 2.73-2.66 (m, 2H), 1.92-1.76 (m, 2H), 1.60 (h, J=6.9 Hz, 1H), 1.50 (dd, J=14.0, 9.9, 4.3 Hz, 1H), 1.40 (d, J=14.1 Hz, 1H), 1.32-1.23 (m, 3H), 1.22 (d, J=3.9 Hz, 3H), 1.19 (s, 3H), 0.82 (dd, J=6.9, 2.7 Hz, 6H). HRMS ([M+H]$^+$) 320.2582 m/z stirred overnight. After 24 h, the reaction mixture was diluted with 30 mL of a saturated aqueous $NH_4Cl$ solution and extracted with 5×5 mL EtOAc. The combined organic phase was washed with 5×50 mL brine, dried over $MgSO_4$, filtered, and the filtrate was concentrated in vacuo. Purification using silica column chromatography (20:80 EtOAc: hexanes) with MPLC afforded the product as a light grey oil (58.3 mg, 45%). 1H NMR (501 MHz, CDCl3) δ 7.43 (d, J=2.0 Hz, 1H), 7.21 (d, J=8.2 Hz, 2H), 7.06-7.02 (m, 1H), 6.91-6.85 (m, 2H), 6.46 (s, 1H), 4.79 (d, J=15.4 Hz, 1H), 4.68 (d, J=15.9 Hz, 1H), 3.80 (s, 3H), 3.65 (dt, J=7.8, 3.7 Hz, 2H), 3.45 (s, 2H), 1.87-1.75 (m, 2H), 1.62 (p, J=7.2 Hz, 1H), 1.56-1.47 (m, 2H), 1.41 (d, J=14.4 Hz, 1H), 1.29-1.17 (m, 14H), 0.90 (d, J=6.2 Hz, 1H), 0.85 (dd, J=7.0, 3.6 Hz, 6H), 0.08 (s, 1H). HRMS ([M+H]$^+$) 414.2637 m/z Synthetic Procedures for desisopropyl-NP-A3-B2 (Scheme 2)

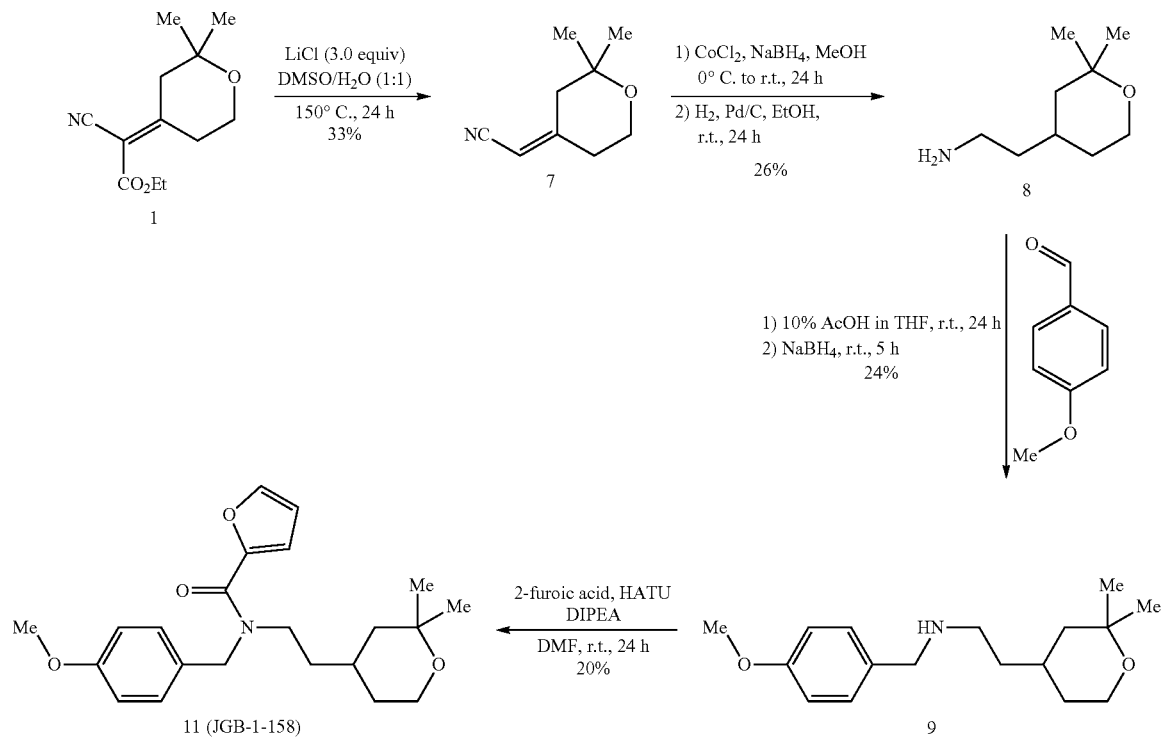

Step 6. N-[(4-Methoxyphenyl)methyl]-N-[2-[tetrahydro-2,2-dimethyl-4-(1-methylethyl)-2H-pyran-4-yl]ethyl]-2-furancarboxamide (S6, NP-A3-B2)

To a solution of 70.2 mg of 2-furoic acid (0.626 mmol, 2.0 equiv) in 2 mL of anhydrous DMF (0.31 M) at room temperature under argon was added 218 μL of diisopropylethylamine (1.25 mmol, 4.0 equiv). The mixture was stirred for 30 m, after which 238 mg of HATU (0.626 mmol, 2.0 equiv) was added and the mixture was stirred for another 30 m. At that time, 100 mg of [2-(4-Isopropyl-2,2-dimethyl-tetrahydro-pyran-4-yl)-ethyl]-(4-methoxy-benzyl)-amine (0.313 mmol, 1.0 equiv) was added and the mixture was Step 1. 2-(2,2-dimethyltetrahydro-4H-pyran-4-ylidene)acetonitrile (S7)

To a solution of 10.0 g of Ethyl-2-cyano-2-(2,2-dimethyltetrahydropyran-4-ylidene)acetate (44.79 mmol, 1.0 equiv), as prepared previously, in 100 mL (1:1) DMSO:$H_2O$ (0.45 M) was added 5.70 g (134.37 mmol, 3.0 equiv) of LiCl. The mixture was heated to 150° C. for 24 h and allowed to cool to room temperature. It was then diluted with 100 mL of $H_2O$ and extracted with 5×50 mL EtOAc. The combined organic phase was washed with 5×200 mL brine, dried over $MgSO_4$, filtered, and the filtrate was concentrated in vacuo. Purification using silica column chromatography (10:90 EtOAc:hexanes) with MPLC afforded the product as a yellow oil (2.21 g, 33%). 1H NMR (501 MHz, CDCl3) δ

5.82 (tq, J=3.2, 1.6 Hz, 1H), 5.70 (p, J=1.7 Hz, 1H), 4.16 (h, J=2.3 Hz, 2H), 3.81 (t, J=5.5 Hz, 2H), 3.77 (t, J=5.7 Hz, 1H), 3.05-3.01 (m, 3H), 2.47 (s, 1H), 2.33-2.29 (m, 1H), 2.05-2.01 (m, 2H), 1.99-1.96 (m, 2H), 1.24 (d, J=3.3 Hz, 7H), 1.22 (s, 5H). HRMS ([M+H]$^+$) 152.1072 m/z

Step 2. 2-(2,2-dimethyltetrahydro-2H-pyran-4-yl)ethan-1-amine (S8)

(1) To a 0° C. cooled solution of 2.21 g of 2-(2,2-dimethyltetrahydro-4H-pyran-4-ylidene)acetonitrile (14.62 mmol, 1.0 equiv) in 200 mL of anhydrous methanol (73.1 mM) under argon was added 15.18 g of anhydrous cobalt(II) chloride (116.92 mmol, 8 equiv). To this mixture, 44.23 g of sodium borohydride (1.17 mol, 80 equiv) was carefully added in small portions to accommodate considerable and rapid gaseous evolution from the mixture. Upon completion of sodium borohydride addition, the ice bath was removed, and the mixture allowed to warm to room temperature and stirred overnight. The reaction mixture was concentrated in vacuo the following day to give a black residue that was resuspended in 200 mL of an aqueous 1 M HCl solution and vigorously stirred until homogenous. This was then extracted with 3×100 mL EtOAc and the aqueous phase was alkalinized to pH 13 with 200 mL of an aqueous 2 M NaOH solution. The alkaline mixture was extracted with 3×100 mL EtOAc and the combined organic phase was washed with 50 mL of 2 M NaOH, dried over MgSO$_4$, filtered, and the filtrate was concentrated in vacuo to give a light a yellow oil (765 mg, 31%). $^1$H NMR and LCMS confirmed incomplete reduction of the double bond giving a mixture of the desired product and 2-(2,2-dimethyltetrahydro-4H-pyran-4-ylidene)ethan-1-amine.

(2) The 765 mg mixture of 2-(2,2-dimethyltetrahydro-2H-pyran-4-yl)ethan-1-amine and 2-(2,2-dimethyltetrahydro-4H-pyran-4-ylidene)ethan-1-amine (~4.9 mmol, 1 equiv) was dissolved in 50 mL anhydrous ethanol along with 1.57 g Pd/C (10 wt. %, 1.48 mmol, 0.3 equiv) under H$_2$ and stirred vigorously. After 24 h the solution was filtered over cotton and silica to remove the catalyst and the filtrate was concentrated in vacuo to give a light a yellow oil (662 mg, 85%). $^1$H NMR and LCMS confirmed complete hydrogenation of the olefin was achieved. 1H NMR (501 MHz, CDCl3) δ 4.75 (s, 2H), 3.75-3.57 (m, 2H), 2.81-2.70 (m, 1H), 1.94 (s, 1H), 1.58-1.28 (m, 5H), 1.28-1.20 (m, 4H), 1.21-1.16 (m, 6H). HRMS ([M+H]$^+$) 158.1550 m/z Step 3. 2-(2,2-dimethyltetrahydro-2H-pyran-4-yl)-N-(4-methoxybenzyl)ethan-1-amine (S9)

To a solution of 407 mg of 4-methoxybenzaldehyde (3 mmol, 0.71 equiv) in 25 mL of 10% glacial AcOH in anhydrous THF (0.12 M) at room temperature under argon was added 662 mg of 2-(4-isopropyl-2,2-dimethyl-tetrahydro-2H-pyran-4-yl)ethanamine (4.21 mmol, 1.0 equiv) by addition of 25 mL of a 0.17 M solution in 10% glacial AcOH in anhydrous THF and the mixture was stirred overnight. After 24 h, 319 mg of sodium borohydride (8.42 mmol, 2.0 equiv) was added and the mixture was stirred for 5 h. The mixture was then diluted with 50 mL of EtOAc and quenched with 100 mL of an aqueous 1 M NaOH solution. The resultant mixture was washed with 3×100 mL 1 M NaOH, dried over MgSO$_4$, filtered, and the filtrate was concentrated in vacuo. Purification using high-grade silica column chromatography (0.5:99.5 MeOH:DCM) with 0.75:99.25 triethylamine:DCM primed silica and MPLC afforded the product as light tan oil (277 mg, 24%). 1H NMR (400 MHz, CDCl3) δ 7.36-7.20 (m, 2H), 6.73 (t, J=8.1 Hz, 2H), 3.84-3.69 (m, 1H), 3.65 (d, J=3.6 Hz, 2H), 3.60 (d, J=3.6 Hz, 1H), 3.57-3.40 (m, 3H), 2.76-2.59 (m, 3H), 1.49-1.13 (m, 8H), 1.04-0.98 (m, 6H). HRMS ([M+H]$^+$) 278.2118 m/z Step 4. N-(2-(2,2-dimethyltetrahydro-2H-pyran-4-yl)ethyl)-N-(4-methoxybenzyl)furan-2-carboxamide (S10)

To a solution of 40.4 mg of 2-furoic acid (0.36 mmol, 2.0 equiv) in 1 mL of anhydrous DMF (0.36 M) at room temperature under argon was added 126 µL of diisopropylethylamine (0.72 mmol, 4.0 equiv). The mixture was stirred for 30 m, after which time 137 mg of HATU (0.36 mmol, 2.0 equiv) was added and the mixture was stirred for another 30 m. At that time, 50 mg of 2-(2,2-dimethyltetrahydro-2H-pyran-4-yl)-N-(4-methoxybenzyl)ethan-1-amine (0.18 mmol, 1.0 equiv) was added as a 0.18 M solution in 1 mL anhydrous DMF and the mixture was stirred overnight. After 24 h, the reaction mixture was diluted with 30 mL of a saturated aqueous NH$_4$Cl solution and extracted with 5×5 mL EtOAc. The combined organic phase was washed with 5×50 mL brine, dried over MgSO$_4$, filtered, and the filtrate was concentrated in vacuo. Purification using silica column chromatography (20:80 EtOAc:hexanes) with MPLC afforded the product as a light grey oil (16 mg, 20%). 1H NMR (501 MHz, DMSO) δ 7.88-7.65 (m, OH), 7.18 (s, 2H), 6.89 (s, 2H), 6.59 (s, 1H), 4.60 (s, 1H), 3.74-3.66 (m, 2H), 3.56-3.36 (m, 2H), 3.32-3.24 (m, 1H), 1.54 (s, 1H), 1.40 (s, 3H), 1.22 (s, 1H), 1.04 (dd, J=12.1, 5.4 Hz, 4H), 0.98-0.83 (m, OH). HRMS ([M+H]$^+$) 372.2173 m/z NP-A3-B2 Series Compound Synthesis and Characterization JGB-1-122 (5-bromo-N-(2-(4-isopropyl-2,2-dimethyltetrahydro-2H-pyran-4-yl)ethyl)-N-(4-methoxybenzyl)thiophene-2-carboxamide). Synthesized via HATU coupling 5-bromothiophene-2-carboxylic acid with intermediate 5 (same conditions as S6). 1H NMR (501 MHz, DMSO) δ 7.73 (d, J=5.1 Hz, 1H), 7.22 (d, J=8.3 Hz, 2H), 7.11 (d, J=5.1 Hz, 1H), 6.93-6.88 (m, 2H), 4.68-4.45 (m, 2H), 3.74 (s, 4H), 3.43 (s, 2H), 3.12 (s, 2H), 1.62 (s, 2H), 1.43 (s, 2H), 1.32-1.14 (m, 4H), 1.05 (s, 3H), 1.03 (s, 3H), 0.66 (s, 6H). HRMS ([M+H]$^+$) 509.1535 m/z

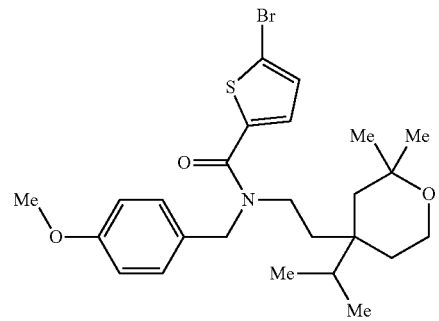

Chemical Formula: $C_{25}H_{34}BrNO_3S$
Exact Mass: 507.1443
Molecular Weight: 508.5150

JGB-1-127 (N-(2-(4-isopropyl-2,2-dimethyltetrahydro-2H-pyran-4-yl)ethyl)-N-(4-methoxybenzyl)thiophene-3-carboxamide). Synthesized via HATU coupling thiophene-3-carboxylic acid with intermediate 5 (same conditions as S6). 1H NMR (501 MHz, CDCl3) δ 7.50 (d, J=3.0 Hz, 1H), 7.30 (t, J=3.8 Hz, 1H), 7.22 (d, J=5.0 Hz, 1H), 7.21-7.15 (m, 2H), 6.90 (d, J=8.3 Hz, 2H), 4.69-4.54 (m, 2H), 3.81 (d, J=2.5 Hz, 3H), 3.60 (s, 2H), 3.36 (s, 2H), 2.24-2.06 (m, 1H), 1.58-1.34 (m, 7H), 1.19-1.16 (m, 6H), 0.93-0.81 (m, 6H). HRMS ([M+H]⁺) 430.2405 m/z

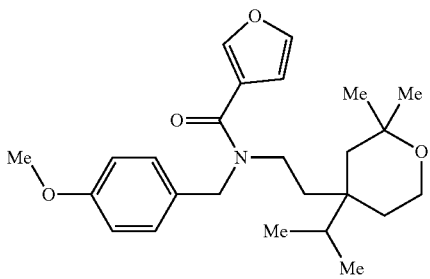

Chemical Formula: C₂₅H₃₅NO₄
Exact Mass: 413.2566
Molecular Weight: 413.5580

JGB-1-128 (N-(2-(4-isopropyl-2,2-dimethyltetrahydro-2H-pyran-4-yl)ethyl)-N-(4-methoxybenzyl)furan-3-carboxamide). Synthesized via HATU coupling furan-3-carboxylic acid with intermediate 5 (same conditions as S6). 1H NMR (501 MHz, CDCl3) δ 7.67 (s, 1H), 7.38 (s, 1H), 7.16 (d, J=8.1 Hz, 2H), 6.90 (dd, J=9.1, 2.8 Hz, 2H), 6.58 (d, J=1.7 Hz, 1H), 4.64 (q, J=16.0 Hz, 2H), 3.81 (d, J=2.8 Hz, 3H), 3.64 (q, J=8.6 Hz, 2H), 3.38 (td, J=12.0, 6.0 Hz, 2H), 1.78 (s, 2H), 1.59 (p, J=7.0 Hz, 1H), 1.49 (dt, J=14.2, 7.3 Hz, 1H), 1.40 (d, J=14.1 Hz, 1H), 1.20 (s, 2H), 1.18 (s, 3H), 0.92-0.86 (m, 3H), 0.86-0.81 (m, 6H). HRMS ([M+H]⁺) 414.2633 m/z

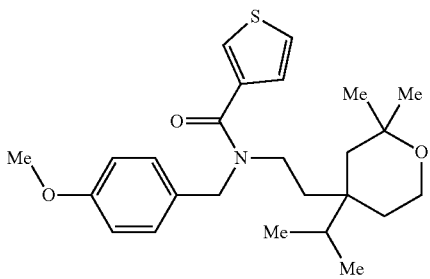

Chemical Formula: C₂₅H₃₅NO₃S
Exact Mass: 429.2338
Molecular Weight: 429.6190

JGB-1-129 (N-(2-(4-isopropyl-2,2-dimethyltetrahydro-2H-pyran-4-yl)ethyl)-N-(4-methoxybenzyl)oxazole-5-carboxamide). Synthesized via HATU coupling oxazole-5-carboxylic acid with intermediate 5 (same conditions as S6). 1H NMR (501 MHz, DMSO) δ 8.46 (s, 1H), 7.78-7.50 (m, 1H), 7.17 (s, 2H), 6.94-6.82 (m, 2H), 4.76-4.42 (m, 2H), 3.70 (d, J=4.2 Hz, 3H), 3.40-3.17 (m, 2H), 1.63 (s, 2H), 1.47 (s, 2H), 1.34-0.94 (m, 10H), 0.79-0.62 (m, 6H). HRMS ([M+Na]⁺) 437.2408 m/z

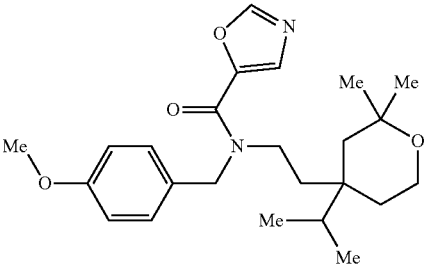

Chemical Formula: C₂₄H₃₄N₂O₄
Exact Mass: 414.2519
Molecular Weight: 414.5460

JGB-1-130 (N-(2-(4-isopropyl-2,2-dimethyltetrahydro-2H-pyran-4-yl)ethyl)-N-(4-methoxybenzyl)-1H-pyrrole-2-carboxamide). Synthesized via HATU coupling 1H-pyrrole-2-carboxylic acid with intermediate 5 (same conditions as S6). 1H NMR (501 MHz, CDCl3) δ 9.51 (s, 1H), 7.20 (d, J=8.3 Hz, 1H), 6.97-6.87 (m, 3H), 6.43 (s, 1H), 6.17 (s, 1H), 4.90-4.71 (m, 2H), 3.81 (s, 2H), 3.67 (q, J=7.4 Hz, 2H), 3.50-3.39 (m, 2H), 3.35 (s, 1H), 2.23 (dd, J=15.8, 8.2 Hz, 1H), 1.84 (dt, J=17.0, 10.3 Hz, 2H), 1.55 (s, 4H), 1.22 (s, 3H), 1.19 (s, 3H), 0.88-0.86 (m, 6H). HRMS ([M+H]⁺) 413.2789 m/z

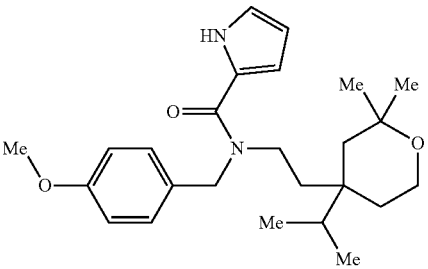

Chemical Formula: C₂₅H₃₅N₂O₃
Exact Mass: 412.2726
Molecular Weight: 412.5740

JGB-1-131 (N-(2-(4-isopropyl-2,2-dimethyltetrahydro-2H-pyran-4-yl)ethyl)-N-(4-(trifluoromethoxy)benzyl)furan-2-carboxamide). Synthesized via reductive amination of 4-(trifluoromethoxy)benzaldehyde with intermediate 4 and subsequent HATU coupling with furoic acid (same conditions as step S5 and S6). 19F NMR (376 MHz, CDCl3) 5-59.14. 1 H NMR (501 MHz, CDCl3) δ 7.43 (s, 1H), 7.33 (d, J=8.4 Hz, 2H), 7.19 (d, J=8.2 Hz, 2H), 7.08 (s, 1H), 6.48 (s, 1H), 4.84 (d, J=15.7 Hz, 1H), 4.73 (d, J=15.8 Hz, 1H), 3.67-3.63 (m, 2H), 1.90 (s, 2H), 1.77 (dt, J=13.4, 6.8 Hz, 2H), 1.63 (p, J=6.8 Hz, 3H), 1.52 (dt, J=14.1, 7.4 Hz, 4H), 1.44 (s, 1H), 1.41 (s, 1H), 1.20 (s, 3H), 1.19 (s, 3H), 0.84 (t, J=6.4 Hz, 6H). HRMS ([M+H]⁺) 468.2363 m/z

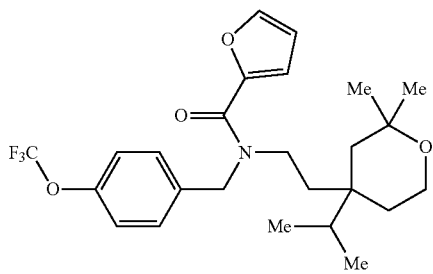

Chemical Formula: C25H32F3NO4
Exact Mass: 467.2283
Molecular Weight: 467.5292

JGB-1-133 (N-(2-(4-isopropyl-2,2-dimethyltetrahydro-2H-pyran-4-yl)ethyl)-N-(4-methoxy-2-(trifluoromethyl)benzyl)furan-2-carboxamide). Synthesized via reductive amination of 4-methoxy-2-(trifluoromethyl)benzaldehyde with intermediate 4 and subsequent HATU coupling with furoic acid (same conditions as S5 and S6). 1H NMR (501 MHz, CDCl3) δ 7.50-7.41 (m, 3H), 7.08 (d, J=3.5 Hz, 1H), 6.99 (d, J=8.4 Hz, 1H), 6.48 (dd, J=3.5, 1.8 Hz, 1H), 4.81 (d, J=15.5 Hz, 1H), 4.68 (d, J=15.3 Hz, 1H), 3.90 (s, 3H), 3.65 (dq, J=7.5, 3.1 Hz, 2H), 3.46 (s, 2H), 1.89-1.81 (m, 1H), 1.76 (td, J=13.0, 5.6 Hz, 2H), 1.64 (p, J=7.0 Hz, 2H), 1.52 (h, J=7.2 Hz, 2H), 1.44 (d, J=2.3 Hz, 1H), 1.20 (s, 3H), 1.19 (s, 3H), 0.85 (d, J=4.8 Hz, 3H), 0.85-0.83 (m, 3H). 19F NMR (376 MHz, CDCl3) 5-62.95. HRMS ([M+H]$^+$) 482.2523 m/z

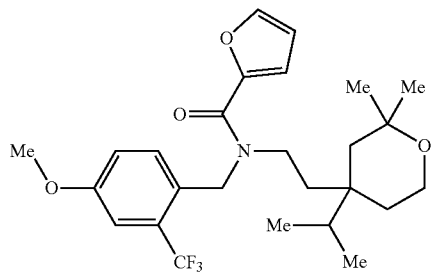

Chemical Formula: C26H34F3NO4
Exact Mass: 481.2440
Molecular Weight: 481.5562

JGB-1-134 (N-((1H-indol-5-yl)methyl)-N-(2-(4-isopropyl-2,2-dimethyltetrahydro-2H-pyran-4-yl)ethyl)furan-2-carboxamide). Synthesized via reductive amination of 1H-indole-5-carbaldehyde with intermediate 4 and subsequent HATU coupling with furoic acid (same conditions as S5 and S6). 1H NMR (501 MHz, CDCl3) δ 8.25 (s, 1H), 7.54 (s, 1H), 7.44 (d, J=1.8 Hz, 1H), 7.36 (d, J=8.3 Hz, 1H), 7.21 (t, J=2.8 Hz, 1H), 7.13 (d, J=8.4 Hz, 1H), 7.04 (s, 1H), 6.51 (t, J=2.6 Hz, 1H), 6.45 (s, 1H), 4.97 (d, J=15.4 Hz, 1H), 4.84 (d, J=15.6 Hz, 1H), 3.60 (td, J=10.8, 5.1 Hz, 2H), 3.49 (s, 2H), 1.92-1.79 (m, 2H), 1.63-1.57 (m, 1H), 1.48 (ddd, J=14.2, 9.4, 5.0 Hz, 1H), 1.37 (s, 1H), 1.26-1.21 (m, 3H), 1.19 (s, 3H), 1.17 (s, 3H), 0.83 (d, J=6.9 Hz, 6H). HRMS ([M+H]$^+$) 423.2635 m/z

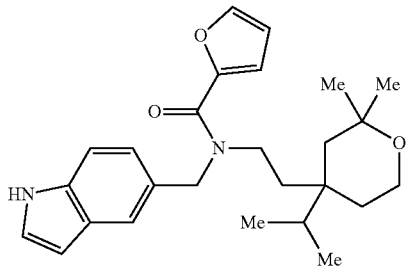

Chemical Formula: C26H34N2O3
Exact Mass: 422.2569
Molecular Weight: 422.5690

JGB-1-135 (5-chloro-N-(2-(4-isopropyl-2,2-dimethyltetrahydro-2H-pyran-4-yl)ethyl)-N-(4-methoxybenzyl)furan-2-carboxamide). Synthesized via HATU coupling 5-chlorofuran-2-carboxylic acid with intermediate 5 (same conditions as S6). 1H NMR (501 MHz, CDCl3) δ 7.20 (d, J=8.1 Hz, 2H), 7.06-7.01 (m, 1H), 6.90-6.86 (m, 2H), 6.26 (d, J=3.5 Hz, 1H), 4.75 (d, J=15.4 Hz, 1H), 4.65 (d, J=15.7 Hz, 1H), 3.80 (s, 3H), 3.65 (dd, J=7.0, 3.9 Hz, 2H), 3.46 (s, 2H), 1.87-1.71 (m, 3H), 1.53 (dt, J=14.0, 6.9 Hz, 2H), 1.46-1.42 (m, 1H), 1.21 (s, 3H), 1.20 (s, 3H), 0.85 (dd, J=6.9, 4.2 Hz, 6H). HRMS ([M+H]$^+$) 448.2247 m/z

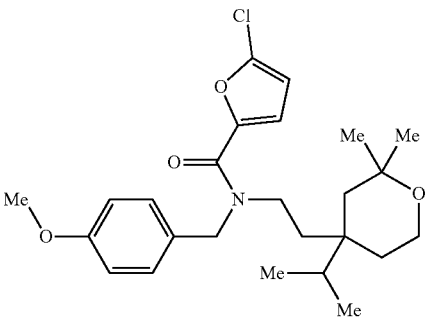

Chemical Formula: C25H34ClNO4
Exact Mass: 447.2176
Molecular Weight: 448.0000

JGB-1-137 (N-(2-(4-isopropyl-2,2-dimethyltetrahydro-2H-pyran-4-yl)ethyl)-N-(4-methoxybenzyl)thiophene-2-carboxamide). Synthesized via HATU coupling thiophene-2-carboxylic acid with intermediate 5 (same conditions as S6). 1H NMR (501 MHz, CDCl3) δ 7.41 (dd, J=5.1, 1.4 Hz, 1H), 7.29 (d, J=3.7 Hz, 1H), 7.20 (d, J=8.1 Hz, 2H), 6.98 (t, J=4.4 Hz, 1H), 6.90 (d, J=8.1 Hz, 2H), 4.76 (d, J=15.9 Hz, 1H), 4.68 (d, J=15.9 Hz, 1H), 3.81 (t, J=1.3 Hz, 3H), 3.64-3.60 (m, 2H), 3.42 (dh, J=13.4, 7.0 Hz, 3H), 1.88-1.73

(m, 3H), 1.58 (p, J=6.9 Hz, 2H), 1.48 (dt, J=14.1, 7.2 Hz, 2H), 1.40 (s, 1H), 1.38 (s, 1H), 1.19 (s, 3H), 1.18 (s, 3H), 0.82 (t, J=7.1 Hz, 6H). HRMS ([M+H]⁺) 430.2409 m/z

3H), 3.14 (s, 1H), 1.85 (t, J=8.6 Hz, 1H), 1.75-1.32 (m, 6H), 1.22-0.91 (m, 6H), 0.90-0.82 (m, 4H), 0.65-0.54 (m, 2H). HRMS ([M+H]⁺) 426.2737 m/z

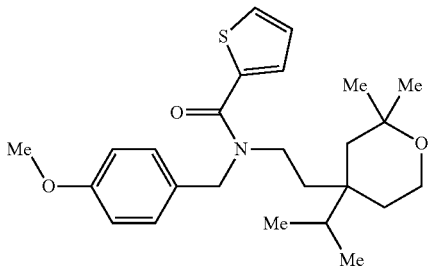

Chemical Formula: C₂₅H₃₅NO₃S
Exact Mass: 429.2338
Molecular Weight: 429.6190

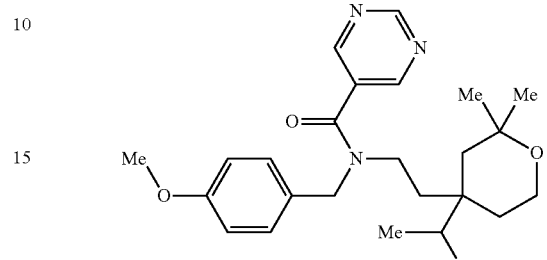

Chemical Formula: C₂₅H₃₅N₃O₃
Exact Mass: 425.2678
Molecular Weight: 425.5730

JGB-1-145 (N-(2-(4-isopropyl-2,2-dimethyltetrahydro-2H-pyran-4-yl)ethyl)-N-(4-methoxybenzyl)pyrimidine-4-carboxamide). Synthesized via HATU coupling pyrimidine-4-carboxylic acid with intermediate 5 (same conditions as S6) 1H NMR (501 MHz, CDCl3) δ 9.22 (dd, J=5.3, 3.3 Hz, 1H), 8.91-8.83 (m, 1H), 7.66-7.60 (m, 1H), 7.30-7.18 (m, 2H), 6.87 (ddd, J=14.2, 8.8, 3.1 Hz, 2H), 4.84-4.48 (m, 2H), 3.82-3.77 (m, 2H), 3.64 (dt, J=9.3, 3.0 Hz, 1H), 3.55 (dq, J=9.4, 3.5 Hz, 1H), 3.44-3.38 (m, 1H), 3.36-3.26 (m, 1H), 1.82 (ddt, J=17.2, 8.6, 3.1 Hz, 1H), 1.72-1.64 (m, 1H), 1.57 (ddd, J=13.4, 8.8, 5.4 Hz, 1H), 1.49 (dt, J=9.2, 4.2 Hz, 1H), 1.40 (ddd, J=14.4, 9.0, 3.3 Hz, 2H), 1.29 (d, J=3.1 Hz, 1H), 1.23-1.08 (m, 7H), 1.07-0.95 (m, 1H), 0.85 (ddd, J=9.3, 6.4, 2.7 Hz, 4H), 0.65 (ddd, J=15.8, 6.9, 3.1 Hz, 2H). HRMS ([M+H]⁺) 426.2742 m/z JGB-1-147 (N-(2-(4-isopropyl-2,2-dimethyltetrahydro-2H-pyran-4-yl)ethyl)-N-(4-methoxybenzyl)-1H-imidazole-5-carboxamide). Synthesized via HATU coupling 1H-imidazole-5-carboxylic acid with intermediate 5 (same conditions as S6). 1H NMR (501 MHz, CDCl3) δ 8.75 (s, 1H), 7.39 (s, 1H), 7.11 (d, J=7.7 Hz, 2H), 6.93 (d, J=7.9 Hz, 2H), 4.73 (q, J=17.2 Hz, 2H), 3.80 (s, 3H), 3.71 (s, 2H), 3.64-3.34 (m, 3H), 2.12 (s, 1H), 1.93-1.69 (m, 3H), 1.70-1.53 (m, 3H), 1.46 (d, J=13.9 Hz, 2H), 1.22 (s, 6H), 0.82 (d, J=7.8 Hz, 6H). HRMS ([M+H]⁺) 414.2739 m/z

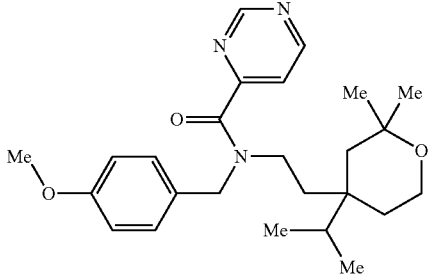

Chemical Formula: C₂₅H₃₅N₃O₃
Exact Mass: 425.2678
Molecular Weight: 425.5730

JGB-1-146 (N-(2-(4-isopropyl-2,2-dimethyltetrahydro-2H-pyran-4-yl)ethyl)-N-(4-methoxybenzyl)pyrimidine-5-carboxamide). Synthesized via HATU coupling pyrimidine-5-carboxylic acid with intermediate 5 (same conditions as S6). 1H NMR (501 MHz, CDCl3) δ 9.30-9.19 (m, 1H), 8.82 (s, 2H), 7.06 (d, J=8.1 Hz, 1H), 6.90 (d, J=8.0 Hz, 2H), 4.71 (d, J=9.5 Hz, 1H), 4.45 (s, 1H), 3.81 (s, 3H), 3.73-3.41 (m,

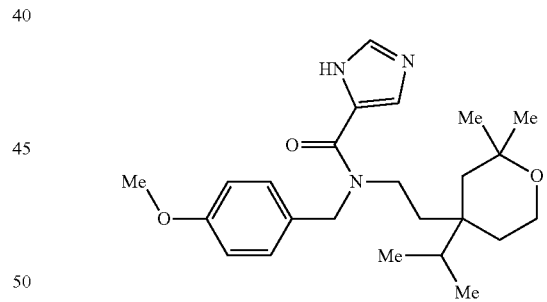

Chemical Formula: C₂₄H₃₅N₃O₃
Exact Mass: 413.2678
Molecular Weight: 413.5620

JGB-1-148 (2-(furan-2-yl)-N-(2-(4-isopropyl-2,2-dimethyltetrahydro-2H-pyran-4-yl)ethyl)-N-(4-methoxybenzyl)acetamide). Synthesized via HATU coupling 2-(furan-2-yl) acetic acid with intermediate 5 (same conditions as S6). 1H NMR (501 MHz, CDCl3) δ 7.52 (d, J=8.1 Hz, 1H), 7.28 (t, J=7.2 Hz, 1H), 7.25-7.16 (m, 3H), 7.09 (dd, J=8.5, 5.4 Hz, 1H), 6.99 (d, J=7.3 Hz, 1H), 6.90-6.79 (m, 2H), 3.80 (s, 1H), 3.65 (s, 1H), 3.48 (q, J=7.0 Hz, 1H), 2.71 (t, J=7.5 Hz, 1H), 2.58 (t, J=7.5 Hz, 1H), 2.40 (s, 2H), 1.92-1.37 (m, 4H), 1.24-1.14 (m, 6H), 0.87 (d, J=9.5 Hz, 6H). HRMS ([M+H]⁺) 428.2784 m/z

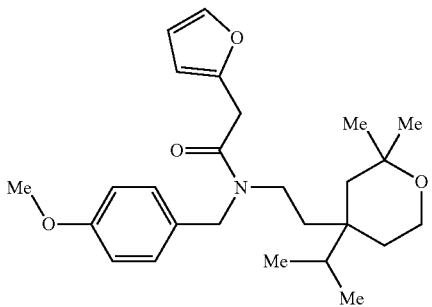

Chemical Formula: C₂₆H₃₇NO₄
Exact Mass: 427.27
Molecular Weight: 427.59

JGB-1-151 (N-(4-methoxybenzyl)furan-2-carboxamide). Synthesized via HATU coupling between (4-methoxyphenyl)methanamine and furoic acid (same conditions as S6). 1H NMR (501 MHz, CDCl3) δ 7.40 (dd, J=1.8, 0.9 Hz, 1H), 7.30-7.25 (m, 2H), 7.14 (dd, J=3.5, 0.9 Hz, 1H), 6.91-6.85 (m, 2H), 6.58 (s, 1H), 6.49 (dd, J=3.5, 1.7 Hz, 1H), 4.54 (d, J=5.8 Hz, 2H), 3.80 (s, 3H). LCMS ([M+H]⁺) 232.1 m/z

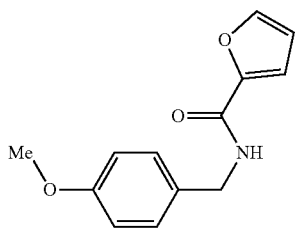

Chemical Formula: C₁₃H₁₃NO₃
Exact Mass: 231.0895
Molecular Weight: 231.2510

JGB-1-152 (N-(4-methoxybenzyl)-2-(tetrahydro-2H-pyran-4-yl)ethan-1-amine). Synthesized via reductive amination of 4-methoxybenzaldehyde with 2-(tetrahydro-2H-pyran-4-yl)ethan-1-amine (same conditions as S5). 1H NMR (501 MHz, CDCl3) δ 7.23-7.18 (m, 2H), 6.87-6.81 (m, 2H), 3.93-3.88 (m, 2H), 3.77 (s, 3H), 3.70 (s, 2H), 3.33 (td, J=11.8, 1.9 Hz, 2H), 2.62 (t, J=7.4 Hz, 2H), 1.57-1.52 (m, 3H), 1.47-1.41 (m, 2H), 1.32-1.21 (m, 3H). LCMS ([M+H]⁺) 250.2 m/z

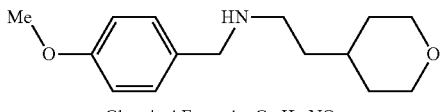

Chemical Formula: C₁₅H₂₃NO₂
Exact Mass: 249.1729
Molecular Weight: 249.3540

JGB-1-153 (N-(4-methoxybenzyl)-N-(2-(tetrahydro-2H-pyran-4-yl)ethyl)furan-2-carboxamide). Synthesized via reductive amination of 4-methoxybenzaldehyde with 2-(tetrahydro-2H-pyran-4-yl)ethan-1-amine and subsequent HATU coupling with furoic acid (same conditions as S5 and S6). 1H NMR (501 MHz, CDCl3) δ 7.44 (s, 1H), 7.20 (d, J=7.8 Hz, 2H), 7.02 (s, 1H), 6.87 (d, J=8.1 Hz, 2H), 6.46 (s, 1H), 4.71 (s, 2H), 3.94-3.87 (m, 2H), 3.79 (s, 3H), 3.47 (s, 2H), 3.32 (td, J=11.7, 2.3 Hz, 2H), 2.79 (d, J=2.1 Hz, 1H), 1.60-1.43 (m, 5H), 1.28 (dp, J=16.5, 5.6 Hz, 3H). LCMS ([M+H]⁺) 344.2 m/z

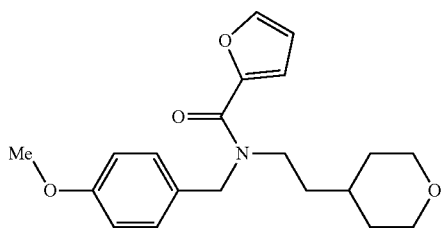

Chemical Formula: C₂₀H₂₅NO₄
Exact Mass: 343.1784
Molecular Weight: 343.4230

JGB-1-155 (N-(4-(dimethylamino)benzyl)-N-(2-(4-isopropyl-2,2-dimethyltetrahydro-2H-pyran-4-yl)ethyl)furan-2-carboxamide). Synthesized via reductive amination of 4-(dimethylamino)benzaldehyde with intermediate 4 and subsequent HATU coupling with furoic acid (same conditions as S5 and S6). 1H NMR (501 MHz, CDCl3) δ 7.54 (s, 1H), 7.35-7.01 (m, 4H), 6.84 (s, 1H), 6.57 (d, J=18.0 Hz, 1H), 4.83 (d, J=59.2 Hz, 2H), 3.77 (td, J=16.0, 6.2 Hz, 3H), 3.46 (d, J=13.5 Hz, 2H), 3.05 (s, 6H), 2.01-1.45 (m, 9H), 1.41-1.25 (m, 17H), 0.95 (s, 6H). HRMS ([M+H]⁺) 427.2949 m/z

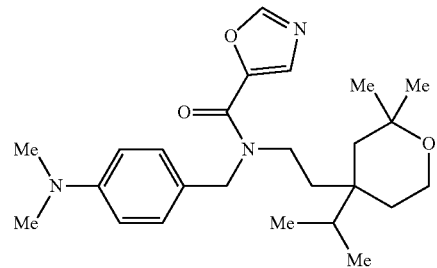

Chemical Formula: C₂₆H₃₈N₂O₃
Exact Mass: 426.2882
Molecular Weight: 426.6010

JGB-1-158 (N-(2-(2,2-dimethyltetrahydro-2H-pyran-4-yl)ethyl)-N-(4-methoxybenzyl)furan-2-carboxamide). Synthesized as described in section 1l. 1H NMR (501 MHz, DMSO) δ 7.85-7.74 (m, 1H), 7.19 (s, 2H), 7.02 (s, 1H), 6.90 (s, 2H), 6.60 (s, 1H), 4.62 (s, 2H), 3.75-3.68 (m, 3H), 3.56-3.36 (m, 3H), 3.34-3.27 (m, 2H), 1.41 (s, 5H), 1.23 (s, 1H), 1.06 (dd, J=12.1, 5.4 Hz, 6H), 1.00-0.87 (m, 2H). HRMS ([M+H]⁺) 372.2173 m/z

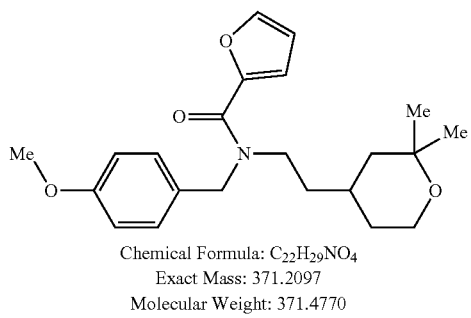 [SMILES: COc1ccc(CN(CCC2CCOC(C)(C)C2)C(=O)c2ccco2)cc1]

Chemical Formula: $C_{22}H_{29}NO_4$
Exact Mass: 371.2097
Molecular Weight: 371.4770

Results and Discussion

A high-throughput screen (HTS) of 22,000 compounds was performed to identify those that augment NAMPT enzymatic activity[38]. Screening used a coupled three-enzyme assay to detect conversion of NAM to $NAD^+$, as previously described by our group[37]. Our activators bind to the rear allosteric channel of NAMPT and are therefore more precisely termed NAMPT positive allosteric modulators (N-PAMs). We envisioned the use of N-PAMs in ND and therefore chose an HTS hit series with desirable predicted brain penetration to pursue, as calculated by the central nervous system multiparameter optimization (CNS MPO) score. The hit NP-A3-B2 was selected and hit-to-lead optimization was initiated. We also established assays in which to assess the ability of our compounds to mitigate neuronal oxidative stress.

A high resolution (1.3-1.5 Å) NP-A3-B2:NAMPT co-crystal structure was obtained, exhibiting allosteric binding of the hit to the NAMPT rear channel, consistent with other hits. The co-crystal structure of NP-A3-B2, NAM, and NAMPT provides valuable information for our initial optimization efforts that sought to augment protein-ligand interactions. NP-A3-B2 was divided into three regions: $R^1$-methoxyphenyl, $R^2$-furfuryl, and $R^3$-tetrahydropyran.

Region $R^1$ can be subdivided into the methoxy moiety and phenyl moiety due to the unique environments immediately surrounding them. The methoxy group sits adjacent to the active site and, based on 1.8-1.9 Å distances, is participating in a hydrogen bonding network between two water molecules, valine 242 carbonyl, aspartate 219, serine 247, and NAM. The phenyl moiety is surrounded by lipophilic residue side chains valine 242, isoleucine 309, isoleucine 351, and alanine 370. The only polar side chain adjacent to the phenyl moiety is histidine 191 that sits 3.7 Å away ~90° relative to the plane of the benzene ring. An edge-to-face pi-pi interaction could be taking place and the hydrophobic residues provide potential opportunity to add buried hydrophobic surface area.

Furfuryl $R^2$ is oriented into a polar pocket made up of lysine 189, arginine 349 and the carbonyls of other residues. The furfuryl carbonyl hydrogen bonds to a water molecule that in turn hydrogen bonds to arginine 349. Distances from the furan ring to the lysine and arginine are 3.6 and 3.8 Å, respectively, giving sufficient space to add a number of possible polar functional group interactions.

Finally, tetrahydropyran $R^3$ sits at the interface between the allosteric channel and external solvent, being surrounded by proline 273, proline 307, valine 242, and tyrosine 188. The crystal structure indicates that NP-A3-B2 is not having any significant polar interactions with NAMPT in this region. Our SAR hypothesis here is that the bulky tetrahydropyran acts as an anchor, stabilizing the molecule at a certain depth in the channel.

Co-crystal structure analysis revealed the methoxyphenyl and furfuryl groups to be having a number of interactions that could be optimized. It was hypothesized that adding ligand-residue interactions in the $R^1$ and $R^2$ regions would increase binding energy and result in increased potency and efficacy.

A synthetic route was designed to verify the hit by resynthesis and make changes in $R^1$ and $R^2$ near the end of the route to efficiently produce analogs. Upon retrosynthetic analysis, it was conceivable that the central amide could be achieved via amide coupling between furoic acid and a secondary amine. This could be preceded by a reductive amination to afford the secondary amine. The synthesis of the substituted tetrahydropyran primary amine had been reported, so it could serve as the amine to couple with 4-methoxybenzaldehyde in reductive amination[39]. Fortunately, this route was successful.

The six-step synthetic route began with the Claisen condensation between ethyl cyanoacetate and 2,2-dimethyltetrahydropyran-4-one to produce the double α,β-unsaturated carbonyl and nitrile containing 1 (Scheme 1 below). Next, using Grignard, the isopropyl group was installed on 1 to yield the 1,4-conjugate addition product 2. Decarboxylation gave the nitrile 3 that was reduced to the key primary amine intermediate 4 with cobalt chloride and sodium borohydride. Significant troubleshooting was required to achieve the secondary amine 5 by reductive amination. Screening of various conditions highlighted THF and $NaBH_4$ as the best solvent and reducing agent combination. Next, timing, stoichiometry, and additive (acid or Lewis acid) were varied and lead to the determination that prolonged imine formation and acetic acid increased the yield. Stoichiometry ended up being most important, specifically, keeping the primary amine 4 in excess to the benzaldehyde reagent. Finally, NP-A3-B2 was completed via coupling with HATU to afford the amide 6. This route was successfully scaled up from milligram to decagram quantities.

Scheme 1

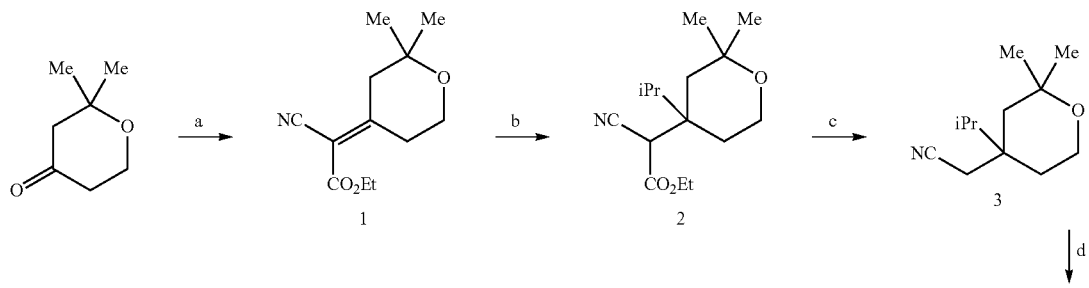

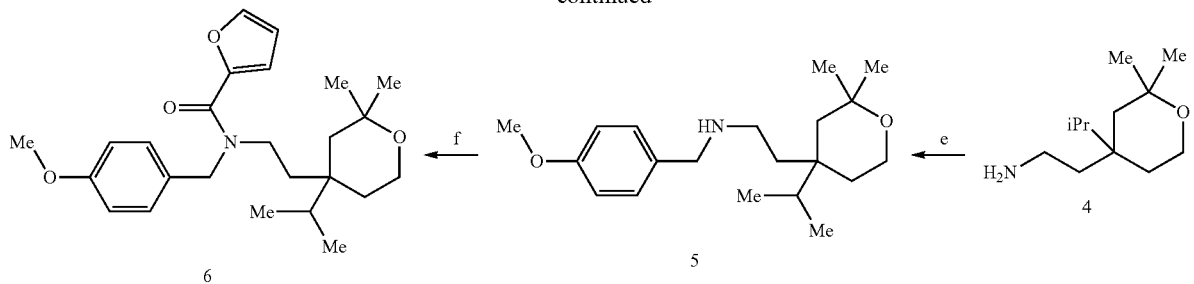

Derivatization started by using alternate benzaldehyde reagents with 1° amine 4 and carboxylic acid reagents with 2° amine 5. Analogs in the methoxyphenyl $R^1$ region explored increased hydrophobic surface area, adding a hydrogen bond donor, and fluorinating potential metabolic oxidation sites. Furthermore, the methoxy was replaced with a dimethylamino bioisostere. Analogs in the furfuryl $R^2$ region were designed to assess varying heteroatoms and positions around the ring, addition of a halogen substituent, or additional heteroatoms to the ring. Additionally, expansion to six-membered heterocycles was explored, as well as homologation to extend the furan from the carbonyl by one methylene. Changes to the aliphatic bulk in region $R^3$ were made to test the hypothesis that this solvent-exposed moiety acts as an anchor, holding the rest of the molecule at a particular depth in the channel. The size was decreased by removing the isopropyl group, all substituents on the tetrahydropyran, and the entire region.

Initial screening in THP-1 human monocytes (3 μM, 24 hours) indicated that JGB-1-134, -127, -137, and -155 had significantly greater ability to raise $NAD^+$ levels compared to the parent compound NP-A3-B2 (data not shown). Follow up dose response studies in this system highlighted dimethylamino JGB-1-155 as the top performer with an 88% increase in $NAD^+$ (1.88-fold) over control at 30 μM. This was a significant improvement from NP-A3-B2 which induced an 18% $NAD^+$ increase (1.18-fold) at 30 μM (FIG. 1A). Accurate quantitative assessment of cellular $EC_{50}$ was not possible with the available data, however, it does indicate that JGB-1-155, -137, and -127 have improved potency in THP-1.

Analogs were also assessed in the HTS coupled enzyme assay to discern their $A_{max}$ and $EC_{50}$ values. Thirteen of twenty compounds produced dose-response curves suitable for potency and efficacy quantification (FIG. 1B). Twelve of the thirteen compounds increased NAMPT activity while JGB-1-147 exhibited inhibitory activity decreasing $A_{max}$ 0.25-fold with an $IC_{50}$ of 5.32 μM. Only JGB-1-155 exhibited slight potency gains in the enzyme assay, having an $EC_{50}$ of 3.41 μM relative to 4.05 μM for NP-A3-B2. The 1.85-fold $A_{max}$ of the hit was not surpassed, but JGB-1-137 and -128 were the closest at 1.74- and 1.65-fold, respectively.

Analogs were also assessed in the HTS coupled enzyme assay to discern their $A_{max}$ and $EC_{50}$ values. Thirteen of twenty compounds produced dose-response curves suitable for potency and efficacy quantification (FIG. 1B). Twelve of the thirteen compounds increased NAMPT activity while JGB-1-147 exhibited inhibitory activity decreasing $A_{max}$ 0.25-fold with an $IC_{50}$ of 5.32 μM. Only JGB-1-155 exhibited slight potency gains in the enzyme assay, having an $EC_{50}$ of 3.41 μM relative to 4.05 μM for NP-A3-B2. The 1.85-fold $A_{max}$ of the hit was not surpassed, but JGB-1-137 and -128 were the closest at 1.74- and 1.65-fold, respectively.

The discrepancy between cell and enzyme data speaks to the value of cell-based assays as a first line assessment of PK. Compound optimization in an isolated enzyme is highly valuable but parallel cell testing greatly strengthens hit-to-lead efforts by providing both enzyme mechanistic and complex biological performance readouts simultaneously. The feedback from both can then be used to efficiently guide synthesis toward compounds that effectively reach and influence the target in vivo. The results from the cell $NAD^+$ and NAMPT enzyme assays lead to the selection of top compounds for study in the ND and aging dysfunction neuroprotection assays being developed in parallel with our medicinal chemistry work. Based on both cell and enzyme assays, JGB-1-137, -128, -155, -127, -134, and NP-A3-B2 were chosen.

We set out to design assays representing the connection between OS and the multifaceted pathophysiology of aging and ND. We assessed multiple treatments in several cell lines to model OS induced by diverse factors such as neuroinflammatory signaling, neurotransmitter signaling, and direct oxidant species. Assay development highlighted the neuronal HT-22 mouse hippocampal cell line as most robust for these purpose s, and inflammatory cytokine TNFα as being a reliable and disease-relevant method for inducing ROS generation.

Figure 2A:
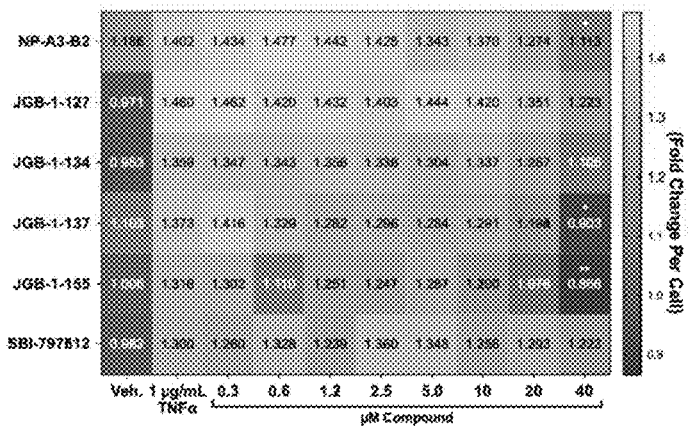
FIG. 2A shows compounds described herein screened against 1 µg/mL TNFα.
Figure 2B:
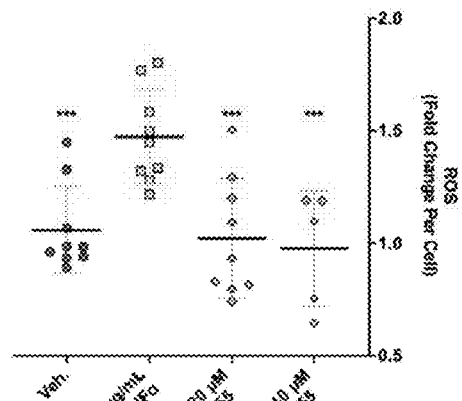
FIG. 2B shows the reduction of TNFα-induced ROS by 20 µM and 40 µM JGB-1-155.
Figure 2C:
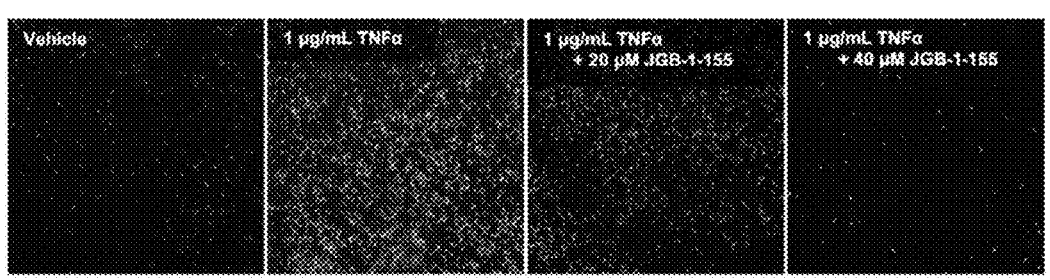
FIG. 2C shows the stark MitoSOX signal intensification induced by TNFα and its reduction by JGB-1-155 as seen in the cell images taken from the assay.

The hit, selected analogs, and previously reported NAMPT activator SBI-797812 were screened against 1 μg/mL TNFα (FIG. 2A). NP-A3-B2 and JGB-1-134 had little effect until 40 μM where the hit was significant and JGB-1-134 trended toward ROS mitigation. JGB-1-137 and JGB-1-155 had a dose-dependent downward trend in ROS levels, but only became significant at 40 μM. SBI-797812 had no significant effects on ROS at any concentration tested. Consistent with its relative $NAD^+$ enhancement in THP-1, JGB-1-155 outperformed all other analogs and the hit in ROS attenuation. Following the identification of JGB-1-155 as the most efficacious ROS reducer, further replicates were performed to verify its activity. This revealed the highly significant reduction of TNFα-induced ROS by 20 μM and 40 μM JGB-1-155 (FIG. 2B). The stark MitoSOX signal intensification induced by TNFα and its reduction by JGB-1-155 can be seen in the cells and inflammatory cytokine TNFα as being a reliable and disease-relevant method for inducing ROS generation.

Figure 2D:
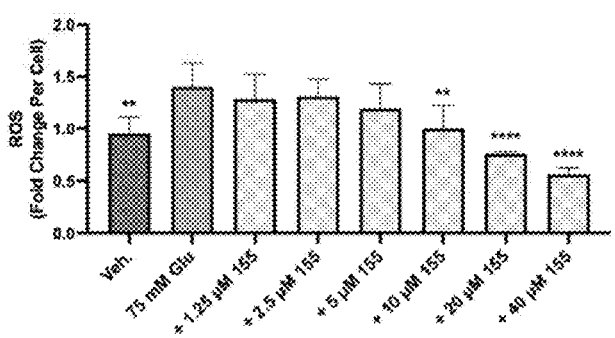
Figure 2E:
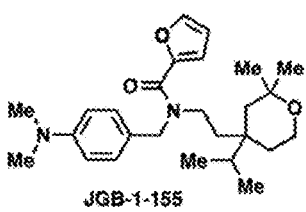
FIG. 2E shows the structure of JGB-1-155.
Figure 2F:
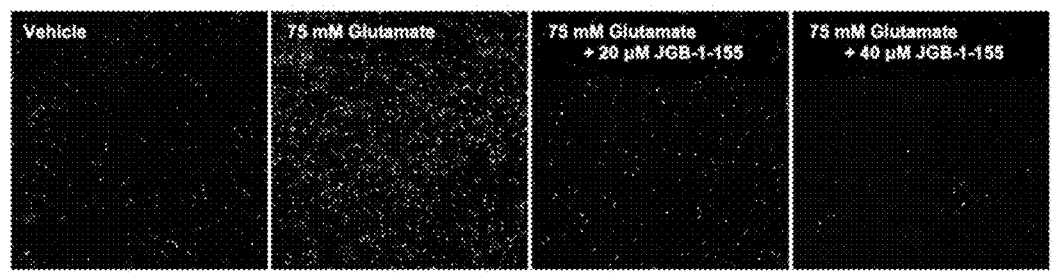
FIG. 2F shows decreased ROS levels by JGB-155 as seen in the cell images taken from the assay.

At this point, the ROS mitigating effects of JGB-1-155 was assessed against additional insults in HT-22. The dimethylamino analog was tested against a 75 mM glutamate insult and exhibited the same dose-dependent ROS-reducing activity seen against TNFα. Remarkably, JGB-1-155 treatments of 20 µM and 40 µM decreased ROS levels below that of the vehicle treated control (FIG. 2D). Images taken from the assay demonstrate this effect exquisitely (FIG. 2F).

Figure 3:
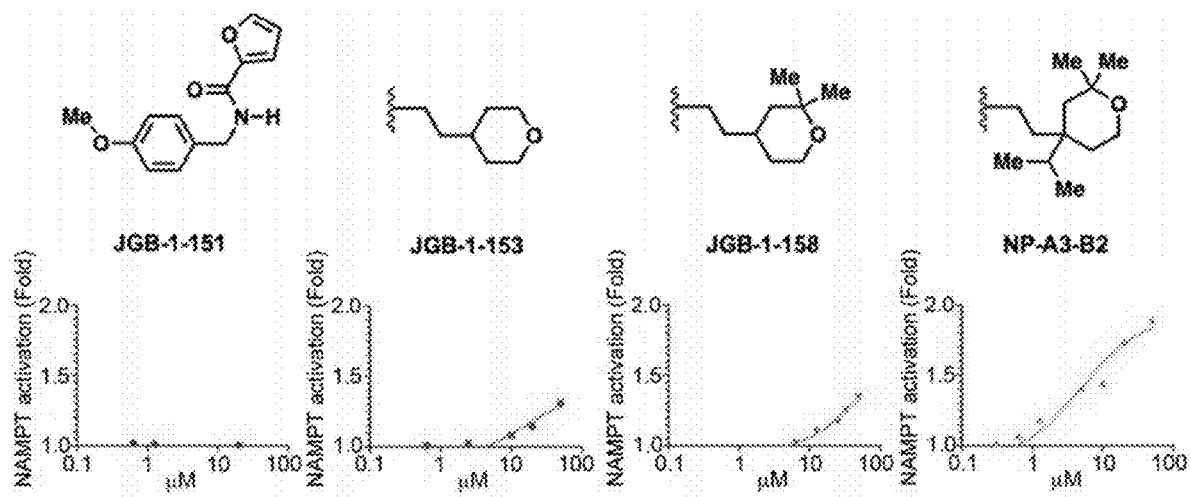
FIG. 3 shows NAMPT activation by several compounds described herein.

Enzyme, THP-1, and HT-22 data in FIGS. 4 and 5 provide significant SAR insights that will help guide future synthesis. Compounds with a single 4-position substituent on the $R^1$ benzene ring had superior activity in both NAMPT and THP-1. Additionally, the 4-dimethylamino in JGB-1-155, improved activity in both THP-1 and HT-22 cell lines over the 4-methoxy compounds. Thiophene replacement of the $R^2$ furan moiety, such as in JGB-1-137, significantly improved $NAD^+$ production in THP-1 while retaining comparable potency and efficacy to NP-A3-B2 in NAMPT. All $R^2$ changes adding atoms beyond a five-membered ring attached to the amide carbonyl were detrimental. Increasing size by extending the furan with homologation, expanding to a six-membered heterocycle, and adding a halogen substituent all undermined activity. The $R^2$ ring is somewhat amenable to heteroatom position alteration or addition, as many of these analogs retained activity, but changing polarity in this way did not increase enzyme activity, and the imidazole in JGB-1-147 inhibits NAMPT. The hypothesis for the contribution of the bulky tetrahydropyran $R^3$ group to activity was confirmed by complete voiding of activity upon its removal. Furthermore, the importance of bulk in this region is excellently demonstrated by the size-dependent increase in activity from no $R^3$ group at all, to mono-, to tri-, to tetra-substituted tetrahydropyran (FIG. 3).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES (1) Hou, Y.; Dan, X.; Babbar, M.; Wei, Y.; Hasselbalch, S. G.; Croteau, D. L.; Bohr, V. A. Ageing as a risk factor for neurodegenerative disease. *Nature Reviews Neurology* 2019, 15 (10), 565-581. DOI: 10.1038/s41582-019-0244-7.

(2) Mattson, M. P.; Arumugam, T. V. Hallmarks of Brain Aging: Adaptive and Pathological Modification by Metabolic States. *Cell Metab* 2018, 27 (6), 1176-1199. DOI: 10.1016/j.cmet.2018.05.011 From NLM.

(3) Swerdlow, R. H. Brain aging, Alzheimer's disease, and mitochondria. *Biochimica et Biophysica Acta (BBA)—Molecular Basis of Disease* 2011, 1812 (12), 1630-1639. DOI: https:/doi.org/10.1616/j.bbadis.2011.08.012.

(4) Cenini, G.; Voos, W. Mitochondria as Potential Targets in Alzheimer Disease Therapy: An Update. *Frontiers in Pharmacology* 2019, 10, Review. DOI: 10.3389/fphar.2019.00902.

(5) Beal, M. F. Mitochondria take center stage in aging and neurodegeneration. *Annals of Neurology* 2005, 58 (4), 495-505. DOI: https://doi.org/10.1002/ana.20624.

(6) Sies, H.; Jones, D. P. Reactive oxygen species (ROS) as pleiotropic physiological signalling agents. *Nature Reviews Molecular Cell Biology* 2020, 21 (7), 363-383. DOI: 10.1038/s41580-020-0230-3.

(7) Rizzo, A. M.; Berselli, P.; Zava, S.; Montorfano, G.; Negroni, M.; Corsetto, P.; Berra, B. Endogenous Antioxidants and Radical Scavengers. Springer US, 2010; pp 52-67.

(8) Rummel, N. G.; Butterfield, D. A. Altered Metabolism in Alzheimer Disease Brain: Role of Oxidative Stress. *Antioxid Redox Signal* 2022, 36 (16-18), 1289-1305. DOI: 10.1089/ars.2021.0177 From NLM.

(9) Uddin, M. S.; Kabir, M. T. Oxidative Stress in Alzheimer's Disease: Molecular Hallmarks of Underlying Vulnerability. In *Biological, Diagnostic and Therapeutic Advances in Alzheimer's Disease: Non-Pharmacological Therapies for Alzheimer's Disease*, Ashraf, G. M., Alexiou, A. Eds.; Springer Singapore, 2019; pp 91-115.

(10) Silvestro, S.; Valeri, A.; Mazzon, E. Aducanumab and Its Effects on Tau Pathology: Is This the Turning Point of Amyloid Hypothesis? *International Journal of Molecular Sciences* 2022, 23 (4), 2011.

(11) Rajman, L.; Chwalek, K.; Sinclair, D. A. Therapeutic Potential of NAD-Boosting Molecules: The In Vivo Evidence. *Cell Metab* 2018, 27 (3), 529-547. DOI: 10.1016/j.cmet.2018.02.011 From NLM.

(12) Burgos, E. S.; Schramm, V. L. Weak coupling of ATP hydrolysis to the chemical equilibrium of human nicotinamide phosphoribosyltransferase. *Biochemistry* 2008, 47 (42), 11086-11096.

(13) Revollo, J. R.; Grimm, A. A.; Imai, S.-i. The NAD Biosynthesis Pathway Mediated by Nicotinamide Phosphoribosyltransferase Regulates Sir2 Activity in Mammalian Cells *<sup></sup>. *Journal of Biological Chemistry* 2004, 279 (49), 50754-50763. DOI: 10.1074/jbc.M408388200 (acccessed 2023/02/28).

(14) Sampath, D.; Zabka, T. S.; Misner, D. L.; O'Brien, T.; Dragovich, P. S. Inhibition of nicotinamide phosphoribosyltransferase (NAMPT) as a therapeutic strategy in cancer. *Pharmacology & Therapeutics* 2015, 151, 16-31. DOI: https/doi.org/10.1016/j.pharmthera2015.02.004.

(15) Kang, B. E.; Choi, J.-Y.; Stein, S.; Ryu, D. Implications of NAD+ boosters in translational medicine. *European Journal of Clinical Investigation* 2020, 50 (10), e13334. DOI: https://doi.org/10.111/eci.13334.

(16) Wang, X.; He, H.-J.; Xiong, X.; Zhou, S.; Wang, W.-W.; Feng, L.; Han, R.; Xie, C.-L. NAD+ in Alzheimer's Disease: Molecular Mechanisms and Systematic Therapeutic Evidence Obtained in vivo. *Frontiers in Cell and Developmental Biology* 2021, 9, Review. DOI: 10.3389/fcell.2021.668491.

(17) Yoshino, J.; Baur, J. A.; Imai, S. 1. NAD(+) Intermediates: The Biology and Therapeutic Potential of NMN and NR. *Cell Metab* 2018, 27 (3), 513-528. DOI: 10.1016/j.cmet.2017.11.002 From NLM.

(18) Yoshino, M.; Yoshino, J.; Kayser, B. D.; Patti, G. J.; Franczyk, M. P.; Mills, K. F.; Sindelar, M.; Pietka, T.; Patterson, B. W.; Imai, S.-I. Nicotinamide mononucleotide increases muscle insulin sensitivity in prediabetic women. *Science* 2021, 372 (6547), 1224-1229.

(19) Irie, J.; Inagaki, E.; Fujita, M.; Nakaya, H.; Mitsuishi, M.; Yamaguchi, S.; Yamashita, K.; Shigaki, S.; Ono, T.; Yukioka, H.; et al. Effect of oral administration of nicotinamide mononucleotide on clinical parameters and nicotinamide metabolite levels in healthy Japanese men. *Endocr J* 2019. DOI: 10.1507/endocrj.EJ19-0313 From NLM.

(20) Conze, D.; Brenner, C.; Kruger, C. L. Safety and Metabolism of Long-term Administration of NIAGEN (Nicotinamide Riboside Chloride) in a Randomized, Double-Blind, Placebo-controlled Clinical Trial of Healthy Overweight Adults. *Sci Rep* 2019, 9 (1), 9772. DOI: 10.1038/s41598-019-46120-z From NLM.

(21) Brakedal, B.; Dölle, C.; Riemer, F.; Ma, Y.; Nido, G. S.; Skeie, G. O.; Craven, A. R.; Schwarzlmüller, T.; Brekke, N.; Diab, J. The NADPARK study: A randomized phase I trial of nicotinamide riboside supplementation in Parkinson's disease. *Cell Metabolism* 2022, 34 (3), 396-407. e396.

(22) Peck, B.; Chen, C.-Y.; Ho, K.-K.; Di Fruscia, P.; Myatt, S. S.; Coombes, R. C.; Fuchter, M. J.; Hsiao, C.-D.; Lam, E. W.-F. SIRT Inhibitors Induce Cell Death and p53 Acetylation through Targeting Both SIRT1 and SIRT2SIRT Inhibitors Target SIRT1/2 to Activate p53. *Molecular cancer therapeutics* 2010, 9 (4), 844-855.

(23) Rouleau, M.; Patel, A.; Hendzel, M. J.; Kaufmann, S. H.; Poirier, G. G. PARP inhibition: PARP1 and beyond. *Nature reviews cancer* 2010, 10 (4), 293-301.

(24) Ogura, Y.; Kitada, M.; Xu, J.; Monno, I.; Koya, D. CD38 inhibition by apigenin ameliorates mitochondrial oxidative stress through restoration of the intracellular NAD+/NADH ratio and Sirt3 activity in renal tubular cells in diabetic rats. *Aging* (Albany NY) 2020, 12 (12), 11325.

(25) Tarragó, M. G.; Chini, C. C.; Kanamori, K. S.; Warner, G. M.; Caride, A.; de Oliveira, G. C.; Rud, M.; Samani, A.; Hein, K. Z.; Huang, R. A potent and specific CD38 inhibitor ameliorates age-related metabolic dysfunction by reversing tissue NAD+ decline. *Cell metabolism* 2018, 27 (5), 1081-1095. e1010.

(26) Bosanac, T.; Hughes, R. O.; Engber, T.; Devraj, R.; Brearley, A.; Danker, K.; Young, K.; Kopatz, J.; Hermann, M.; Berthemy, A. Pharmacological SARM1 inhibition protects axon structure and function in paclitaxel-induced peripheral neuropathy. *Brain* 2021, 144 (10), 3226-3238.

(27) Jiang, Y.; Liu, T.; Lee, C.-H.; Chang, Q.; Yang, J.; Zhang, Z. The NAD+-mediated self-inhibition mechanism of pro-neurodegenerative SARM1. *Nature* 2020, 588 (7839), 658-663.

(28) Imai, S-i. The NAD World 2.0: the importance of the inter-tissue communication mediated by NAMPT/NAD+/SIRT1 in mammalian aging and longevity control. *NPJ systems biology and applications* 2016, 2 (1), 1-9.

(29) Pieper, A. A.; Xie, S.; Capota, E.; Estill, S. J.; Zhong, J.; Long, J. M.; Becker, G. L.; Huntington, P.; Goldman, S. E.; Shen, C.-H.; et al. Discovery of a Proneurogenic, Neuroprotective Chemical. *Cell* 2010, 142 (1), 39-51. DOI: https://doi.org/10.1016/j.cell.2010.06.018.

(30) Wang, G.; Han, T.; Nijhawan, D.; Theodoropoulos, P.; Naidoo, J.; Yadavalli, S.; Mirzaei, H.; Pieper, A. A.; Ready, J. M.; McKnight, S. L. P7C3 neuroprotective chemicals function by activating the rate-limiting enzyme in NAD salvage. *Cell* 2014, 158 (6), 1324-1334. DOI: 10.1016/j.cell.2014.07.040 From NLM.

(31) Gardell, S. J.; Hopf, M.; Khan, A.; Dispagna, M.; Hampton Sessions, E.; Falter, R.; Kapoor, N.; Brooks, J.; Culver, J.; Petucci, C.; et al. Boosting NAD(+) with a small molecule that activates NAMPT. *Nat Commun* 2019, 10 (1), 3241. DOI: 10.1038/s41467-019-11078-z From NLM.

(32) Pinkerton, A. B.; Sessions, E. H.; Hershberger, P.; Maloney, P. R.; Peddibhotla, S.; Hopf, M.; Sergienko, E.; Ma, C.-T.; Smith, L. H.; Jackson, M. R.; et al. Optimization of a urea-containing series of nicotinamide phosphoribosyltransferase (NAMPT) activators. *Bioorganic & Medicinal Chemistry Letters* 2021, 41, 128007. DOI: http://doi.org/10.1016/j.bmcl.2021.128007.

(33) Akiu, M.; Tsuji, T.; Iida, K.; Sogawa, Y.; Terayama, K.; Yokoyama, M.; Tanaka, J.; Asano, D.; Honda, T.; Sakurai, K. Discovery of DS68702229 as a Potent, Orally Available NAMPT (Nicotinamide Phosphoribosyltransferase) Activator. *Chemical and Pharmaceutical Bulletin* 2021, 69 (11), 1110-1122.

(34) Tang, S.; Garzon Sanz, M.; Smith, O.; Krämer, A.; Egbase, D.; Caton, P. W.; Knapp, S.; Butterworth, S. Chemistry-led investigations into the mode of action of NAMPT activators, resulting in the discovery of non-pyridyl class NAMPT activators. *Acta Pharmaceutica Sinica B* 2023, 13 (2), 709-721. DOI: https://doi.org/10.1016/j.apsb.2022.07.016.

(35) Wang, L.; Liu, M.; Zu, Y.; Yao, H.; Wu, C.; Zhang, R.; Ma, W.; Lu, H.; Xi, S.; Liu, Y.; et al. Optimization of NAMPT activators to achieve in vivo neuroprotective efficacy. *European Journal of Medicinal Chemistry* 2022, 236, 114260. DOI: https://doi.org/10.1016/j.ejmech.2022.114260.

(36) Yao, H.; Liu, M.; Wang, L.; Zu, Y.; Wu, C.; Li, C.; Zhang, R.; Lu, H.; Li, F.; Xi, S.; et al. Discovery of small-molecule activators of nicotinamide phosphoribosyltransferase (NAMPT) and their preclinical neuroprotective activity. *Cell Research* 2022, 32 (6), 570-584. DOI: 10.1038/s41422-022-00651-9.

(37) Ratia, K. M.; Shen, Z.; Gordon-Blake, J.; Lee, H.; Laham, M. S.; Krider, I. S.; Christie, N.; Ackerman-Berrier, M.; Penton, C.; Knowles, N. G.; et al. Mechanism of Allosteric Modulation of Nicotinamide Phosphoribosyltransferase to Elevate Cellular NAD+. *Biochemistry* 2023, 62 (4), 923-933. DOI: 10.1021/acs.biochem.2c00655.

(38) Gordon-Blake, J.; Karumudi, B.; Ratia, K.; Knopp, R. C.; Dye, K.; Ben Aissa, M.; Thatcher, G. R. P1-083: NOVEL NAMPT ACTIVATORS ATTENUATE NEUROTOXICITY AND NEUROINFLAMMATION ASSOCIATED WITH NEURODEGENERATION. *Alzheimer's & Dementia* 2019, 15, P266-P267.

(39) Stevenson, G. I., Garavelas, Agatha, Cosgrove, Kelly L., Reynolds, Kristie A., Franken, Nicole C., Whittell, Louise R., Wijesekera, Hasanthi P. Tetrahydropyran-4-ylethylamino- or tetrahydropyranyl-4-ethyloxy-pyrimidines or -pyridazines as isoprenylcysteincarboxymethyl transferase inhibitors. 20 Jul. 2014.

(40) Hou, Y.; Lautrup, S.; Cordonnier, S.; Wang, Y.; Croteau, D. L.; Zavala, E.; Zhang, Y.; Moritoh, K.; O'Connell, J. F.; Baptiste, B. A.; et al. NAD+ supplementation normalizes key Alzheimer's features and DNA damage responses in a new AD mouse model with introduced DNA repair deficiency. In *Proc Natl Acad Sci USA*, Vol. 115; 2018; pp E1876-1885.

(41) Koh, P.-O. Nicotinamide attenuates the injury-induced decrease of hippocalcin in ischemic brain injury. *Neuroscience Letters* 2013, 545, 6-10. DOI: https://doi.org/10.1016/j.neulet.2013.04.010.

(198) Liu, D.; Pitta, M.; Jiang, H.; Lee, J.-H.; Zhang, G.; Chen, X.; Kawamoto, E. M.; Mattson, M. P. Nicotinamide forestalls pathology and cognitive decline in Alzheimer mice: evidence for improved neuronal bioenergetics and autophagy procession. *Neurobiology of Aging* 2013, 34 (6), 1564-1580. DOI: https://doi.org/10.1016/j.neurobiolaging.2012.11.020.

(42) Sidhu, A.; Diwan, V.; Kaur, H.; Bhateja, D.; Singh, C. K.; Sharma, S.; *Padi*, S. S. V. Nicotinamide reverses behavioral impairments and provides neuroprotection in 3-nitropropionic acid induced animal model of Huntington's disease: implication of oxidative stress-poly(ADP- (ribose) polymerase pathway. *Metabolic Brain Disease* 2018, 33 (6), 1911-1921. DOI: 10.1007/s11011-018-0297-0.
(43) Tribble, J. R.; Otmani, A.; Sun, S.; Ellis, S. A.; Cimaglia, G.; Vohra, R.; Jöe, M.; Lardner, E.; Venkataraman, A. P.; Domínguez-Vicent, A.; et al. Nicotinamide provides neuroprotection in glaucoma by protecting against mitochondrial and metabolic dysfunction. *Redox Biology* 2021, 43, 101988. DOI: https://doi.org/10.1016/j.redox.2021.101988.
(44) Anderson, D. W.; Bradbury, K. A.; Schneider, J. S. Broad neuroprotective profile of nicotinamide in different mouse models of MPTP-induced parkinsonism. *European Journal of Neuroscience* 2008, 28 (3), 610-617. DOI: https://doi.org/10.1111/j.1460-9568.2008.06356.x.
(45) Sorrentino, V.; Romani, M.; Mouchiroud, L.; Beck, J. S.; Zhang, H.; D'Amico, D.; Moullan, N.; Potenza, F.; Schmid, A. W.; Rietsch, S.; et al. Enhancing mitochondrial proteostasis reduces amyloid-β proteotoxicity. *Nature* 2017, 552 (7684), 187-193. DOI: 10.1038/nature25143.
(46) Gong, B.; Pan, Y.; Vempati, P.; Zhao, W.; Knable, L.; Ho, L.; Wang, J.; Sastre, M.; Ono, K.; Sauve, A. A.; et al. Nicotinamide riboside restores cognition through an upregulation of proliferator-activated receptor-γ coactivator 1α regulated β-secretase 1 degradation and mitochondrial gene expression in Alzheimer's mouse models. *Neurobiology of Aging* 2013, 34 (6), 1581-1588. DOI: https://doi.org/10.1016/j.neurobiolaging.2012.12.005.
(47) Harlan, B. A.; Pehar, M.; Killoy, K. M.; Vargas, M. R. Enhanced SIRT6 activity abrogates the neurotoxic phenotype of astrocytes expressing ALS-linked mutant SOD1. *The FASEB Journal* 2019, 33 (6), 7084-7091. DOI: https://doi.org/10.1096/fj.201802752R.
(48) Scheibye-Knudsen, M.; Mitchell, Sarah J.; Fang, Evandro F.; Iyama, T.; Ward, T.; Wang, J.; Dunn, Christopher A.; Singh, N.; Veith, S.; Hasan-Olive, Md M.; et al. A High-Fat Diet and NAD+ Activate Sirt1 to Rescue Premature Aging in Cockayne Syndrome. *Cell Metabolism* 2014, 20 (5), 840-855. DOI: https://doi.org/10.1016/j.cmet.2014.10.005.
(49) Wei, C. C.; Kong, Y. Y.; Li, G. Q.; Guan, Y. F.; Wang, P.; Miao, C. Y. Nicotinamide mononucleotide attenuates brain injury after intracerebral hemorrhage by activating Nrf2/HO-1 signaling pathway. *Sci Rep* 2017, 7 (1), 717. DOI: 10.1038/s41598-017-00851-z From NLM.
(50) Yao, Z.; Yang, W.; Gao, Z.; Jia, P. Nicotinamide mononucleotide inhibits JNK activation to reverse Alzheimer disease. *Neurosci Lett* 2017, 647, 133-140. DOI: 10.1016/j.neulet.2017.03.027 From NLM.
(208) Wang, X.; Hu, X.; Yang, Y.; Takata, T.; Sakurai, T. Nicotinamide mononucleotide protects against β-amyloid oligomer-induced cognitive impairment and neuronal death. *Brain Research* 2016, 1643, 1-9. DOI: https://doi.org/10.1016/j.brainres.2016.04.060.
(51) Long, A. N.; Owens, K.; Schlappal, A. E.; Kristian, T.; Fishman, P. S.; Schuh, R. A. Effect of nicotinamide mononucleotide on brain mitochondrial respiratory deficits in an Alzheimer's disease-relevant murine model. *BMC Neurol* 2015, 15, 19. DOI: 10.1186/s12883-015-0272-x From NLM.
(52) Fang, E. F.; Hou, Y.; Palikaras, K.; Adriaanse, B. A.; Kerr, J. S.; Yang, B.; Lautrup, S.; Hasan-Olive, M. M.; Caponio, D.; Dan, X.; et al. Mitophagy inhibits amyloid-β and tau pathology and reverses cognitive deficits in models of Alzheimer's disease. *Nature Neuroscience* 2019, 22 (3), 401-412. DOI: 10.1038/s41593-018-0332-9.
(53) Chandrasekaran, K.; Choi, J.; Arvas, M. I.; Salimian, M.; Singh, S.; Xu, S.; Gullapalli, R. P.; Kristian, T.; Russell, J. W. Nicotinamide Mononucleotide Administration Prevents Experimental Diabetes-Induced Cognitive Impairment and Loss of Hippocampal Neurons. *International Journal of Molecular Sciences* 2020, 21 (11), 3756.
(54) Hosseini, L.; Farokhi-Sisakht, F.; Badalzadeh, R.; Khabbaz, A.; Mahmoudi, J.; Sadigh-Eteghad, S. Nicotinamide Mononucleotide and Melatonin Alleviate Aging-induced Cognitive Impairment via Modulation of Mitochondrial Function and Apoptosis in the Prefrontal Cortex and Hippocampus. *Neuroscience* 2019, 423, 29-37. DOI: https://doi.org/10.1016/j.neuroscience.2019.09.037.

The invention claimed is:

1. A compound having a structure I or a pharmaceutically acceptable salt thereof

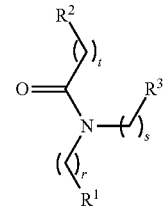

wherein
$R^1$ is a phenyl group substituted with at least one alkoxy group, haloalkoxy group, hydroxyl group, alkyl group, haloalkyl group, or an amino group;
$R^2$ is a substituted or unsubstituted heteroaryl group selected from the group consisting of furyl, pyrimidinyl, tetrazolyl, thienyl, pyridinyl, pyrrolyl, N-methylpyrrolyl, quinolinyl, isoquinolinyl, thiazolyl, oxazolyl, isoxazolyl, oxadiazolyl, thiadiazolyl, isothiazolyl, pyridazinyl, pyrazinyl, indolyl, and indazolyl, the substituted monocyclic heteroaryl group is a heteroaryl group substituted with a group selected from the group consisting of alkyl, cycloalkyl, alkoxy, amino, ether, halide, hydroxy, nitro, silyl, sulfo-oxo, and thiol;
$R^3$ is a substituted or unsubstituted tetrahydropyranyl group, wherein the substituted tetrahydropyranyl group is a tetrahydropyranyl group substituted with a group selected from the group consisting of alkyl, cycloalkyl, alkoxy, amino, ether, halide, hydroxy, nitro, silyl, sulfo-oxo, and thiol;
r is 1, 2, or 3;
s is 1, 2, or 3; and
t is 0, 1, or 2.

2. The compound of claim 1, wherein $R^1$ has the structure II

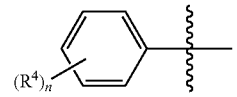

wherein
each $R^4$ is independently an alkoxy group, a haloalkoxy group, a hydroxyl group, an alkyl group, a haloalkyl group, or an amino group; and
n is 1, 2, 3, 4, or 5.

3. The compound of claim 2, wherein $R^4$ is alkoxy or a dialkylamino group and n is 1.

4. The compound of claim 2, wherein $R^4$ is methoxy and n is 1.

5. The compound of claim 1, wherein $R^2$ is a substituted or unsubstituted furyl group or a substituted or unsubstituted thienyl group.

6. The compound of claim 1, wherein $R^2$ is

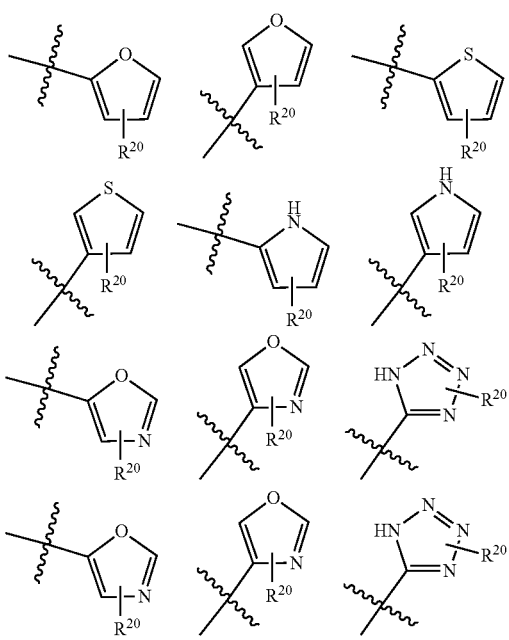

wherein
$R^{20}$ is an alkoxy group, a haloalkoxy group, a hydroxyl group, a halide, an alkyl group, a haloalkyl group, or an amino group.

7. The compound of claim 1, wherein $R^3$ has the structure III

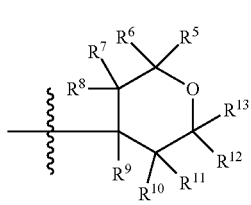

III wherein $R^a$ to $R^{13}$ are independently hydrogen, a C1 to C10 alkyl group, or cycloalkyl group.

8. The compound of claim 1, wherein $R^3$ is

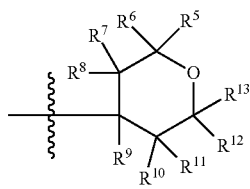

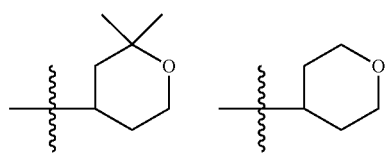

wherein p is 1, 2, 3, or 4, and
q is 0, 1, 2, 3, 4, or 5.

9. The compound of claim 1, wherein r is 1 and s is 2.

10. The compound of claim 1, wherein
$R^1$ is a phenyl group substituted with at least one alkoxy group, haloalkoxy group, hydroxyl group, alkyl group, haloalkyl group, or an amino group;
$R^2$ is a substituted or unsubstituted furyl group or a substituted or unsubstituted thienyl group; and
$R^3$ has the structure III

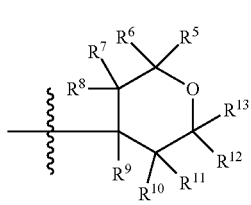

III wherein $R^5$ to $R^{13}$ are independently hydrogen, a C1 to C10 alkyl group, or cycloalkyl group.

11. The compound of claim 10, wherein r is 1, s is 2, and t is 0.

12. The compound of claim 1, wherein the compound has the structure IV

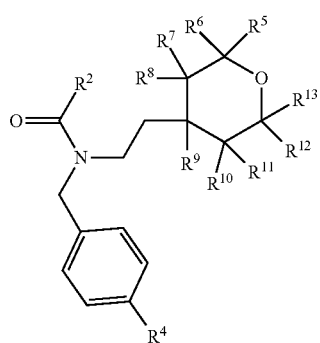

IV wherein
$R^2$ is a substituted or unsubstituted furyl group or a substituted or unsubstituted thienyl group;
$R^4$ is an alkoxy group, a haloalkoxy group, a hydroxyl group, an alkyl group, a haloalkyl group, or an amino group; and
$R^5$ to $R^{13}$ are independently hydrogen, a C1 to C10 alkyl group, or cycloalkyl group.

13. The compound of claim 12, wherein $R^4$ is an alkoxy group or a dialkylamino group.

14. The compound of claim 12, wherein $R^4$ is a methoxy group or a dimethylamino group.

15. The compound of claim 12, wherein $R^2$ is an unsubstituted furyl group or a substituted or unsubstituted thienyl group.

16. A pharmaceutical composition comprising the compound of claim 1 and a pharmaceutically acceptable carrier.

17. A method for treating or preventing a neurological disease in a subject, the method comprising administering to the subject a compound of claim 1, wherein the neurological disease comprises Parkinson's disease, Alzheimer's disease Huntington's disease, multiple sclerosis, amylotrophic lateral sclerosis ADS-induced dementia, or epilepsy.

* * * * *